United States Patent [19]

Kryskow, Jr. et al.

[11] Patent Number: 4,506,360

[45] Date of Patent: Mar. 19, 1985

[54] MULTI-STATION TOKEN PASS COMMUNICATION SYSTEM AND METHOD

[75] Inventors: J. Michael Kryskow, Jr., Hudson, N.H.; Allan Tanzman, Cambridge, Mass.

[73] Assignee: Gould Inc., Rolling Meadows, Ill.

[21] Appl. No.: 363,090

[22] Filed: Mar. 29, 1982

[51] Int. Cl.³ .............................................. H04J 6/00
[52] U.S. Cl. ........................................ 370/85; 370/86
[58] Field of Search ............................ 370/85, 94, 86; 340/825.5, 825.51

[56] References Cited

U.S. PATENT DOCUMENTS

| | | | |
|---|---|---|---|
| 3,701,109 | 10/1972 | Peters | 340/825.51 |
| 4,058,681 | 11/1977 | Imaizumi et al. | 370/85 |
| 4,137,522 | 1/1979 | Stein | 340/825.51 |
| 4,227,178 | 10/1980 | Gergaud et al. | 370/85 |
| 4,375,639 | 3/1983 | Johnson, Jr. | 340/825.5 |

OTHER PUBLICATIONS

B. K. Penney et al., "Survey of Computer Communications Loop Networks: Part 1", Computer Comm., Aug. 1979, vol. 2, No. 4, pp. 165–180.
U.S. patent application No. 241,688, Kryskow, Jr. et al., "Multi-Station Token Pass Communications System & Method" Mar. 1980.

Primary Examiner—Douglas W. Olms
Assistant Examiner—Wellington Chin
Attorney, Agent, or Firm—Mattern, Ware, Stoltz & Fressola

[57] ABSTRACT

A data communications system is disclosed which uses a passive communications medium such as coaxial cable for communication between multiple stations connected to the bus. A token concept is employed such that when the token is owned by a station, it allows that station to transmit high level messages over the bus and to command, if desired, other stations to transmit high level messages to it. The communications system is primarily masterless with each station capable of token ownership using the same set of rules to determine the circumstances when perceived events by the station cause that station to change state. Improvements are presented in the initialization of a token list, the addition of stations to an existing token list, duplicate station address protection through random numbers associated with each station, power down patch out of a station from the token list, the joining of two networks (two token lists), timer period randomization, and the use of redundant communication mediums.

52 Claims, 34 Drawing Figures

STATION #1
| 1 | 0 | 1 | 0 | 1 | 0 | 1 | 1 | 0 | 0 | 1 | 0 | 1 | 1 | 1 | 0 |
STATION #2
| 1 | 1 | 1 | 0 | 1 | 0 | 1 | 1 | 1 | 1 | 0 | 1 | 0 | 1 | 1 | 1 |
STATION #3
| 1 | 1 | 1 | 1 | 0 | 0 | 0 | 0 | 0 | 0 | 0 | 0 | 0 | 0 | 0 | 0 |
STATION #4
| 1 | 1 | 1 | 1 | 0 | 0 | 0 | 0 | 0 | 0 | 0 | 0 | 0 | 0 | 0 | 1 |
FIG. 10
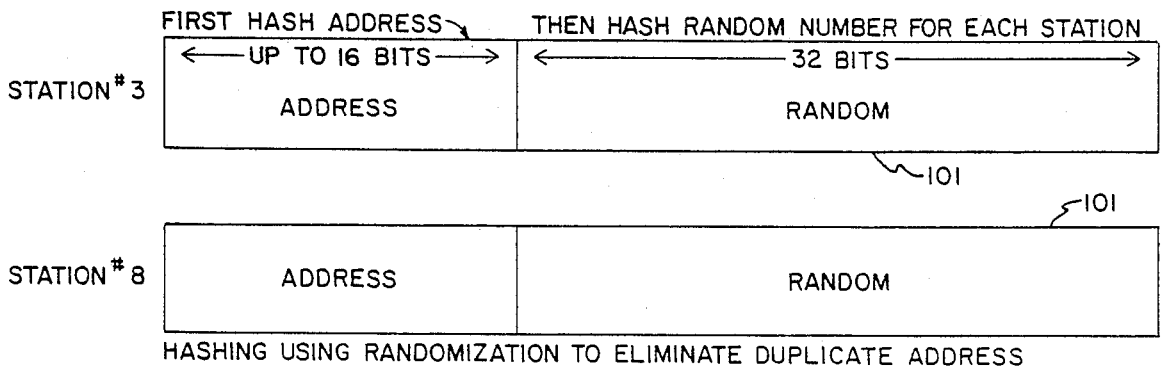
HASHING USING RANDOMIZATION TO ELIMINATE DUPLICATE ADDRESS
FIG. 11
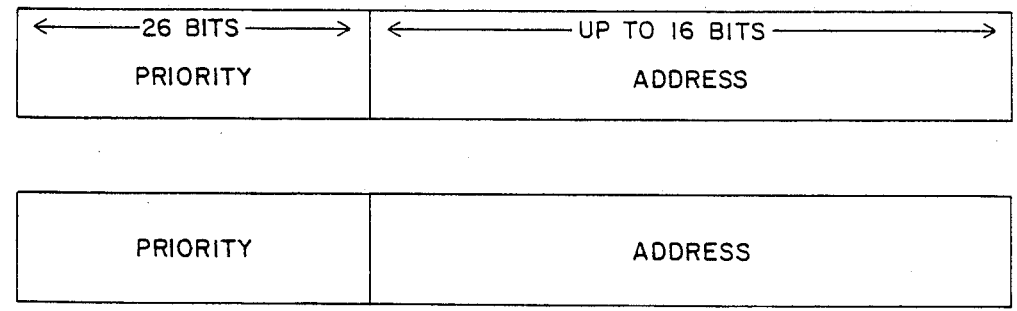
HIGH PRIORITY STATIONS WIN TOKEN ENABLING THEM TO DO DLC WORK
FIG. 12

TRANSITION TO BUS DEAD

TRANSITION TO JABBER

MULTI-STATION TOKEN PASS COMMUNICATION SYSTEM AND METHOD

CROSS REFERENCE TO RELATED APPLICATION

The subject matter of U.S. patent application Ser. No. 241,688 (hereafter '688 application), entitled Multi-Station Token Pass Communication System, filed Mar. 9, 1981, inventors Kryskow, Jr., Allen and Bobzin, and owned by the present assignee, is hereby incorporated by reference.

TECHNICAL FIELD

The present invention relates to communication systems and in particular to non-contention communication systems utilizing a single conceptualized token which is passed between stations communicating on a bus, wherein each station that becomes a token owner has the right, to the exclusion of other stations, to initiate high level message transmissions and, if desired, to cause other stations to transmit high level reply messages.

BACKGROUND ART

Multi-station communication systems typically reside in one of two major categories, master controlled systems and master-less systems. General information for both systems is found in the IEEE's Computer Society Press Tutorial entitled "LOCAL COMPUTER NETWORKS", second edition, Kenneth J. Thurber and Harvey A. Freeman, (IEEE CATALOG NO. EHO 1792, copyright 1981). The former category utilizes a central processing unit or other supervisory control which observes and dictates which station has access to the commonly shared data transmission resource; typically the bus interconnecting the various stations. Unlike such systems, the present invention is primarily a master-less communication system.

With respect to master-less communication systems, two general categories exist; namely, contention systems and token pass systems. The former contention systems are unlike the present invention in that they allow multiple stations to contend for access to the bus as the general means for transferring control of the bus from one station to another station. The present invention, although allowing for the possibility of contention when multiple stations simultaneously demand access to the token, generally only uses a contention-less token pass system.

As to contention systems, the joint project developed by Digital Equipment Corporation, Maynard, Mass.; Intel Corporation, Santa Clara, Calif., and Xerox Corporation, Stamford, Conn., known as Ethernet TM, and as described in U.S. Pat. No. 4,063,200, Metcalfe et al, allows any station connected to the bus to transmit information provided that the bus is clear just prior to and during the transmission. If it detects noise on the bus while transmitting, it is assumed that an interference or collision has occurred between itself and at least one other station attempting to transmit information on the bus at the same time. In order to correct this problem the transmitter section is disabled on each station and a random number generator is used to select an interval of time at the completion of which the next attempt at transmission takes place. At the same time, a counter counts the number of interferences, or collisions, which occur in the attempted transmissions of one data packet and weights the mean of the random number generator accordingly. In this way, the stations attempting to transmit, reattempt to transmit at different times and thus, in time, eliminate the contention between the stations.

The present invention does not utilize such a contention or collision detection system but rather uses the concept of a token which is passed from one station to another such that each station when owning the token has, during that time, the exclusive right to initiate high level message transmissions (sometimes called data link control or "DLC" messages) as well as to request return of high level messages from any other station.

With respect to a token pss communication system, a representative prior art technique is disclosed in U.S. Pat. No. 4,058,681, Imaizumi et al. This reference discloses an information transmission system using a token which is transmitted from one station to the next by use of a command established signal (ELS) and a transfer command signal (SEL). The token is passed from station to station through use of the SEL signal giving the address of the next station which is to have the token. Upon receiving the token, that next station transmits the command establish signal to inform the other stations that it does have command. If the station presently having the token does not transmit an ELS or SEL signal within a predetermined time, another station takes the token by transmitting its own ELS signal. A failure of a station to detect the transfer of the token from itself to the next addressed station within a predetermined time causes the station which originally had the token to retransmit a new SEL signal with a new address so as to transfer the token to a different station.

This reference however does not dislose the concept of an arc of control wherein the present token owner (holder) knows both the station from which it received the token (its "FROM") as well as the station to which it is to next transfer the token (its "TO"). This arc of control in combination with an improved demand window by which the present token owner can transfer the token to a demander not in the token list provides the capability of both patching in and patching out stations to the token list of stations presently passing ownership of the token on a systematic basis. Imaizumi et al also neither discloses nor suggests the concept of automatically changing the handshaking protocol between token passing stations.

While the arc of control and automatic handshaking protocol shifting is disclosed in the '688 application, that application does not disclose or suggest the hashing mechanism, the duplicate address protection system, the improved explicit demander window mechanism, and other improvements of the present invention.

Referring again to Imaizumi et al, it also does not disclose or suggest the binding concept of the present invention wherein stations may have physical connection to the bus and yet never have the possibility of obtaining the token for control of the bus (called "slave" stations). These slave stations are thus only able to respond to other stations which can be token owners. The binding concept allows the communications system to interconnect with relatively low level access stations which would otherwise be incapable of transmitting information on the bus. This binding concept, though disclosed in the '688 application is further improved in the present invention through duplicate address protection of all stations, including slave stations.

Furthermore, the present invention through use of its underlying perceived events and their causal effect through rule interaction to change station states, can be reconfigured to form new and different communications systems having different access mechanism protocols depending upon the particular requirements of a communication network desired by the user.

The present invention provides an improvement over previous token pass communication systems by incorporating several new features. In particular, a initialization procedure now utilizes what is called a "hashing contest" for determining the first station that proceeds with generating a token list (sometimes known as ring building). This technique uses the address of the station and, if required, a random number associated with the station, for determining which station becomes the "first station" in the token list during token list building. Throughout this document, "token list", "list", "token ring", and "ring" are used synomously unless otherwise indicated.

Another improvement is a more systemitized and less frequent generation of a demand window (see previous '688 application) by providing that the lowest address station (or any other uniquely definable station, if desired) issues an explicit broadcast signal (Demander Enable signal) to all stations to allow any station desiring to be in the ring to reply with a Demander In signal. This Demander In signal is an explicit type signal containing information regarding the station seeking admission to the ring. In particular, since each station has a unique random number associated with its address, the Demander In signal contains not only the address of the demander station but also its random number. This overcomes the possibility of two stations having the same address Demanding In at the same time and both receiving the token from the lowest address station (sometimes called the "window station" herein). Instead, the window station in reply to the Demander In signal sends a Demand Token signal containing not only the address of the station which is perceived as demanding the token but also the random number which is received. Only the station which has the same address and random number can accept the token while the other station with the same address but a different random number realizes that it has a duplicate address with another station, and thereby should take appropriate corrective action.

This use of a random number associated with the station address to prevent stations from being in the ring having the same address is also employed in all of the ring building sequences of the present invention and with respect to all communications generated between stations including those with slave stations.

Furthermore, sine a contentionless system is utilized, a guaranteed maximum access time is obtained by the present communication system. Consequently, the present invention further includes an improvement whereby any station sensing a loss of power can, before all operating power is lost, proceed to patch itself out of the token list and thus achieve an ordered shutdown of itself with respect to the other stations in the token list.

Furthermore, the present invention provides an improvement for the joining of two token lists or two token rings. In particular, each station contains a randomization time associated with its timer. This randomization time prevents stations in the same state to enter the token passing state simultaneously; which in combination with other state transition events, allows only one token from the two token lists to continue, with the stations in the other token list thus able to patch into the existing token list.

Furthermore, the present invention can utilize two communication mediums, such as two coaxial cables, so that a break in any one cable at any one point does not cause a breakdown in the communication network.

DISCLOSURE OF THE INVENTION

An improved bus communication system is disclosed using token passing as the vehicle for exchange of the ability of interconnected stations in the communication system to control transmission of high level messages between themselves over a passive medium such as a coaxial cable or fiber optics. Each station capable of token ownership includes access mechanism modules defining the rules by which the station changes state based upon perceived events by that station. Each station when possessing, holding or owning the token (these verbs are used synonomously with respect to the token) is the only station that can initiate the transfer of non-access type messages (called high level messages or DLC in this document) over the bus to other stations and which can also command the transmission of high level messages from other stations to itself (surrogate message transfers to third party stations are not utilized in the present invention although they could be if desired).

Once token ownership is obtained by a station (that is bus access has been obtained by the station), the manner of data communication between that station and another station can meet with one of several well-defined standards such as the International Standard Organization's high level data link controller (HDLC) described in their document entitled "ISO/DIS 3339.2". Other communication high level protocols such as DDCMP (a Digital Equipment Corporation published standard) and a computer interface CCITT X.25 of the International Standards Organization can be utilized for the other communication layers once the access layer has been established.

The present invention provides improvements over the '688 application through improved initialization of a token list; that is, the stations which pass the token among themselves out of a plurality of stations which are interconnected to the bus. The '688 application discloses a timeout mechanism for each station upon power up to determine whether or not it is in the token list and if not, the procedures for becoming part of the token list. The present invention provides that each station upon power up, enters an initialization passing procedure ("hashing contest") whereby each station that is operating determines through a bit by bit comparison of its address whether or not it is still in the contest. The winner of this hashing contest (which includes use of randomization numbers if duplicate address stations exist) proceeds to build the token list through use of a demand window, analogous to that described in the '688 application. However, the present invention further provides that the hashing contest winning station can also perform DLC work even though no other station is in the token list.

The present invention further provides an improved demander window concept with respect to that disclosed in the '688 application. In the '688 application each station upon receipt of the token opened a demand window which allows any station not in the token list to request entry. Procedures are disclosed for passing a demand token to a demanding station. Multiple demanders are accommodated by passing the demand token to the furthest (highest) addressed station and that station in turn issuing a demand window. However, since each token owner provides a demand window, and since there may be many stations in the token list at any particular time, the possibility exists for interference on the bus. The plurality of demand windows also causes an overall slowdown of the token passing mechanism. The present invention provides an improvement by defining a single station (called the "window station")—such as the lowest address station in the token list—to issue a demanders in signal (called a Demanders Enabled signal) during a demand window. Any station desiring membership to the ring can then respond with an acknowledgement signal (Demander In Signal) which contains not only the demander's address but also a randomization number associated with that station. The window station then responds with a Demander Token signal which contains not only the address of the station which the window station perceived, but also the random number of that station in case duplicate addressed demanders exist but were not perceived by the window station. By sending back the address and randomization number associated with the demander station perceived by the window station, only that station accepts the token even if a duplicate addressed station demanded the token. The duplicate address station will, upon receiving the signal containing its address but a different randomization number, conclude that another station exists with its address (the station that received the demand token) and that it should take corrective action either independently or via some type of signal perceivable by other stations.

The present invention also provides an orderly patch-out by a station from the token list in situations where the station perceives an input power failure. In particular, since a guaranteed maximum access time for receipt of the token exists, a period of time (power backup period) greater than this maximum access time can be provided for maintaining backup DC power by the station. During this power backup period, the station that loses power can patch itself out of the token list.

Furthermore, in situations where the maximum configured organization of the overall communication system is known, the window station can, upon determining that the maximum configured situation is presented (all allowable stations are in the token list), eliminate the generation of the Demander Enable signal and thereby increase the overall speed of the communication system.

Duplicate address protection is also presented between master and slave stations so as to prevent such stations from having the same address. Thus a station which is not in the ring and having an address the same as the slave station, cannot become a member of the ring until its address is changed. In such a situation, the demanding station enters a DUPLICATE ADDRESS state which acknowledges the duplicate address situation and prevents further activity by this station until its address is changed.

Furthermore, the present invention provides the ability to more readily combine two communication buses, each with its own token list. The '688 application discloses that this situation causes a complete re-initialization of a single token list. The present invention eliminates the need for initialization since the "I'm Next" station in each token list has a different timeout period for initiating token passing while it is waiting for the token from its FROM station. Consequently, when two rings are joined, one "I'm Next" station becomes active on the bus prior to the other. The latter station perceives the earlier station and determines that it is no longer in the token list. It then proceeds to become part of the token list via the demander window sequence rather than simultaneously sending colliding messages on the bus. In this manner, one token list is maintained and is augmented to include the stations of the other token list.

The present invention allows redundant communication mediums such as redundant coaxial cables to be used so that no break in any coaxial cable can cause a break in the overall communication medium.

Thus, the present invention provides a number of improvements over the prior art so as to obtain a more robust and efficient communication system.

OBJECTS OF THE INVENTION

Therefore, a principal object of the present invention is to provide a communication system for multiple stations utilizing a passive communication medium through use or a synchronized serial bus in which each station having the capability of access to the medium has substantially the same rules defining state transitions for perceived events as all other stations having potential access to the medium and in which a substantially master-less communication system results; and further wherein the communication system has an initalization procedure which is based upon a bit hashing contest for determining the first station to enter the token list.

A further object of the present invention is to provide an improved token pass communication system of the above description in which each station which is capable of token ownership can become a token owner via an improved demander window associated with a unique station in the token list.

A still further object of the present invention is to provide a communication system of the above description in which a demander station issues its address and randomization number to the window station; which numbers are then returned to the demander so that multiple demanders with the same address cannot simultaneously acquire the token.

A still further object of the present invention is to provide a communication system of the above description in which a master station having the same address as a slave station is prevented from using the bus.

Another object of the present invention is to provide a communication system of the above description in which more than one communication medium is used to provide redundancy so that a single break in any communication medium cannot impair the overall communication system.

A still further object of the present invention is to provide a communication system whereby two communication mediums can be joined without both token lists being lost.

Another object of the present invention is to allow an initializing station to perform DLC work.

Other objects of the present invention will in part be obvious and will in part appear hereinafter.

BRIEF DESCRIPTION OF THE DRAWINGS

For a fuller understanding of the nature and objects of the present invention, reference should be made to the following detailed description taken in connection with the accompanying drawings in which:

FIG. 10 is a diagrammatic representation of hashing at the station address level;

FIG. 11 is a diagrammatic representation of hashing using both the station address and a random number associated with each station;

FIG. 12 is a diagrammatic representation of an alternative scheme for initialization in which stations have predetermined priorities, where the priority bits are hashed before the address bits so that certain designated stations can be assured that one of them will win the hashing contest;

FIG. 15C is a diagram showing how FIGS. 15A and 15B are put together.

FIGS. 20A and 20B are state maps of the power up and permanent demanding group of states of the present access mechanism;

FIGS. 21A and 21B illustrate the ring building and "Only One" group of states of the present access mechanism;

FIGS. 24A and 24B illustrate the watching "FROM" and token owner group of states of the present access mechanism;

FIGS. 25A, 25B and 25C illustrate the group of states for new access and token passing.

BEST MODE FOR CARRYING OUT THE INVENTION

Overview

Figure 1:
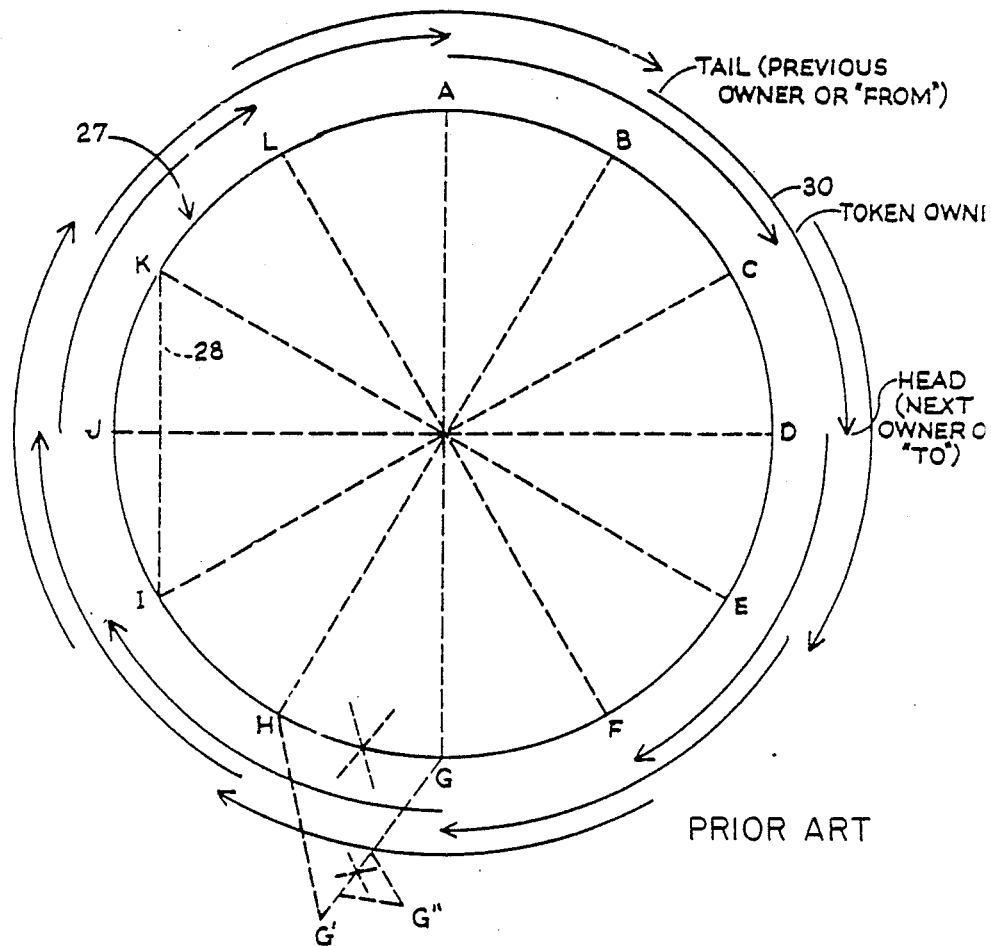
FIG. 1 is a diagrammatic representation of a prior art local area of network communication system illustrating the arc of control whereby three stations are related to each other by their FROM, TOKEN OWNER, and TO states, such an arc of control analogous to that utilized in the present invention.

FIG. 1 illustrates a prior art token pass communication system corresponding to that disclosed in the '688 application. This FIGURE shows that a plurality of stations, A, B, C, D, etc. can be combined to pass a conceptualized token from one station to the other, where each station in the token list obtains the token on a periodic basis and knows both the station from which it receives the token (the FROM station) and the station to whom it passes the token (the TO station). This combination of the FROM station, present (perceiving) station, and TO station is known as the arc of control.

Figure 2:
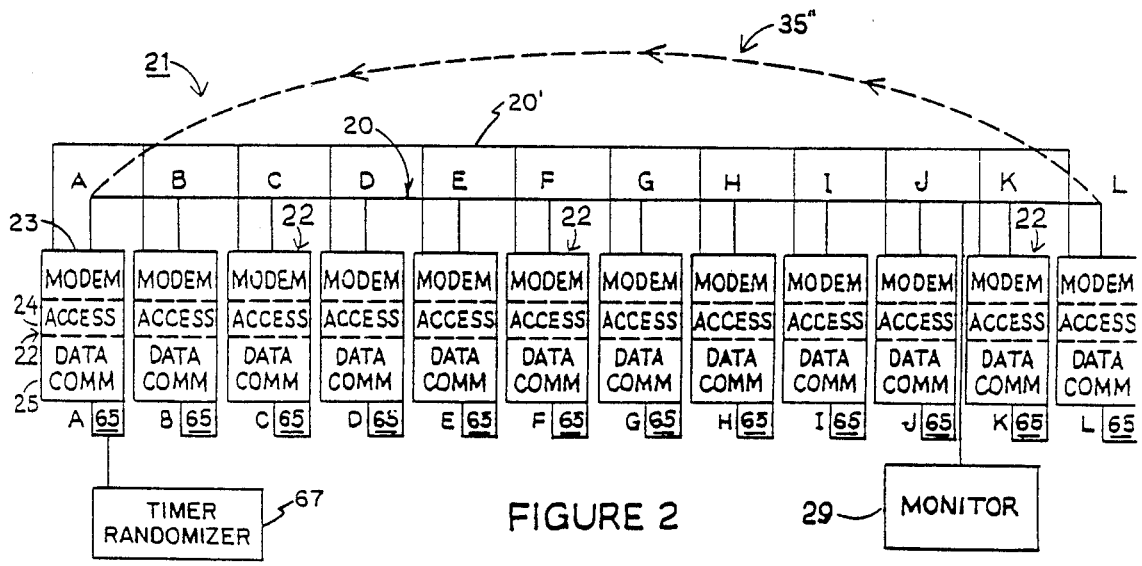
FIG. 2 is a block diagram of stations communicating via a communication medium such as a coaxial cable and further showing the use of a redundant communication medium.
Figure 13:
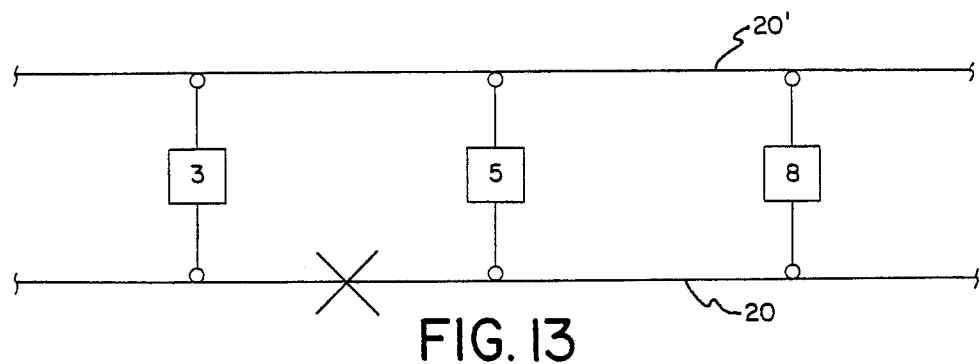
FIG. 13 is a diagrammatic illustration of the redundancy capability of the present invention when two communication mediums are utilized.

FIG. 2 illustrates a block diagram showing how a commonly shared resource, typically a bus 20 such as a coaxial cable, is utilized between multiple stations 22 that are physically connected to the bus to form a local area network type communications system 21. Furthermore, FIG. 2 illustrates the use of a redundant bus 20' which is also interconnected with each of the stations so that a break in either bus at any one location does not disrupt the overall linkage of the stations to one another. This latter feature is also shown in FIG. 13.

The bus is typically fabricated from coaxial cable such as that used for cable television with the stations interconnected to the bus by standard coaxial cable connectors well-known in the art. For local area networks, the bus length can be from a few hundred feet to several miles.

In a typical configuration, the stations may number from 1 to 16,383, each station having a unique address. Furthermore, in the present invention, each station also has a randomization number 101 associated with it. This number is used in association with its address for preventing duplicate address stations from joining the token list; that is, the list of stations which pass the token among themselves. It is also possible that the local area network communication system can have thousands of stations attached to it such as in a large office building or a city. In the example shown in FIG. 2, there are twelve stations connected to busses 20 and 20', the stations denoted by the letters, A-L respectively. Each station comprises three parts, a modem 23 that physically receives and transmits messages to and from the bus, an access module 24 which embodies the rules forming the states of the present invention which provide for access by the station to the bus (busses) in response to perceived events, a data communications section 25 which utilizes some form of high level message protocol for the actual transfer of non-access messages between one station and another, a timer 65 which is used in the access mechanism protocol. This timer has associated randomization means 67 (only shown for station A) which determines the overall duration of the timer for various timeout periods. The timer values are set forth in Table 1 under the heading "Time Values", (due to the size of Table 1, it is presented toward the end of this document).

The data communication protocol can be any standard form although the present invention is primarily directed to utilizing a standard under development by the International Standards Organization as detailed in their document known as *Reference Model for Open Systems Interconnection* (Document ISO TC 97/SC16/N537). This standard is directed to the exchange of information among terminal devices, computers, people, networks, processors, that are open to one another for this purpose by virtue of their mutual use of an applicable protocol. Such standards envision the transfer of information between systems to be formed by a physical media for systems interconnection in which each system is viewed as being composed of logically ordered sets of subsystems. Other communication protocols can be used for various configurations, such as for intercommunication with robots and the like.

Throughout the description contained herein, the actual format for transmitting messages once access to the bus has been obtained by a station, is described as a high level data link control. Thus the data communication section 25 (see FIG. 2) can be any high level data link controller known in the art. The acronym used for such messages throughout the drawings and description is either HDLC or DLC, the latter standing for data link controller. Since the present invention typically uses a commonly shared passive communication link resource such as a coaxial cable, it is generally considered to be directed to communications in a local area network comprising a plurality of stations interconnected to the bus. The purpose of this communication system is to allow distributed sharing of the communication resource where each station is allowed to hear all other stations and any station, other than special slave stations, can theoretically control the resource at some time; that is, become a token owner. In particular, the present invention is directed to the sets of rules for denoting the various states that each station can reside in, depending upon observed events. These events are typically some form of activity heard on the bus or the passage of time which is realized by the station due to internal clock 65 contained in each station.

Throughout this description, it should be emphasized that all events are perceived from the perspective of the individual station. It is not necessary nor even realistic that each station perceive an event on the bus in the same way as any other station. This is due in part to such things as potential noise in the system, potential station failures, potential bus failures, and the propagation delays associated with data on the bus.

It should be noted that although a virtually unlimited number of stations may be physically connected to the bus and may each have the capability of being a token owner at some time, only those stations which are on the conceptualized token list or token ring are able to gain access to the token in an ordinary course of events. For example, FIGS. 1 and 2 illustrate twelve different stations on the bus. The circle 27 denoted in FIG. 1 can be visualized as the token ring or token list if each of these twelve stations presently have the token passed to it. Thus, each station on that ring or list has sequential synchronized access to the token. If this list is in existence at a particular time, the token is sequentially passed from station A to station B to station C, etc. up to station L, which then passes it back to station A. It is assumed that the stations are on the bus in sequentially higher addressed positioning. It should be noted that it is not required that stations physically reside on the bus in a sequentially higher station address configuration.

Station A is designated the window station since it receives the "flyback" token; i.e., the token from the highest addressed station. As described more fully below, only station A (or any other station with the lowest address if station A goes out of the token list) controls entry of new stations into the token list. Other stations may also be connected to the bus such as stations G' and G" shown in FIG. 1. These stations, however, are not part of the token list as shown in FIG. 1 and would have to become members of the list in order to have periodic ownership of the token and thereby periodic control of the bus for initiating high level messages and for commanding other stations to transmit high level messages to them. The rules for a station becoming part of the token list, sometimes called patch in, are discussed further on in this detailed description.

Furthermore, the present invention provides that any one station that becomes inoperative in its ability to receive and pass the token in an error free manner cannot cause the overall communication system to fail. For example, as shown in FIG. 1, station J may for some reason become faulty—a typical example being that its receiver is no longer able to receive information and therefore it is unable to know when the token is being passed to it. This fault would be observed by the other stations since, as stated earlier, each station is able to hear all other stations because it constantly listens to the shared resource, namely the bus. When faulty station J is observed, the neighboring stations would patch out station J such as shown by chord segment 28 and thus the token would be passed from station I to station K, bypassing faulty station J. If at a later time station J became operational it could, through a demanding sequence, re-establish its presence on the token list, and thus the overall list would again have the shape shown by the circle 27 in FIG. 1. The basic rules for patch in and patch out are the same as described in the '688 application. However, the specific states utilized by the present invention are presented in FIGS. 20A–25C and described in Table 2 (Table 2 is presented at the end of this document due to its size).

One aspect of the present invention as disclosed in the '688 application is the concept that each station which has token access capability embodies similar sets of rules which can be considered the formulation of states with the change of states being dependent upon how the rules are formulated in response to observed events, and in which the overall communication system operates in a synchronized fashion. The resulting synchronized serial bus is an underlying concept. Through it, the capability of a master-less communication system is achieved.

Further to this end is the '688 application's concept of the arc of control, whereby at any given time after initialization there are three stations which have information concerning the whereabouts of the token, and have the ability to move the token depending upon perceived events. Thus, in FIG. 1, arc 30 represents the token transfer between stations B, C and D. As the arc shows, station owner C is the present token owner, station B is the tail of the arc and was the previous token owner (referred to as the FROM), and station D is the next token owner (referred to as the TO). In the protocol to be described more fully below, the concept of a one-third, two-thirds, three-thirds, and four-thirds bus timeout is utilized to insure proper token passing. A time period called T represents three-fourths a dead bus Time Out, which each station initiates when a token is passed to a new owner. Thus, in the present situation, when token C becomes the token owner (as represented by arc 30), stations B, C and D start their timers. If, after one-third times T station C has not initiated any transmission on the bus, the head of the arc (station D) assumes that something is wrong with station C and then proceeds to take the token; that is, station D assumes that station C has died with the token. Station D then, takes the token, insuring that the token is moved around the token list. If for some reason station D does not realize that station C has not generated a message within the one-third times T time period, the tail station, Station B, will, after a time period equal to two-thirds time T, retake the token. If for some reason both the tail station, station B, and the head station, station D, do not take the token even though station C is not operating properly, then after a time period equal to T (that is three-thirds times T), the present token owner, station C, if now healthy, retakes the token in an attempt to keep the token moving; that is, it passes the token back to itself. If, however, there is still no energy (non-intelligible information) on the bus after a time period equal to four-thirds T, then each station realizes that something is wrong with the entire token passing scheme and thus reverts to initialization in which a new token first station owner is found using a new mechanism, called "hashing".

Thus, it is readily seen that the arc of control wherein each station in the arc attempts to keep the token moving from station to station is a powerful method of obtaining a master-less communication system of a simple and elegant format.

Figures 3, 5:
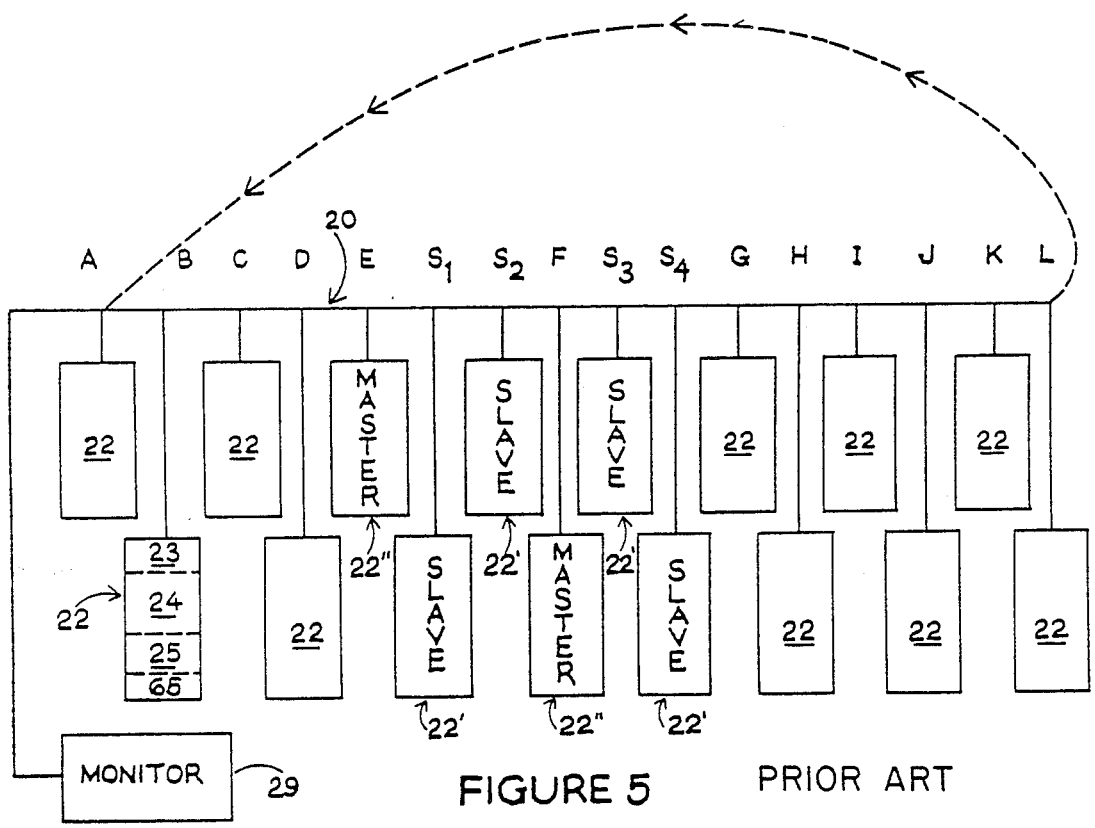
FIG. 3 is a diagrammatic representation of joining two local area networks, each network with its own token list.
FIG. 5 is a block diagram representation of FIG. 4, showing that the slave stations are physically connected to the bus along with other stations which have token access capabilities.
Figure 4:
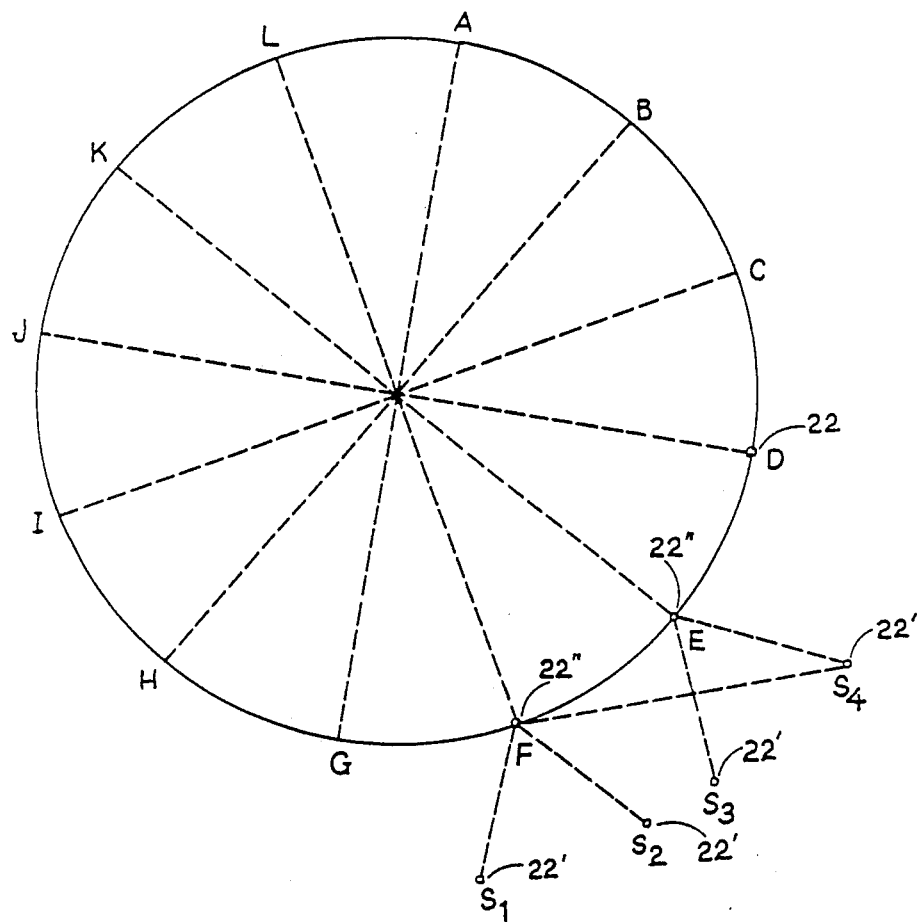
FIG. 4 is a diagrammatic representation of a group of stations linked together in a token list wherein the token is passed from one station to another and also comprising the ability of one or more stations to be in the master state with respect to subservient slave stations, wherein duplicate addresses between master and slave stations is eliminated.
Figure 9:
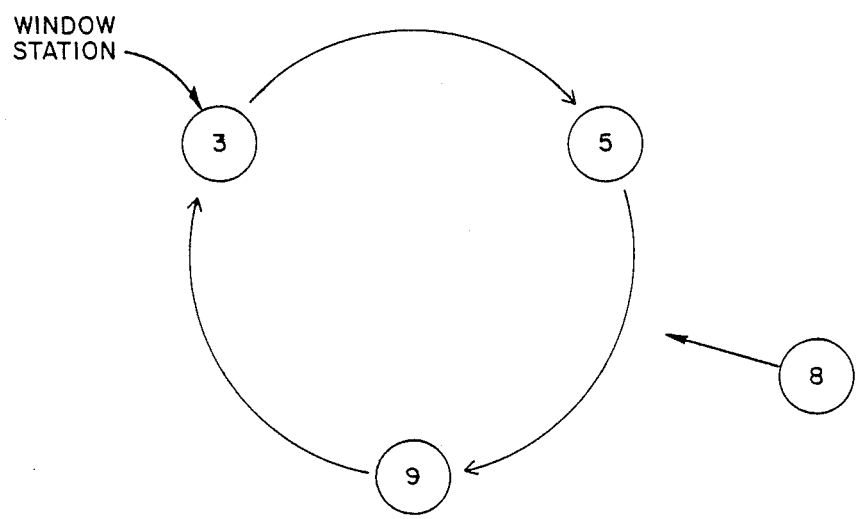
FIG. 9 is a diagrammatic representation of a station attempting to become part of the token list.

Before describing the details of a particular communication system utilizing the present invention, reference should be made to FIGS. 2 and 5 to denote several other features of the present invention. Thus in FIG. 2, and also shown in FIG. 5, a monitor 29 may be utilized and connected to the bus for monitoring the conditions of the bus and stations on the bus. The monitor does not need direct control of the bus nor the stations on the bus but is able to observe the messages on the bus and consequently the state of affairs with respect to the entire communication system. One such use for the monitor is to ascertain the number of stations presently in the token list as well as what the overall access time is between successive token passes to the same station. It can also be used to log the occurrence of stations with duplicate addresses, as discussed more fully below. The monitor may also identify faulty stations due to such signals as their generation of ONLY ONE token passes to themselves as more fully described below.

In order to observe the token passing mechanism of the present invention, reference should be made to FIGS. 20A–25C in combination with Table 2.

In FIGS. 20A–25C each circle represents a state which any particular station can be in at any particular time. It should be realized that each station is in some state but that not all stations are in the same state at the same time. Thus when reviewing FIGS. 20A–25C, it must be realized that a particular station is moving from state to state depending upon particular perceived events by that station and that simultaneously other stations are moving between generally different states due to their individually perceived events. Each station may be observing different events at the same time and may observe the same event in a different manner. This is due in part to propagation delays on the bus; that is, that the propagation of information is limited to approximately 0.7 times the speed of light; therefore not all stations "see" the same information simultaneously (i.e., Einstein's Theory of Special Relativity). Different perception of events may also be due to noise on the bus.

The general sequence of passing tokens between stations in a pre-existing token list is basically the same as that presented in the '688 application. The differences between the token passing mechanism disclosed in the '688 application and the present application will be presented below.

Message Format

Figure 6:
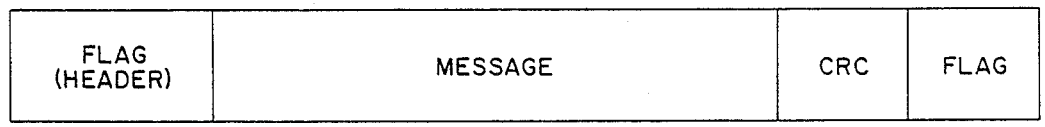
FIG. 6 is a diagrammatic representation of a frame of information sent in an access or non-access message including the first flag (header), a message and an error checking (CRC) frame and a second flag.

One of the differences between the present invention and the '688 application is the message format forming part of the overall data packet. The overall data packet shown in FIG. 6 consists of four parts: a flag field 36 which comprises a header such as a bit pattern 01111110, a message 43 comprising a plurality of bytes, an error correcting field 47 typically of the CRC type comprising a 16-bit frame check sequence, and second flag 49 comprising the same bit pattern as the first flag.

Figure 7:
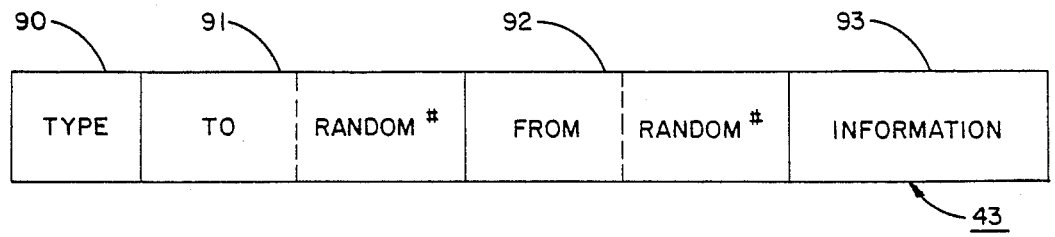
FIG. 7 is a diagrammatic representation of a multibyte message sent in the envelope shown in FIG. 6.
Figure 8:
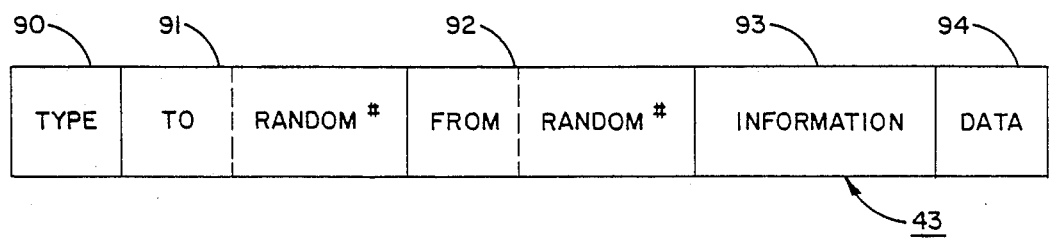
FIG. 8 is a diagrammatic representation of a multibyte message field which, in addition to the information shown in FIG. 7, further has a DATA (augmented information) field which is used for certain types of access messages; such as a WHO'S NEXT message or a LOAD YOUR FROM message.
Figure 16:
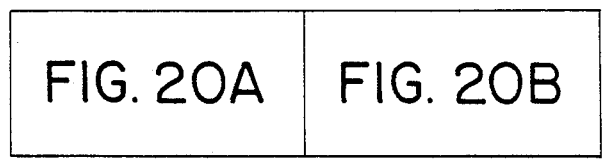
FIG. 16 is a diagram showing how

The message formats are shown in FIGS. 7 and 8 and are detailed in Table 3. The first byte 90 comprises information regarding whether the message concerns an access message or a HDLC message and if it is an access message, the type of access message. The second through third bytes 91 comprises the destination station address (the TO station) for the message, which in the preferred embodiment is a number between 1 and 255. A zero in this byte represents a broadcast message to all stations on the bus. Four additional bytes representing a 32-bit random number of the TO station can also be inserted in this field. The third field 92 comprises two bytes and is the FROM field; that is, the address of the sending station. Four additional bytes representing a 32-bit random number of the FROM station can also be inserted in this field. The fourth field is an information field 93 which can comprise from zero to N bytes comprising particular messages for situations where additional information is required such as a WHO'S NEXT of a LOAD YOUR TO message, where an address needs to be passed from one

TABLE 3

General Access Frame Format

This table describes the format of an access frame.
The format of the frame is as follows:
! Flag ! Type ! To ! From ! Information ! CRC ! Flag !
The flags are one byte.
The Type field is one byte.

TABLE 3-continued

The TO field is 2 bytes. If randomization numbers are used, four additional bytes are entered.

The FROM field is 2 bytes. If randomization numbers are used, four additional bytes are entered.

The Information field ranges from zero to an upper size of 252 bytes. Thus the size of a frame not including the flags and the CRC field is 256 bytes.

Format of the Type Field

The format of the Type field is as follows:
```
7 6 5    ... 0
! !access type!
!  !or data type!
!
```
DATA IDENTIFIER
Bit 7 = 0 if and only if it is an access field
Bit 7 = 1 if and only if it is a data field
The data types are as follows:
data type =  — if and only if it is data only.
data type =  1 if and only if it is data with request for an FCS acknowledge Typical access type codes are presented below:

| Value (code) -Hex- | Access Type |
|---|---|
| 0 | Ring Build |
| 1 | Demanders Enable |
| 2 | Start of Ring (demanders are not enabled) |
| 3 | Resolve Demanders |
| 4 | Participating in resolution |
| 5 | Demand token |
| 6 | Load Your To register |
| 7 | Load Your From register |
| 8 | Load Your To Acknowledge |
| 9 | Load Your To Nack |
| A | Load your From acknowledge |
| B | Load your From Nack |
| C | Select |
| D | Check |
| E | Token reject |
| F | Token pass |
| 10 | Who is next |
| 11 | I am next |
| 12 | I am only one |
| 13 | Supervisory Command |

The Format of the TO Field (without a random number) is,
```
15  14    ...0 15         0
!E!I/G !AA ... A!AAA ... A!
              ! extension  !
              ! (optional) !
```
Bit 15 is the extension bit.
Bit 15 = 1 if and only if there is no extension
Bit 15 = 0 if and only if there is an extension
The 'A's are the address. Here there are 14 address bits for up to 16,383 addresses.
If a random number for the TO station is read, four more bytes containing the random number are appended to the address field.
The I/G bit determines if the address is a multicast or an individual station address.
I/G = 0 if and only if the address is an individual station address.
I/G = 1 if and only if the address is a multicast address
The Format of the FROM Field
```
15  14    ...0 15        0
!E ! C/R!AA ... A!AAA ... A!
              ! extension  !
              ! (optional) !
```
Bit 15 is the extension bit.
Bit 15 = 1 if and only if there is no extension.
Bit 15 = 0 if and only if there is an extension.
The 'A's are the address.
If a random number for the FROM station is used, four more bytes containing the random number are appended to the address field.
C/R bit is the command response bit.
If C/R = 0 if and only if it is a command.
If C/R = 1 if and only if it is a response.

Table 3A describes the various message types.

TABLE 3A
MESSAGE TYPES

RING BUILD (timed length filler)-used by participants in ring build hashing contest DEMANDERS ENABLED-used by demandee (window station) to enable demanders RESOLVE DEMANDERS (level)-used by demandee to sequence multiple demanders through the demand hashing contest PARTICIPATING IN RESOLUTION (address, 32 bit random number)-used by stations participating in demand resolution hashing contest.

DEMAND TOKEN-A token pass that is used only between the demander and demandee.

LOAD YOUR TO (old "TO", new "TO")-command to change a station's "to".

LOAD YOUR TO ACK-acknowledges LOAD YOUR TO.

LOAD YOUR TO NACK-shows refusal to change TO

LOAD YOUR FROM (old "FROM", new "FROM")-command to change a station's FROM.

LOAD YOUR FROM ACK-acknowledges LOAD YOUR FROM.

LOAD YOUR FROM NACK-shows refusal to change FROM

TOKEN ENABLE-used in token pass handshake by present token owner.

TOKEN ACK-used to acknowledge TOKEN ENABLE

TOKEN NACK-used to refuse token (another name for token reject).

TOKEN-used to pass bus ownership.

WHO'S NEXT (failed station#)-used by token owner to find station following its "TO".

I'M NEXT-response to WHO'S NEXT.

I'M ONLY ONE-used by a station that thinks it is the only station that wants to be in the ring.

DLC DATA-indicates the transmission of DLC information.

DLC DATA WITH REQUEST FOR ACK-indicates DLC information that requires an immediate access level acknowledgement.

DLC DATA WITH REQUEST FOR DATA REPLY-indicates DLC information that requires an immediate reply containing more DLC information.

DLC ACK-access level acknowledgement of received DLC DATA WITH REQUEST FOR ACK.

DLC NACK-used by station unable to a receive DLC DATA WITH REQUEST FOR ACK message.

DLC DATA NOT AVAILABLE-returned by station unable to respond with data to a DLC DATA WITH REQUEST FOR DATA REPLY message.

GET OUT OF RING used by the network monitor to command a station to remove itself from the ring.

DEMANDER'S ACK (station address, 32 bit random number) used by a demander to respond to explicit demanders enabled message. Random number used to resolve duplicate station address.

Simplified Token Pass Description

The general protocol for sending tokens between stations in the token list is similar to that in the '688 patent application. That is, the first step for passing the token is for some station such as station A (see FIG. 1) to pass a select signal (signal Value CH, see Table 3) to its TO station; that is, station B. Station B then responds with a check signal (signal value DH) which when received by station A causes station A to send the token signal to station B. At this time station B becomes a token owner and station A enters the WAITING FOR TO ACTIVITY (see FIGS. 25A–25C).

The next step in the token pass message sequence is that the new token owner (station 13) sends any high level data link control message the station might have queued for transmission in its data communication module to some other station and waits for response. It should be noted that the overall time that a particular station owns the token is at least equal to some maximum period of time which is equal to the maximum propagation delay on the bus (delta t, the time to go from one end of the bus to the other, see Table 1, "Timers" for details) plus the amount of time required for a station to receive a request for information, to assemble information and then proceed to transmit it (the Reaction time tr of the receiving station for preparing and sending data). This overall time is typically two to ten milliseconds for a typical length bus of 15,000 feet. Indeed for a 15,000 foot bus, the frequency for data transfer on the bus is selected at 1.544 megahertz (a multiple of a standard communications frequency) which for the typical propagation speed of 0.7 times the speed of light for the bus, provides that the entire message transmitted by any station does not completely ride on the bus; that is, the amount of time given a station to send a message is such that discrete packets of the messages cannot individually ride on the bus simultaneously. However, for higher speeds and greater distances, whole messages can reside on "part" of the bus.

Typically, the maximum amount of time that a station may own the bus varies depending upon the particular needs of the station. Thus typical token ownership times vary from 2 to 10 milliseconds. Due to the fact that each station has a maximum token ownership time and since the number of stations in the token list can be ascertained, the concept of a guaranteed access time is achieved. Thus, in a simple example where four stations are in the token list, if the stations respectively have a 10 millisecond, a 2 millisecond, a 3 millisecond and a 5 millisecond token ownership time, there is a 20 millisecond guaranteed access time. That is, within 20 milliseconds each of the four stations will have ownership of the token if the token is being passed successfully. It should be noted that if a station completes its HDLC messages (including any responses thereto) within a time period less than its token ownership time, the station immediately proceeds to pass the token to its TO station. This is pointed out in steps 6 and 7 of Table 2 and FIG. 10 of the '688 application. The token pass message sequence can also be visualized with reference to FIGS. 25A–25C and Table 2. Thus, if we assume station A to be the token owner, station A is in the TOKEN OWNER state shown in FIG. 24B. It performs any necessary DLC work (a DLC MASTER state 120) and then goes to the TOKEN PASSING state 146. If a successful token pass is achieved, station A enters the WAITING FOR TO ACTIVITY state 154) and if it observes that station B is active (that is that it has accepted the token), station A enters the IN RING state 140.

Figure 24A:
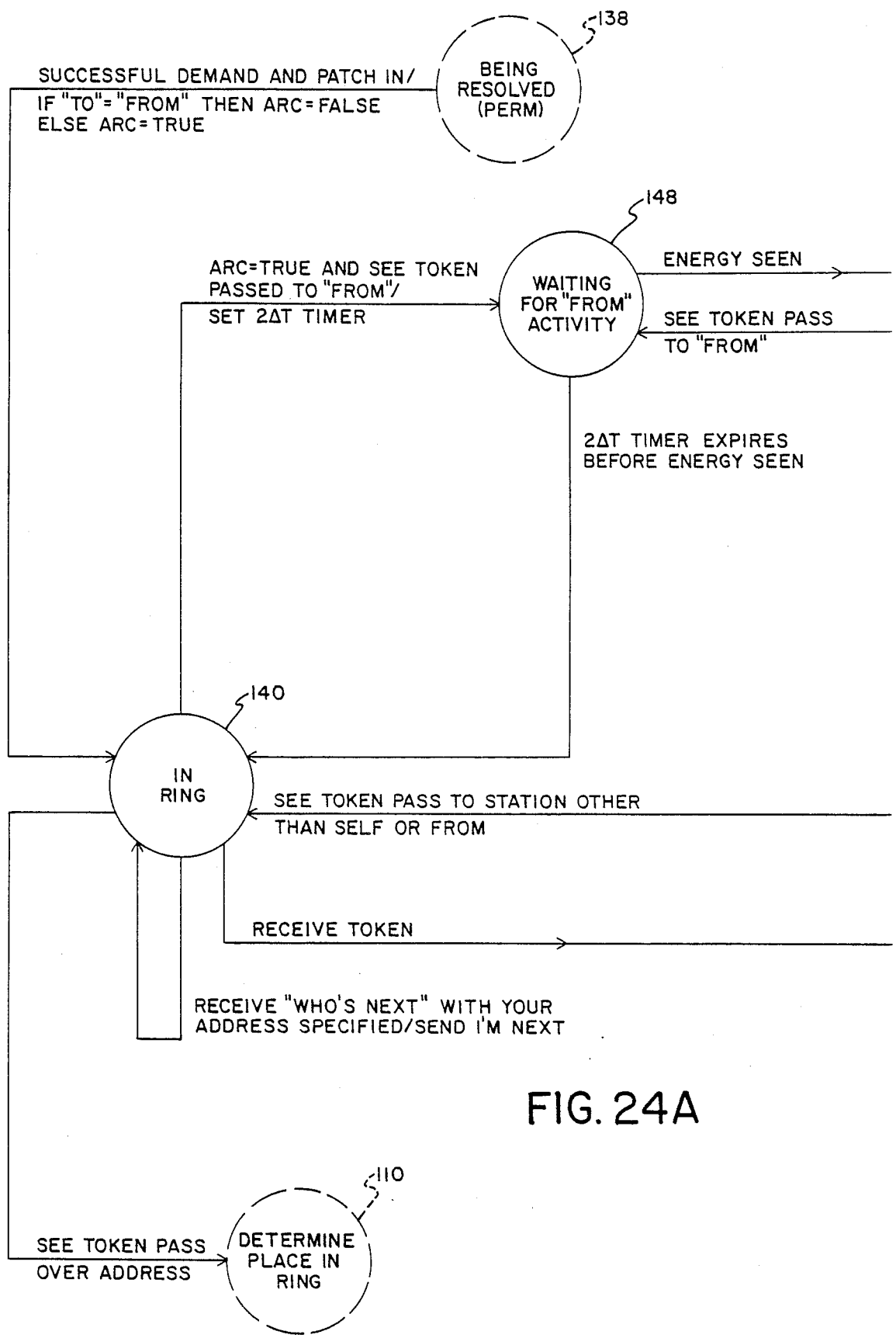
FIGS. 24A and 24B are put together.
Figure 24B:
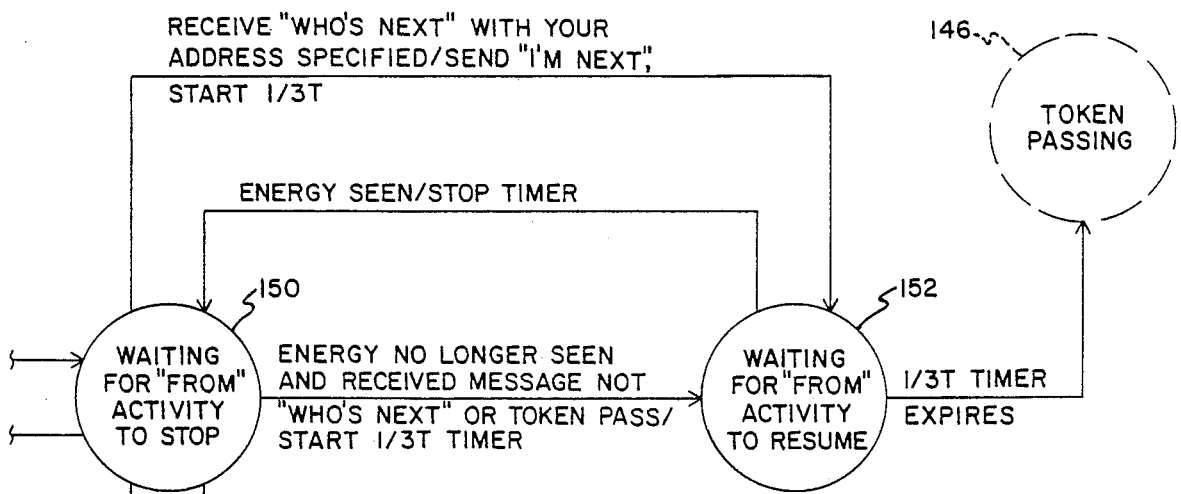
Figure 24B:
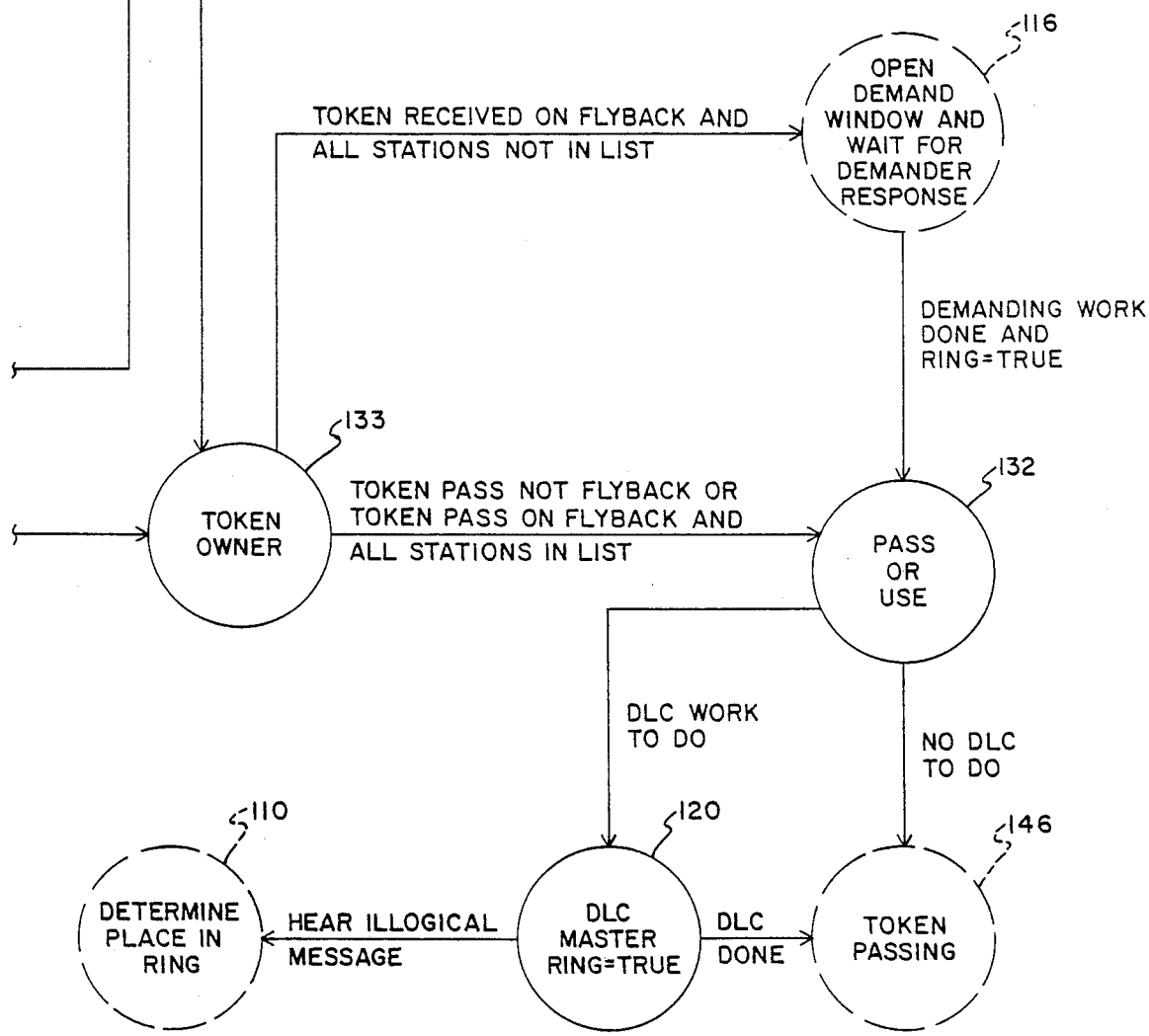

As seen in FIGS. 24A–24B, from station B's perspective, when station A receives the token, station B goes from the IN RING state 140 to the WAITING FOR FROM ACTIVITY state 148. When station A completes its DLC work, station B receives a token signal and thus proceeds to the TOKEN OWNER state 133.

Station B similarly enters the DLC MASTER state and proceeds to transmit any high level messages which it may have queued in its transmit buffer in the communication module 25 (FIG. 2). Station A upon seeing proper operation of Station B enters the In Ring state 140. Upon completion of the transmission of its messages or upon the expiration of its token ownership time slot, station B attempts to pass the token to its TO station, namely station C. This process continues for all stations in the token list.

The other stations shown in circle 27 of FIG. 1 are in the IN RING state. Stations G' and G" are not in the token list since they are slave stations.

The above description of token passing assumes that each station correctly receives the access messages from its FROM and TO stations, and that everything is working in a pristine error-free environment. Further on, discussion concerning the particular states that are entered depending upon perceived errors by the stations is presented. In order to obtain the desired communication system it is disclosed that the failure of any single station does not cause the overall communication system to stop functioning. Furthermore, the capability of the present invention provides for the reinitialization of a token list depending upon certain perceived events, including multiple station failures and failure in the communication medium, namely the bus.

Improvements of the Present Invention

The present invention provides a different form of initialization ("hashing") than that described in the '688 application and further provides an explicit demanding window by a particular station in the token list rather than through multiple demander windows as described in the '688 application. Other improvements concerning the ability to differentiate duplicate addresses, additional priority bits associated with the station for use during hashing, orderly power down of stations so that patch out can be obtained prior to shut down of the station, and the ability for stations in the token list during initialization to transmit and receive DLC messages are all new aspects of the present inventin. The definitions for terms used through this description are presented in Appendix A. Reference documents that are useful for understanding the background of the present invention are presented in Table 4.

Table 4

REFERENCES (A) IEEE 802 Local Network Standard, Draft One
(B) Local Area Networks Overview-Part 1: Definitions and Attributes by J. Michael Kryskow and C. Kenneth Miller, Computer Design, February, 1981
(C) Local Area Networks Overview-Part: Standards Activities by J. Michael Kryskow and C. Kenneth Miller, Computer Design, March, 1981

Initialization of a Token List Using Hashing

Figure 20A:
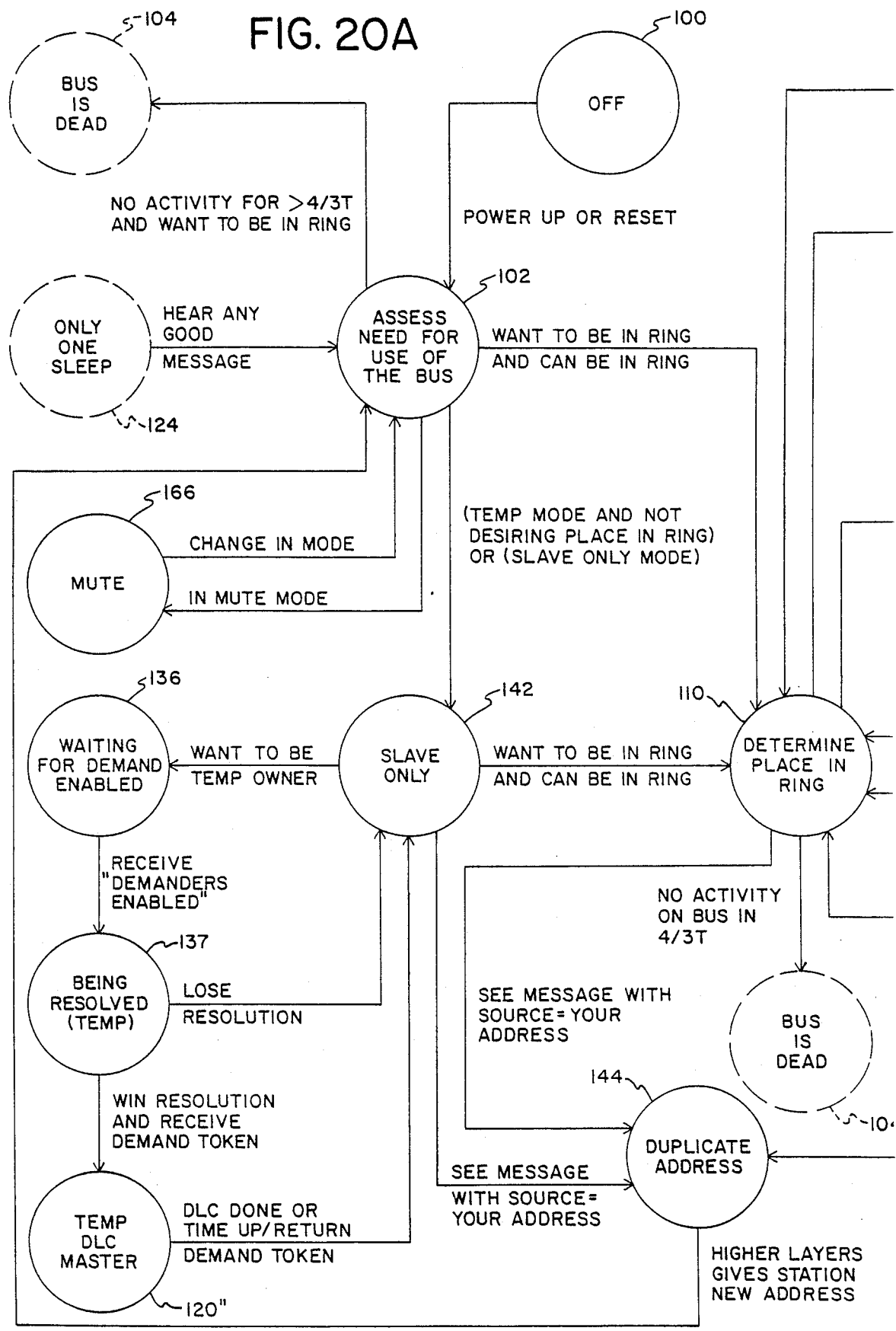
FIGS. 20A and 20B are put together.
Figure 20B:
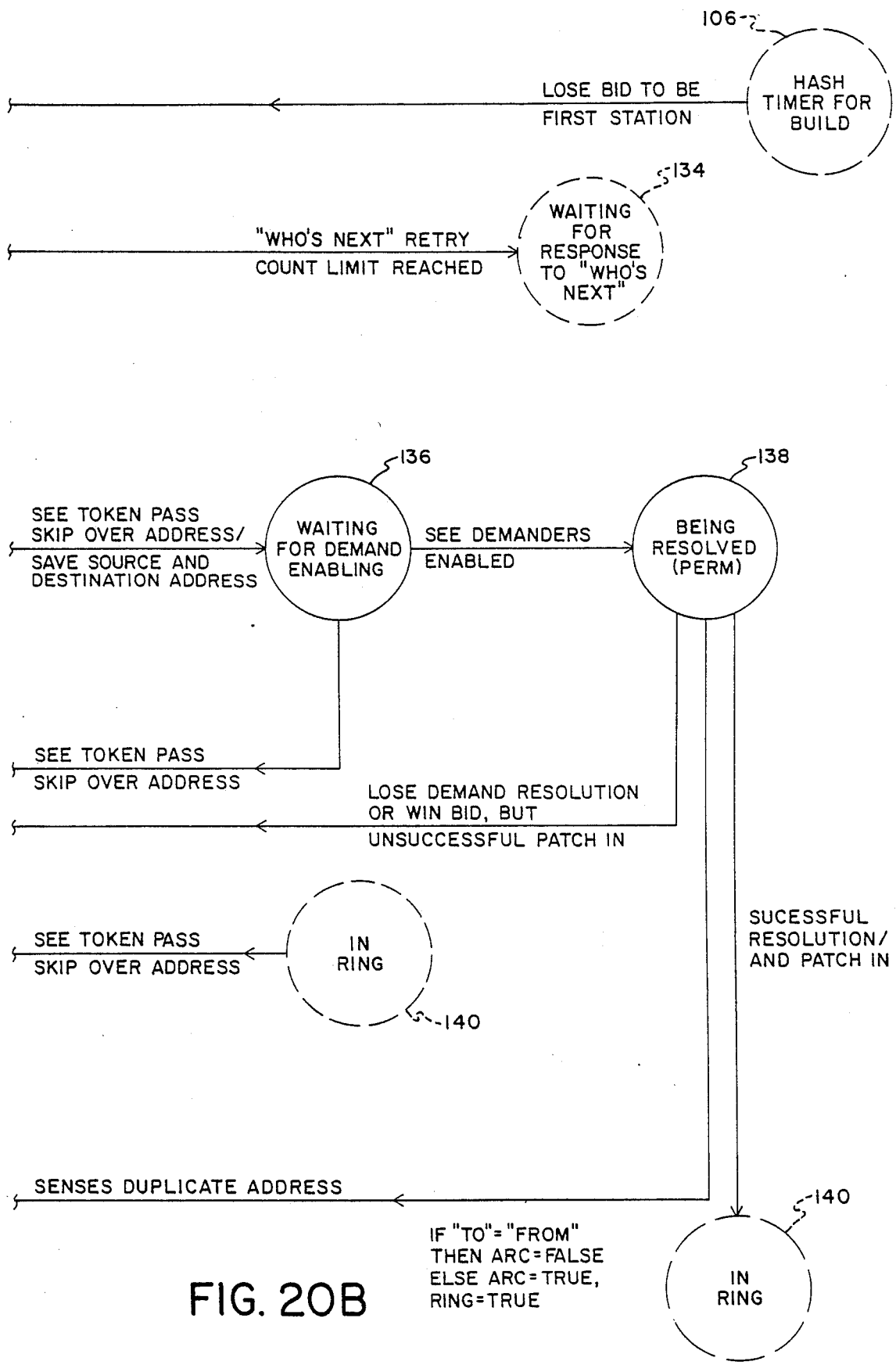
Figure 21A:
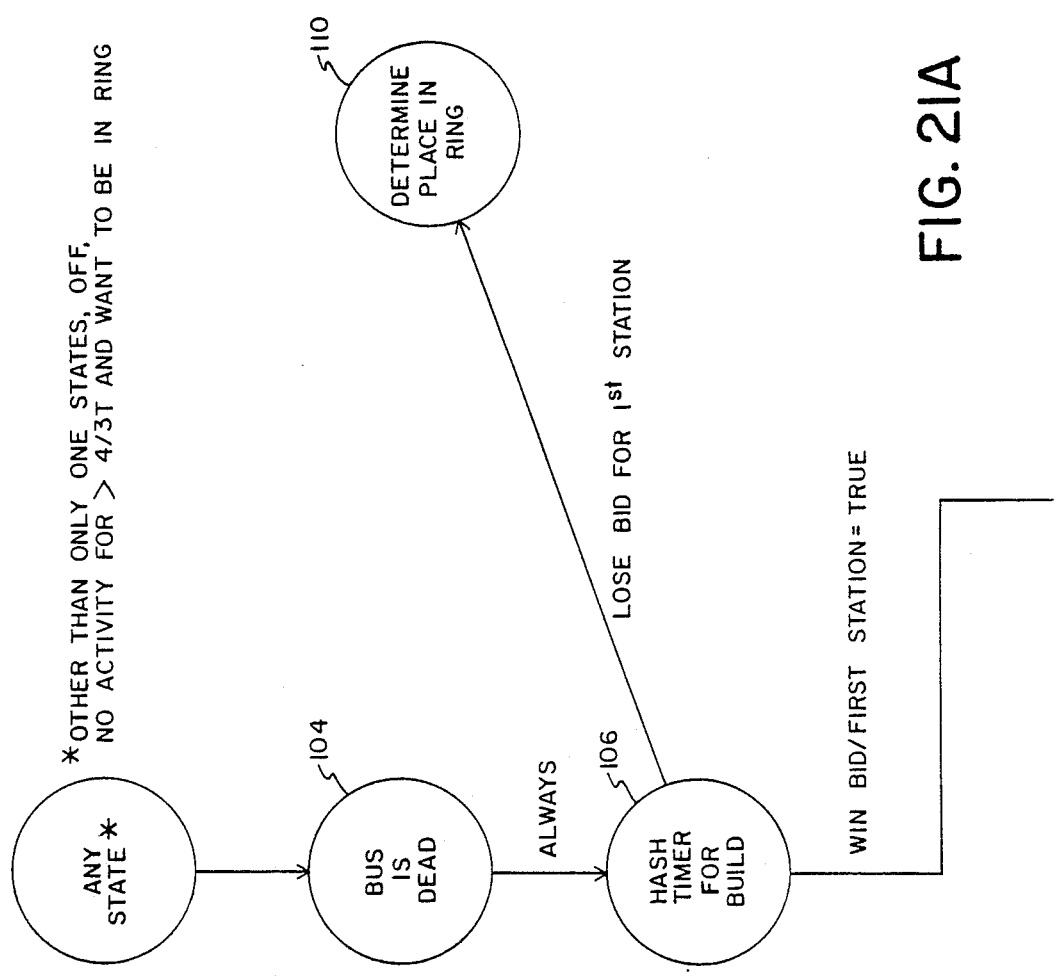
FIGS. 21A and 21B are put together.

As best seen in FIGS. 20A and 20B, a station is in the OFF state 100 (see Table 2-2) before power up. Once power has been received (event power up or reset) it enters the ASSESS NEED FOR USE OF THE BUS state 102 (see Table 2-3). If no activity is heard on the bus for greater than four-thirds T (see Table 1 for description of the various timers and timeouts) and if the station wants to be in the token list (ring), it enters the BUS IS DEAD state 104 (see Table 2-4). This state always changes to the HASH TIMER FOR BUILD state 106 as shown in FIG. 21A (see Table 2-4). It is in this state that the station participates in a form of contest to determine the first station to enter the ring. As shown in FIG. 10, a bit-by-bit comparison is made by each station which desires to be in the ring. Thus the station's address 108 is divided into one bit fields. If the station's most significant bit is a 1, it transmits a message for a duration of time equal to twice the round trip time of the bus (see Table 1 section on timers). This time is computed by the length of the bus and is known to each station physically connected to the bus.

Each station which has a 1 in its most significant bit then reads its next bit to enter the next round of the hashing contest (the bit read by each station is at the time of sending called the "hashing bit"). If the most significant bit of any station is zero, that station waits for one round trip time and then looks at the energy level on the bus. If there is energy on the bus (indicative of one or more stations transmitting messages because they had a 1 in their most significant bit), each station with a zero in its most significant bit determines that it has lost the hashing contest and enters the DETERMINE PLACE IN RING state 110 (see FIG. 21A). However, if a station with a zero in its most significant bit sees no energy on the bus, the station waits another round trip time, reads its next bit and enters the next round of the contest. In this situation other stations may be in the hashing contest but each had a zero in the hashing bit.

Thus for each bit in the station's address, a determination is made whether to send a message (a one is present) or to wait and listen to the bus (a zero is present). At any point where the station has a zero in its bit and it hears energy on the bus, it knows it has lost the contest and enters the DETERMINE PLACE IN LIST state. The station which successfully participates in all rounds of the hashing contest wins the contest and enters the FIRST STATION IN RING state 112 (see FIG. 21B, Table 2-6).

FIG. 10 shows a typical example where four stations (stations 2, 3, 4, and 4, for example) have entered the BUS IS DEAD and have proceeded to the HASH TIMER FOR BUILD state 106 (Table 2-5). The most signficant (leftmost) bit (MSB) for each of the stations is a one and consequently, each station transmits a message onto the bus for period of time equal to twice the round trip time. Each station then proceeds to read its next bit. At this point, station 1 reads a zero and therefore listens to the bus after waiting one round trip time. Stations 2, 3, and 4 each have a one in this bit and consequently transmit a message for two round trip times. Station 1 sees energy on the bus and therefore knows that it has lost the contest and proceeds to enter the DETERMINE PLACE IN RING state 110 (see Table 2-30) Station 1 is no longer in the contest and therefore stations 2, 3, and 4 are left.

Stations 2, 3, and 4 each have a one in their third most significant bit and consequently transmit energy on the bus. At the fourth most significant bit, station 2, has a zero and stations 3 and 4 have ones. Station 2 consequently listens to the bus and hears energy and enters the DETERMINE PLACE IN LIST state 110. At this point, stations 3 and 4 are left in the ring. At the fifth most significant bit, both 3 and 4 listen to the bus but since no energy is heard on the bus, they read their next bit which is also a zero. This continues for all sixteen bits of their address. At the least significant bit, station 3 listens and station 4, due to a one in its hashing bit, transmits a message.

Station 3 hears this message and consequently enters the DETERMINE PLACE IN RING state. Station 4 declares itself the winner since no further bits are left in the address field. At this point, station 4 enters the FIRST STATION IN RING state 112 (Table 2-6) and proceeds to the FIRST STATION PASSING TO SELF state 114 (see Table 2-7). While in this state, the station passes the token to itself and considers the token passed to be what is known as a flyback token pass; that is, a token pass from the highest address station to the lowest address station. At this point because it is considered a flyback token pass, the first station enters the OPEN DEMAND WINDOW and WAITING FOR DEMANDER RESPONSE state 116 (see Table 2-11).

As shown in FIG. 11, the hashing contest can include a random number (typically 32 bits) associated with each station. In this case each corresponding bit of the station addresses is compared and if a hashing winner is not determined then the random numbers of each participating station are compared in a similar bit-by-bit manner.

FIG. 12 shows a further variation of the hashing technique where priority bits (typically 2 bits) precede the station's address. These bits are first used in the hashing contest. By forcing these bits to one's, some group of stations is assured to win if the remaining group of stations have one or more zeros for these priority bits.

Figure 21B:
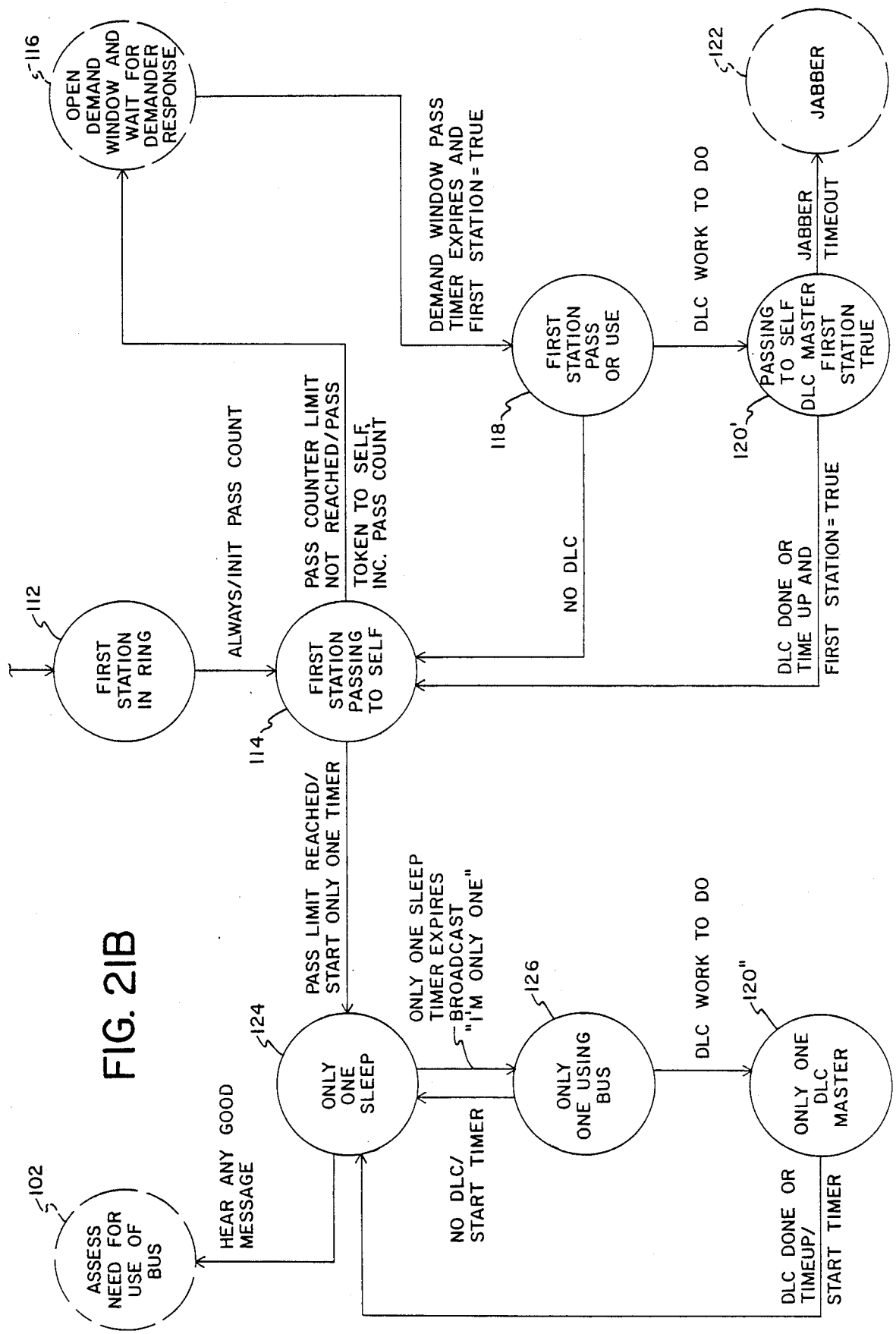

While the first station is in the OPEN DEMAND WINDOW and WAIT FOR DEMANDER RESPONSE state 116, if its demand window pass timer expires, it enters the FIRST STATION PASS OR USE state 118 (see FIG. 21B and Table 2-8). The reason for this state transition is that the first station did not receive any response to its open demand window which in essence is a DEMANDER'S ENABLED signal that invites other stations to demand entry into the token list. This aspect of an explicit DEMANDER'S ENABLED signal is described later.

Referring again to the FIRST STATION PASS OR USE state 118 in FIG. 21B, the first station may then decide to perform data link control work (that is to send high level messages to other stations) even though they are not in the token list. It should be noted that it is not necessary for a station which has token ownership to only transmit messages to other stations which are in the token list and indeed, the situation may often exist where the token owner station communicates DLC messages with non in-list stations. If the first station decides to perform DLC work, it enters the PASSING TO SELF DLC MASTER state 120 (See FIG. 21B and Table 2-36). Once the DLC work is complete or the DLC timer times out, the first station returns to the FIRST STATION PASSING TO SELF state 114. If for some reason, that station continues to transmit messages even though the DLC timer has timed out (that is there is a fault in the DLC timer) a hardware "jabber" timeout associated with the overall hardware (see block diagram coils and contacts 205, 205' 206 and 206' FIG. 15) provides a backup timeout. When this occurs, the station exits the PASSING TO SELF DLC MASTER state and enters the JABBER state 122 (FIG. 23B, Table 2-43) where it remains until repaired. In this state, its transmitters 208 and 209 (FIG. 15) are physically disconnected from the bus and consequently cannot interfere with other stations. The JABBER TIMEOUT and JABBER state are reached for any state including the PASSING TO SELF DLC MASTER state whenever the jabber timer times out.

Referring again to FIG. 21 and the situation where the first station is in the FIRST STATION PASSING TO SELF state 114 as a result of DLC work being completed or the DLC timer timing out, the first station continues to enter the OPEN DEMAND WINDOW AND WAIT FOR DEMANDER RESPONSE state 116 until its pass counter reaches some limit N corresponding to the maximum number of token passes to itself. At this point, the first station enters the ONLY ONE SLEEP state 124 (see Table 2-9). In this state, the station starts an ONLY ONE timer (see Table 1 section on timers) which is set to be much longer than the bus dead timeout so that other stations which desire to enter the ring are able to do rebuilding procedures without the station in the ONLY ONE SLEEP state from interfering on a frequent basis. If, however, the ONLY ONE SLEEP timer expires, the station issues a broadcast message to all other stations indicating that it perceives itself to be the only one on the bus and enters the ONLY ONE USING BUS state 126 (see Table 2-10). If, however, while in the ONLY ONE SLEEP state, it hears any good message on the bus, the station exits to the ASSESS NEED FOR USE OF BUS state 102 (see FIG. 20A). At this point, if it wants to be in the ring, it enters the DETERMINE PLACE IN RING state 128 (FIG. 20B and Table 2-30). Further details regarding the actions taken in the DETERMINE PLACE IN RING state 121 are presented later.

Referring now to the ONLY ONE USING BUS state 126, the station can, if it wishes, do DLC work. In this case, it enters the ONLY ONE DLC MASTER state 120'' (see FIG. 21B). If while in the ONLY ONE USING BUS state 126, the station does not wish to transmit any DLC messages, it starts its ONLY ONE timer which upon timeout returns it to the ONLY ONE SLEEP state 124. If, however, it did go to the ONLY ONE DLC MASTER state and the DLC work is done or the DLC timer has timed out, it returns to the ONLY ONE SLEEP state 124.

This completes the explanation of a station starting an initialization procedure and includes both obtaining the winner of the hashing contest as well as the events taken depending upon whether other stations wish to enter the token list.

Explicit Demand Window

As explained earlier, there exists an OPEN DEMAND WINDOW AND WAIT FOR DEMANDER RESPONSE state 116 in which new stations can enter the token list. This state can be reached from the FIRST STATION PASSING TO SELF state 114 as well as from a token owner who has received a flyback token. Such a token owner is, in the preferred embodiment, the station with the lowest address which is in the token list. This station is sometimes referred to herein as the window station. If such a token owner receives the token, it sends out a DEMANDER ENABLE signal and opens the demand window, entering the OPEN DEMAND WINDOW AND WAIT FOR DEMANDER RESPONSE state 116. Since only one station can open the demand window when a token list exists, the possibility of noise being received by multiple demand windows is greatly reduced. Furthermore, the speed of transfer of the token is increased since only one station in the token list has the responsibility of opening the demand window.

Figure 26:
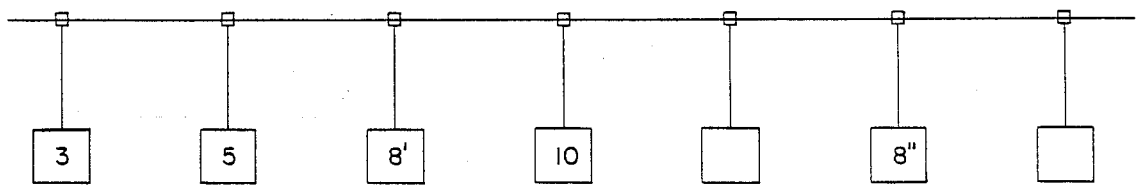
FIG. 26 is a diagrammatic representation of duplicate address stations attempting to demand in at the same time.

Once the demand window is opened, any station wishing to become a member of the token list may issue a message requesting the same. If the window station sees only one good message (that is it does not see noise nor does it see silence), it enters the WAITING FOR DEMANDER TO USE TOKEN state 128 (see Table 2-13). Before entering this state, the window station sends the demand token to the station from whom it received a good demand message. This demand token contains not only the address of the station, but also the randomization number associated with that station as received by the window station (see FIG. 11). Only if that randomization is equal to the demander's randomization number, will that demander station accept the demand token. This prevents duplicate address stations from both receiving a token from the window station. This is shown conceptually in FIG. 26 where station 3 is the window station and stations 8' and 8'' issue a demand message upon seeing the DEMANDER ENABLE signal. If for some reason, station 3 only perceives the demand in signal from station 8' (due to its proximity to station 8' as opposed to station 8'') and issues a demand token, this demand token contains the randomization number associated with station 8' but not that of station 8''. Station 8'' upon seeing its address returned with the demand token, but with a different randomization number, perceives that there is a duplicate address station on the bus, and will then take corrective action (typically by interfacing or informing a monitor 29 of some other device). Corrective action can then be taken to change the address of the DUPLICATE ADDRESS station. However, it is important to note that the DUPLICATE ADDRESS station does not receive or cannot use the demand token and consequently, interruption of service on the bus is eliminated. This aspect of the present invention in which the randomization numbers are utilized by the stations in the passing of the token is a new feature of the present invention.

Referring again to FIG. 22, if the window station perceives noise during the demand window, it enters the RESOLVING DEMANDERS state 130 (see Table 2-12). In this RESOLVING DEMANDERS state, a hashing procedure is performed similar to that during initialization. That is each demander hashes its address one bit at a time to determine whether or not a one or a zero exists. If a one exists, the station issues a demander's message. If a zero exists, that station listens to the bus for energy. If energy is perceived, it realizes it has lost the contest and is no longer a demander. The winning station receives the demand token from the window station so that the window station enters the WAITING FOR DEMANDER TO USE DEMAND TOKEN state 128. If no winner is found in the demander hashing procedure and if the ring exists, then the window station enters the PASS OR USE state 132 (see Table 24). If however, no winner is found and the first station is true (that is, there is no ring and only one station is attempting to build the ring), that station enters the FIRST STATION PASS OR USE state 114.

Finally, if the window station while in the WAITING FOR WINDOW state see no activity on the bus for a time equal to $2 \wedge t + tr$ (where the $2 \wedge T + tr$ corresponds to a stop timer set by the station when it enters the WAITING FOR DEMANDER TO USE TOKEN state) and if the first state equals true, it enters the FIRST STATION PASS OR USE state 114. The station similarly enters this state if it receives a demand token and if the first station equals true condition also exists.

If the window station sees no activity on the bus for $2^\wedge t+tr$ and the ring exists, it enters the PASS OR USE state 124. It similarly enters the PASS OR USE state 124 if it receives the demand token and the ring is true. As long as the window station sees demander activity, it remains in the WAITING FOR DEMANDER TO USE DEMAND TOKEN state.

If the demand window station knows the maximum configuration of the overall local area network (that is, the maximum number of stations in the network), it can under certain circumstances eliminate the DEMANDER ENABLE signal altogether. Indeed, if the window station sees that all stations which can be in the token list are in the token list there is no longer a need for issuing a demander window and thus the window station instead of proceeding to the OPEN DEMAND WINDOW state 116 proceeds to the PASS or USE state 124. When in the PASS or USE state, the station if it wishes to do DLC work, enters the DLC MASTER state 120. Once its work is completed, it enters the TOKEN PASSING state 146 (see Table 2-19). If in the DLC MASTER state it hears an illogical message on the bus, it enters the DETERMINE PLACE IN RING state 110, as discussed earlier.

Determining Place in Ring

As mentioned earlier, a station can enter the DETERMINE PLACE IN RING state 128 due to its assessing the need for use of the bus and wanting to be in the ring (see FIGS. 20A AND 20B). As set forth in Table 2, a number of other states may exit to the DETERMINE PLACE IN RING state, namely the HASH TIMER FOR BUILD state 106 with the station losing the opportunity to be the first station, a station in the WAIT FOR RESPONSE TO "WHO'S NEXT" state 134 (see Table 2-29), the WAITING FOR DEMAND ENABLING STATE 136 (see Table 2-31) where the station waiting for the DEMAND ENABLING sees the token, skips over its address and the retry count limit has been reached, the BEING RESOLVED PERMANENT state 138 (see Table 2-32) wherein the station in that state loses the demand resolution, and the IN RING state 140 (see Table 2-42) wherein the station in that state sees the token pass over its address. As is noted, many of these states and their associated events bring the station to the DETERMINE PLACE IN RING state 110. These states typically concern possible faulty conditions which may exist on the bus. Thus, a station in the IN RING state should normally not see the token pass over it. However, if it does, it must enter the DETERMINE PLACE IN RING state in order to reinitialize itself in the token list.

One other condition which can lead to entering the DETERMINE PLACE IN RING state 110 is where a station is previously in the SLAVE ONLY state 142 (see Table 2-39). The SLAVE ONLY state corresponds to a station which normally does not have the ability to be a DLC master and consequently normally cannot be in the ring. However, as shown in FIGS. 20A and 20B, a station on entering the ASSESS NEED FOR USE OF BUS state 102 can determine that it does not want to be a permanent member in the ring (that is, it is in the temporary mode), and still enter the SLAVE ONLY state 142. If such a temporary mode station is in the SLAVE ONLY state, and if it wants to be in the ring and can be in the ring, it then enters the DETERMINE PLACE IN RING state 110.

A station in the DETERMINE PLACE IN RING state 110 normally waits for the token pass to skip over its address in which case it saves the source and destination of the token as it passes over it. The source destination will become that station's FROM station and the destination address will become that station's TO station when it patches itself into the ring. If the station sees the token pass over its address, it enters the WAITING FOR DEMAND ENABLING state 136. While in the WAITING FOR DEMAND ENABLING state, if the station sees a DEMANDER ENABLE signal (that is, the signal sent out by the window station upon its receipt of the token), it enters the BEING RESOLVED state 138 (see Table 2-32) so as to determine its place in the token list. If the station while in the BEING RESOLVED PERMANENT state 138 successfully patches itself into the ring (that is, it won the hashing contest with the other demanders if more than one demander sent a demand signal to the window station), it enters the IN RING state 140. If, however, it lost the demand hashing content, it returns to the DETERMINE PLACE IN RING state 110 so that it can then go back to the WAITING FOR DEMAND ENABLING state upon seeing the token pass over it and then to the BEING RESOLVED state 138 after seeing a DEMANDER ENABLE signal. This process continues until the station is able to successfully patch itself into the ring.

Two other situations can exist for the DETERMINE PLACE IN THE RING. One is where the station sees no activity on the bus for a time equal to four-thirds T. This four-thirds T represents the bus timeout period and whenever silence on the bus is seen for this period of time, the station enters the BUS IS DEAD state 104. The consequences of this state are described more fully below. The other possibility when in the DETERMINE PLACE IN RING state 110 is that the station perceives itself as having a duplicate address as that of another state. That is, it sees a message wherein the source of that message has an address equal to the present station's address. In this situation, the station enters the DUPLICATE ADDRESS state 144 (see Table 2-40). It remains in this state until the higher layers in the data communication protocol transfers a new station address to that station. Once this occurs, the station can then proceed to the ASSESS NEED FOR USE OR WIRE state 102 so as to then proceed to determine its place in the ring by proceeding to that state 110.

The One-Third, Two-Third, Three-Third, Four-Third T Timer

As disclosed in the '688 application, the one-third T, two-third T, three-third T and four-third T timer is used to determine actions to be taken by stations in the network. For instance, a station which has observed that its FROM station has received the bus but is not transmitting, it starts the one-third T timer. If this timer expires, the stations enters the TOKEN PASSING state 146 (see FIGS. 24A and 24B). The sequence of events in this particular instance is for the station to proceed from the WAITING FOR FROM ACTIVITY state 148 to the WAITING FOR FROM ACTIVITY TO STOP state 150 (Table 2-15) to the WATCHING FOR FROM ACTIVITY TO RESUME state 152 (Table 2-16). In this way, the ring is kept robust.

However, one possibility for potential problems is that another station is similarly watching the FROM station thinking that that FROM station is its FROM station. In this situation, two stations could potentially try to access the token and indeed, would try to pass it to their respective TO stations when the one-third T timers timed out respectively in each station. In order to prevent this, the present invention further utilizes the randomization number, or a subset of the randomization number associated with the address, to randomize its one-third, two-third, three-third and four-third T timer (see FIG. 15). Consequently, even if two stations each perceived the FROM station as its FROM station, one would proceed with token passing before the other. This would be sensed by the later station so that it would ascertain that a problem exists in its placement in the list so that corrective action can be taken by it entering the DETERMINE PLACE IN RING state 110.

Figure 25A:
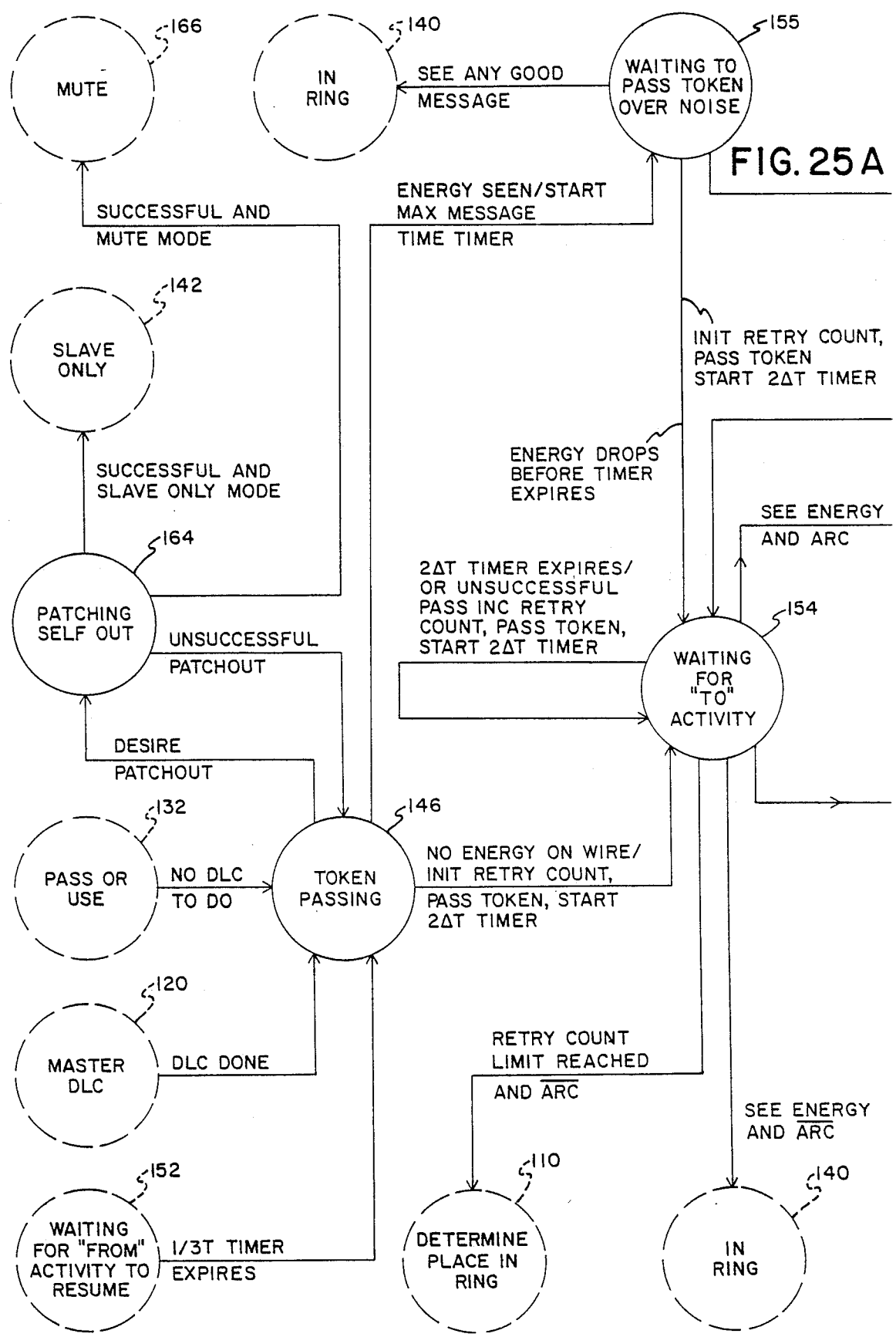
FIGS. 25A, 25B and 25C are put together.

Similarly, the two-third T timer is used by a token owner station to observe its TO station. As shown in FIGS. 25A, B, and C, such a situation begins with a station going from the TOKEN PASSING state 146 to the WAITING FOR "TO" ACTIVITY state 154 (see Table 2-24). If activity is seen by the station in this state, it enters the WAITING FOR ENERGY TO DIE AFTER TOKEN PASS state 156 (see Table 2-25). While in this state, if the energy died and there is noise present, it enters the WAIT FOR MORE ENERGY AFTER TOKEN PASS state 158 (see Table 2-26) where its two-third T timer is started. If this timer expires, the station enters the FINDING NEXT STATION state 160 (see Table 2-27) so as to determine the next station to receive the token, by issuing a WHO's NEXT broadcast signal. Again, the two-third T timer is randomized for that particular station so that even if another station perceives itself in the WAITING FOR "TO" ACTIVITY state 154, it does not, after entering the WAIT FOR MORE ENERGY AFTER TOKEN PASS state 158, have its two-thirds timer timeout at the same time as the previous station. Therefore, only one station will timeout and the other station will be aware of this and the token will be properly passed rather than improperly passed to more than one station.

A similar situation exists for the three-thirds T timeout associated when a station is in the WATCHING BUS FOR EVIDENCE OF RING AFTER A NOISY PASS state 162 (see Table 2-23). In such a situation, the station enters the TOKEN PASSING state 146. However, more than one station can be in such a state and therefore the randomization of its timer prevents both of them from entering the TOKEN PASSING state simultaneously.

Orderly Patchout During Power Failure at a Station

Since there is a maximum configuration of the local area network in terms of stations which can be on the bus, there is a maximum access time for each station to receive the token when in the token list (see Table 1 for further details). Due to this maximum access time to receive the token, it is possible for a station, upon realization that its input power has failed, to take appropriate steps to patch itself out of the token list if it is in the token list. This is especially useful where multiple sequentially passing token stations lose AC power simultaneously; for otherwise the failure of such sequential stations would necessitate reinitialization of the token ring. It does this by maintaining DC power (via capacitors or some other equivalent technique) so that it can proceed through the PATCHING OUT steps of the access mechanism. Thus as shown in FIG. 25A, once this station is in its TOKEN PASSING state (that is, it has received the token from its FROM station) and a power failure has occurred, it proceeds to patch itself out of the token list by entering the PATCHING SELF OUT state 164 (see Table 2-29). Of course, a station could desire to patch itself out of the token list for other reasons such as it no longer wishes to transmit DLC messages.

Once the station is in the PATCHING SELF OUT state, it proceeds to the MUTE state 166 (see Table 2-41) or it enters the SLAVE ONLY state 142 if the station wants to be in the SLAVE ONLY mode (see Table 2-39).

Joining of Rings

As seen in FIG. 3, it is possible that two separate token rings 35 and 35' exist and that they are joined together such as by a pair of coaxial cables. In such a situation, the prior art (such as the '688 application) would proceed by having the stations pass the token and observe noise on the line (multiple messages) and enter the BUS IS DEAD state, so as to reinitialize the token list. The present invention through use of the variable timers associated with the one-third, two-third, three-third and four-third T timer is able to eliminate the stations from entering the BUS IS DEAD state and reinitializing. It does this since although two stations at the time of joining are stations to next receive the next respective tokens; that is, they are waiting for a "Who's Next" or "Token Pass" signal, only one of their one-third T timers will timeout first and consequently that station will pass the token to its TO station while the other one will observe this and realize that the token has been passed and thus will enter the DETERMINE PLACE IN RING state 110. This greatly facilitates ring rebuilding since the stations which want to be in the list can proceed to enter an existing token list rather than all stations entering the BUS IS DEAD state and then proceeding with an initialization hash.

Figure 14:
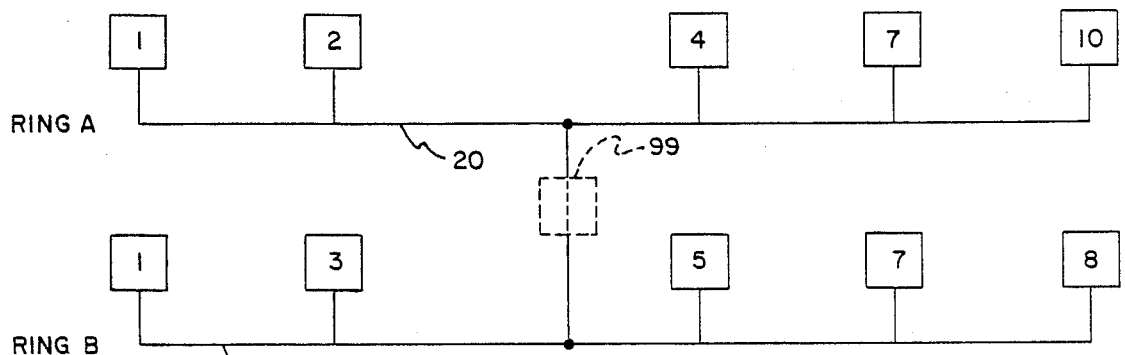
FIG. 14 is a diagrammatic illustration of two busses (local networks) joined via a tap and the members of the token list for each network just prior to joining.
Figure 18:
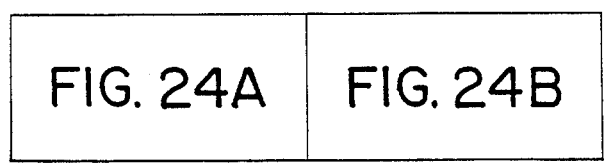
FIG. 18 is a diagram showing how

An example of ring building is shown in FIG. 14. In this example, a Ring A has stations 1, 2, 4, 7 and 10 in the token list (there may be other stations on bus but only these five stations are passing the token between themselves). Ring B has its own stations 2, 3, 5, 7 and 8 passing the token between themselves (again, other stations may be on the bus but are not in the B token list). In this example, it is assumed that the buses 20 and 20" are joined via a tap 99 as shown conceptually in the FIGURE. It is also assumed that at the time the buses are joined, station 2 in ring A is in the WAITING FOR FROM ACTIVITY TO RESUME state 152 and that station 7 in ring B is in a similar state.

This example could be presented where these two stations are in different portions of the WATCHING FROM group of states (see Table 2 and FIGS. 24A and 24B) but the example as given shows the flexibility of the present invention by giving a form of worst case situation. Since station 2 in Ring A and station 7 in Ring B have a random number associated with the time duration for their one-third T timer, one of them will have their ⅓T timer timeout before the other if neither of them sees energy on the bus prior to the ⅓T timeout. For purposes of explanation, it is assumed that the station 7 timer times out first due to no energy being seen on the combined bus 20 and 20''. In this particular case, station 7 of Ring B then enter the TOKEN PASSING state 146. Since station 2 in Ring A has seen energy before its ⅓T timer has expired, it enters the WAITING FOR "FROM" ACTIVITY TO STOP state 150 (see also Table 5).

In the next stage station 7 in Ring B passes the token to its TO station, starts its TO delta T timer and enters the WAITING FOR "TO" ACTIVITY state 154 (see FIGS. 25 A,B, & C). Thus station 8 in ring B receives the token from station 7 in ring B while station 2 in ring A remains in the WAITING FOR "FROM" ACTIVITY TO STOP state 150 until it sees the token pass from station 1 in ring B to station 3 in ring B.

At this point, station 2 in Ring A enters the IN RING state 140 and remains there until it sees the token pass over its address again at which time it enters the DETERMINE PLACE IN RING state 110 (see FIGS. 20A and 20B). The next time it sees the token skip over its address it saves both the source and destination addresses of the stations (in this case, stations 1 and 3 of ring B) and station 2 of ring A then enters the WAITING FOR DEMAND ENABLING state 136 (see FIGS. 20A and 20B).

The next time station 1 in ring B receives the token and issues the DEMANDERS ENABLE signal (because station 1 in ring B is the window station), station 2 in ring A enters the BEING RESOLVED PERMANENT state 138 at which point station 2 in ring A participates in the demand process and competes with any other demanders, if there are any, for winning the demand token. If it is successful in obtaining the demand token, station 2 becomes part of the token list for ring B and enters the IN RING state 140.

| AT TIME BUSES ARE JOINED | | |
|---|---|---|
| RING A | STATION 2 | WAITING FOR "FROM" ACTIVITY TO RESUME 152 |
| RING B | STATION 7 | WAITING FOR "FROM" ACTIVITY TO RESUME 152 |
| Event Station 7⅓ T timeouts first | | |
| RING A | STATION 2 | WAITING FOR "FROM" ACTIVITY TO STOP 150 |
| RING B | STATION 7 | TOKEN PASSING 146 |
| Event Station 7 passes token to its TO STATION 8 | | |

It is seen that throughout all of these steps, the original token list for ring B remains intact and subsequently the stations in ring A which want to become part of the token list are admitted to the token list.

The example given was directed specifically to station 2 in ring A. However, the remaining stations can similarly become part of the overall token list even if their addresses are the same as those in ring B. In that particular case however, the station enters the DUPLICATE ADDRESS state 144 after entering the DETERMINE PLACE IN RING state 110 since it would see a message on the bus with a source equal to their address. It is then necessary for higher levels in the communication system to give a different address to the duplicate address stations and then for them to return to the DETERMINE PLACE IN RING state 110 (after passing through the ASSESS NEED FOR USE OF THE BUS state 102) and then ultimately into the ring in a manner analogous to that presented for station 2. Thus in the given example, stations 1 and 7 would have to have their respective addresses changed in order for them to become members of the overall token list.

It should be pointed out that in one embodiment of the present invention stations 1 and 7 in ring A cannot accept the token pass to stations 1 and 7 in ring B because the token information not only contains the address of the station but the randomization number associated with that station which, for stations 1 and 7 of ring A, is different than stations 1 and 7 or ring B. Thus the concepts of randomization and of the number associated with the station address and the randomization of the timers is illustrated in this example.

Communication Media Redundancy

Figure 17:
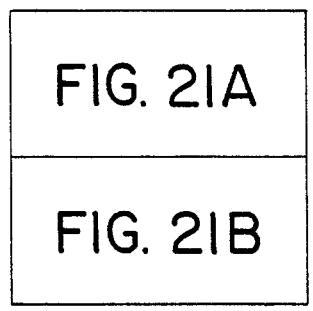
FIG. 17 is a diagram showing how

As seen in FIG. 17, the present invention can be configured in which more than one communication medium such as by coaxial cables 20 and 20'.

Block Diagram Description

Figure 15A:
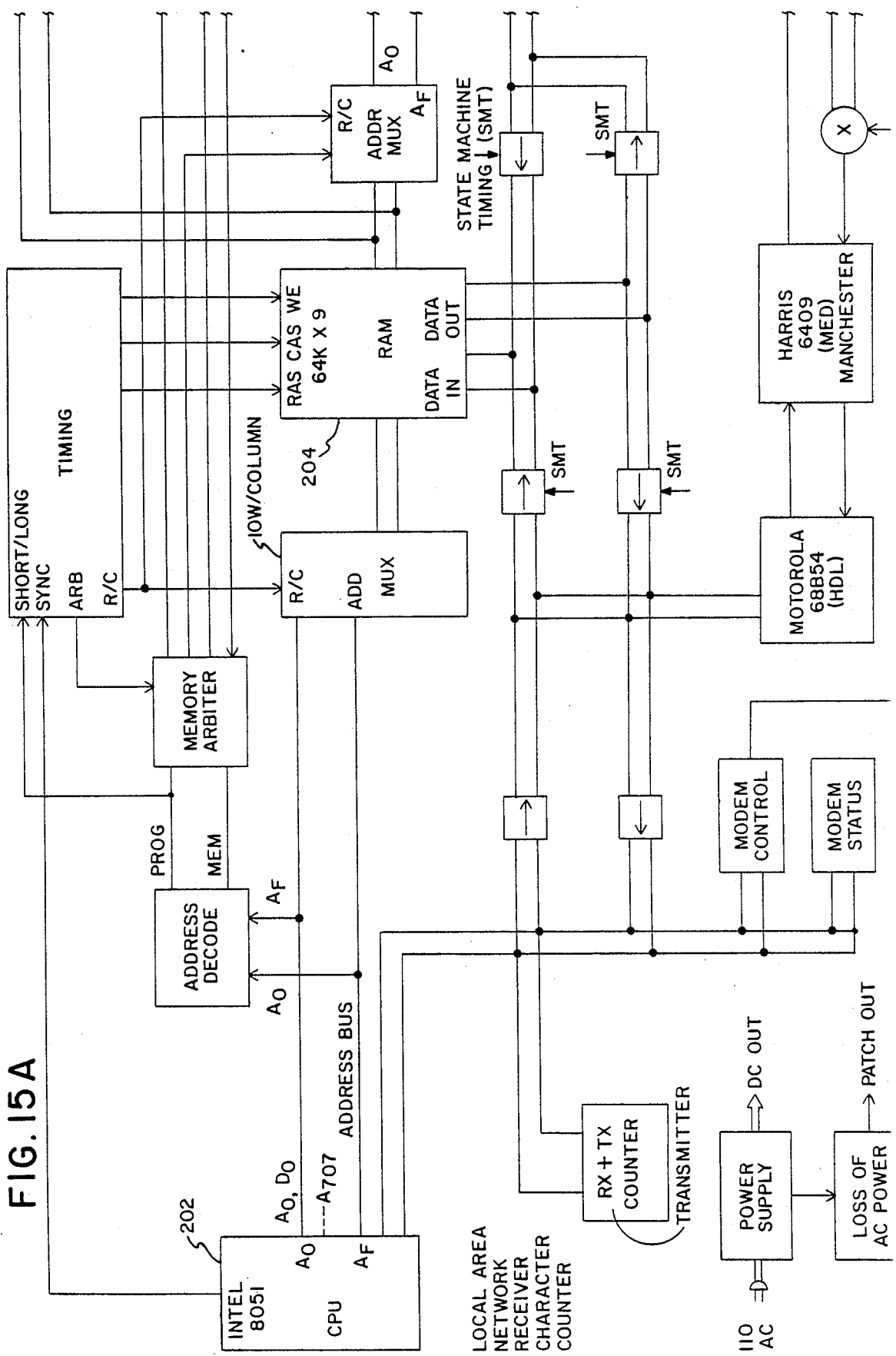
FIGS. 15A and B form an overall block diagram of local area network interface embodying the access mechanism of the present invention.
Figure 15B:
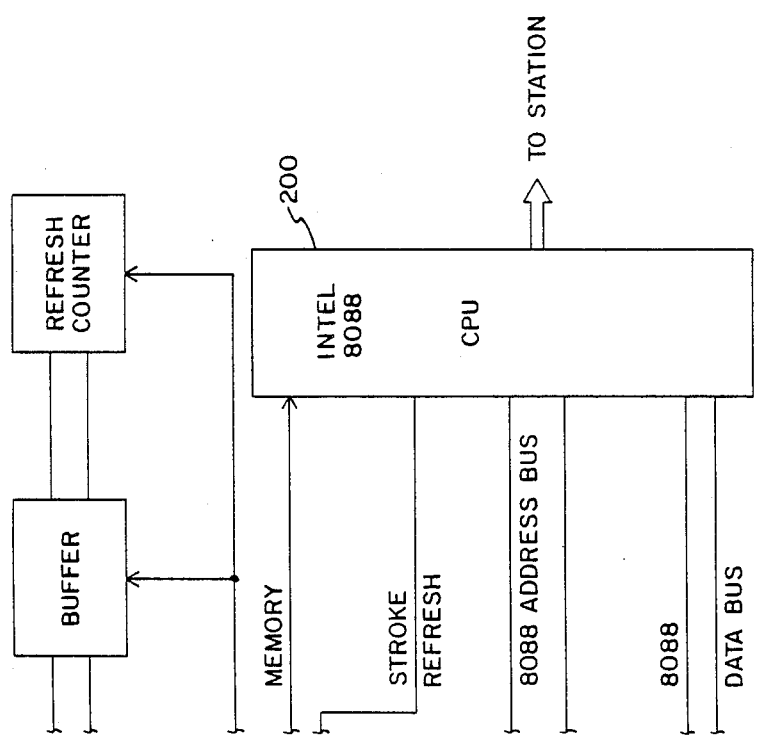
Figure 15B:
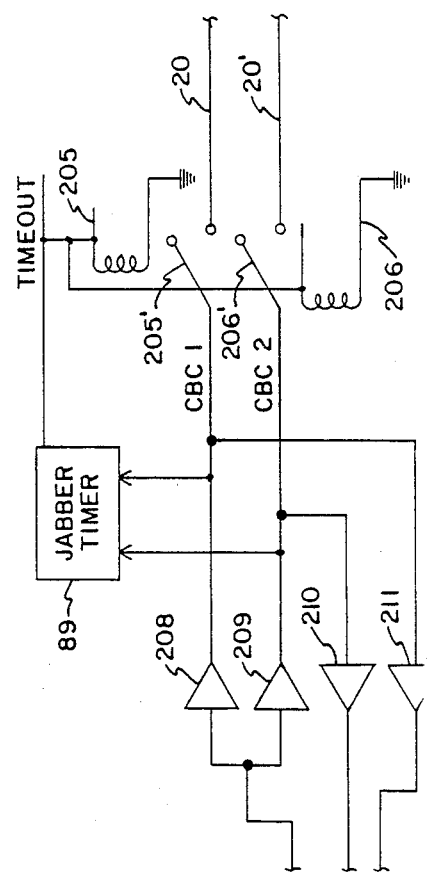

FIG. 15 is an overall block diagram of a local area network interface module which interconnects to a communication medium such as a coaxial cable 20 and, if desired, a redundant communication medium, such as coaxial cable 20'. The overall operation of the circuit shown in FIG. 15 is to implement the access mechanism described herein and to allow the interconnected station to communicate therewith through CPU 200. CPU 202 interfaces the high speed data communications over bus 20 or 20' with the communication from the station via CPU 200. The access mechanism instructions can be stored in random access memory 204 which may be configured with a static RAM or may be programmable read only memory (PROM) for purposes of the access mechanism.

Figure 19:
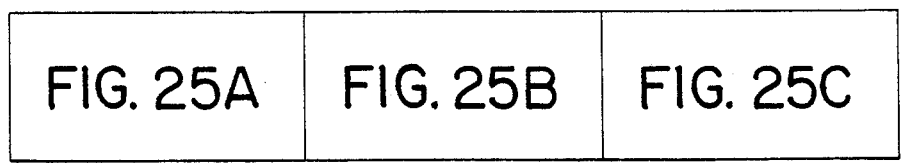
FIG. 19 is a diagram showing how

The jabber control timer 89 mentioned earlier is effectuated by coils 205 and 206 effectively opening corresponding switches 205' and 206' such as shown in FIG. 19. This effectively disconnects the transmitters 208 and 209 from the buses 20 and 20'.

Redundancy is effectuated in the embodiment shown in FIGS. 13 and 15 since two buses interface with two receivers 210 and 211 so that either bus may be used for the receipt of information as well as for the transmission of information.

SUMMARY

Thus what has been described is a local area network communication system with an improved access mechanism. The improvements include the use of hashing routines for determination of stations to become the first station in a token list, as well as hashing techniques for determining which demander shall receive the demand token when multiple demanders exist. The hashing technique uses a randomization number associated with the station address and does a bit-by-bit comparison of the address field and the randomization number field (if necessary) in order to determine a winner. For initialization hashing, priority bits may be utilized for each station so that some designated station(s) will always have priority in terms of becoming the first station in the token list.

Duplicate addressing protection is achieved through use of the randomization number and by passing messages between stations with the randomization number so that duplicate address stations can be detected with only one token pass to one station.

A jabber control mechanism is disclosed whereby failure to stop transmitting by a station causes a hardwire break in the output of the transmission circuitry; thereby allowing the network to continue operation.

Randomization of internal timers is also disclosed so that more than one token cannot be passed in any local area network. This is especially true where two local area networks are joined together. Through this technique reinitialization of all token lists is not required. Furthermore, the present invention allows DLC messages to be conducted during initialization.

Since maximum access time for the token is known in any given configuration, an orderly patchout can be effectuated by a station when that station senses loss of power.

Other features are disclosed herein directed to explicit demanding so that only one demand window per overall token passing cycle is used.

TABLE 1

GUARANTEED MAXIMUM ACCESS TIME

One of the important features of the access mechanism is that each station is guaranteed the maximum amount of time it has to wait before having access to the bus. There are two different equations describing the Guaranteed Access Time (GAT). One includes the bus build time whereas the second one does not. The bus build time should be included if powering down two or more consecutive sations in the token list occurs simultaneously. For either equation the GAT is met if there is a single station failure.

(1) GAT = Max Slot Times + Token passes + Build Time (2) GAT = Max Slot Times + Token passes where:

GAT = guaranteed access time for the network in question

Max Slot Times = sum of the times allocated each primary station for accomplishing work on the bus (nominal 2-5 msec. each for initial product).

Token Passes = time to pass the token once to all primary stations (nominal 0.2 msec. each with select/check/operate or 0.1 msec. without).

Build Time = time to rebuild the token list.

UNDERLYING ASSUMPTIONS AND CONCEPTS

The access mechanism is a sublayer of the Data Link Control Layer (DLC).

Most recovery attempts that do not involve full ring rebuilding are aimed at handling single node failures or noise burst conditions. If there is more than one failure, in most cases, the ring is to be rebuilt. When initializing the ring or when there is no arc of control, recovery is handled by bus dead timeout.

Whenever an illogical event is perceived by a station in the ring, that station assumes that it is not in synchronization with the bus and takes no further action until it can confirm its place in the ring or that the bus is dead. If a station is a token owner and it perceives an event indicating otherwise, it enters the IN RING state before determining if it is in synchronization with the bus.

The Data Link Control (DLC) layer is responsible for control of the access mechanism via commands. Link instructs access on which token owner mode to enter (e.g salve only, permanently in ring) and collects performance and error statistics for reporting to higher layers and local administrative facilities.

All perceptions of the bus are considered relative to the station being discussed.

The frame format used for transmission of all messages on the bus has separate fields for access and link control. All control decisions relating to data transmissions made by the access mechanism are made on the basis of control information passed through the link-access interface, control information in the access control fields of incoming messages, and access state variables. The access mechanism never tries to make decisions on the basis of the contents of a DLC message.

Explicit demand enabling is used to aid debugging and to avoid situations where the demander hears the flyback but the would be receiver of the flyback token does not. Also, the explicit demand enabling allows an expanded access mechanism (as might be found in a monitor) to execute the demandee sequence (window station) when and as many times as it wishes.

The window station starts the demanding sequence. The demander, if it is a permanent demander patches itself into the ring. If the demander is a temporary demander, it does its DLC work. With explicit demand enabling, it is possible for a smart window station (e.g. monitor) to control frequency of demands and who can get in the list.

The "I'M ONLY ONE" message declares to the world that a station is operating under the assumption that it is the only station desiring a place in the ring. This access message makes clear that the station is not in the "FIRST STATION PASSING TO SELF" state. A station enters this state after the bus has been determined dead by the station and the station has won the hash contest.

SERVICES PROVIDED TO THE LINK LAYER

The access mechanism offers the following services to the link layer:

Reception

Queuing of received messages (broadcast and direct).

Queuing of received messages with local access level acknowledgement.

Queuing of received messages with local data rely (link interrupt on receipt with timeout).

Transmission

Dequeuing and transmission of messages with no request for reply (broadcast and direct).

Dequeuing and transmission of messages with request for remote access level acknwoledgement.

Dequeuing and transmission of messages with request for remote data reply and queuing of reply.

TOKEN OWNERSHIP MODES

In order to provide access capabilities to the link layer that are appropriate to the needs of the applications and the whole system, the access mechanism operates in the following token ownership modes:

Mute

Slave Only

Temporary Member of the Ring

Permanent Member of the Ring

The link layer is responsible for requesting the station to enter and exit from token owner modes. If a station is incapable of entering a specified mode, then the access mechanism denies the request and, if possible, reports the reason for the denial.

Description of Token Ownership Modes

Mute: Station does not receive or transmit messages.

Slave Only: Station can receive messages but can only transmit message in response to a DLC request. The slave can only transmit the response during a query window which is opened up immediately after by the station sending the DLC request.

Temporary Member of Ring: Station can receive messages and can transmit messages in response to a query. The station can respond at two different times. It can respond during a query window which is opened up immediately after by the station sending the request. If the window is not opened or the station cannot respond while the query window is open, the station can respond when it becomes a DLC master by performing a temporary demand sequence and winning the demand token. The ability of a remote access mechanism to change a station's state from a slave state to a temporary member of the ring is not be precluded.

Permanent Member of Ring: Station participates in the token ring. Station can receive messages, transmit in response to query and can become a DLC master every time that it receives the token.

LINK-ACCESS INTERFACE

This section lists the commands used by the Link layer to control the access mechanism.

For the purpose of describing the workings of the access mechanism, the following command syntax is used:

COMMAND NAME (parameter1, ..., parameterN <,optional parameters>)

All commands result in information returned to the link layer. In all cases, this information at least contains result status.

The access mechanism operates in parallel with the link layer. Thus, when the link layer gives a command to the access mechanism, the link layer need not wait for a response. In fact, the link layer can issue a series of commands to the access mechanism before waiting for a response from any one of the commands.

The Commands

ENTER TOKEN OWNER MODE (mode)
return: old mode, success code
success code=(success, failure)
token owner modes=(mute, slave only, temp. ring member, permanent ring member)

This command instructs the station to enter the desired token owner mode. If the station is in the permanent ring member mode and is in the ring, then entering of any other token mode causes the station to patch itself out of the list. (See the section entitled "Token Owner Modes" for a description of the modes.)

RESET
return success/failure

The reset command causes the station to immediately test its hardware and then enter the mute mode. This command is issued by the link layer whenever there is a problem with the hardware.

REPORT STATUS
return: token owner mode ring status
token owner modes=(nute, slave only, temp. ring member, permanent ring member)
ring status=(waiting to go in ring, in ring, waiting to go out of ring, out of ring)

This command is used by the link layer to assess the status of the station. The ring status reports the present status of the sation with regards to place in the ring.

This may conflict with the mode because of the time it takes to transition modes.

GIVE PERFORMANCE INFORMATION
return:
  error counters
  usage counters

This command makes performance information available to the link layer. The counters can be cleared by network administration and by link mechanism.

ENABLE DLC RECEIVE (service type)
return: success code
success code=(success/failure)
service type=(no receive, no interrupt on request for poll, interrupt on poll)

This command allows the link layer to specify the type of receiver service that it wants the access mechanism to perform. The link layer has the option of specifying that no received DLC message be saved, all messages be saved for link, but that link is not to be interrupted if the access mechanism receives a polling message, or that all messages be saved and the link layer be interrupted to respond to incoming poll messages. A polled message is a message transmitted by a remote access machine followed by a query window. The local access mechanism can transmit a response within the query window.

XMIT DLC (message)
return: success code
success code=(success/failure)

This command instructs the access mechanism to queue DLC message for transmission. The success code returned only indicates the success of the transmission process. Failure indicates the message has not yet been successfully transmitted. The link mechanism can queue several messages for transmission by repeatedly sending XMIT DLC command to the access mechanism and the wait for the success codes.

XMIT DLC WITH REQUEST FOR ACKNOWLEDGEMENT (message)
return: success code
success code=(failure, successful transmission but no reply, successful transmission but nack received, successful transmission and acknowledgement received)

This command instructs the access mechanism to send the DLC message and to wait for an acknowledgement. An acknowledgement means the message was received and accepted. A nack means that message was not accepted. Lack of buffer space can be one reason for rejection of a message.

XMIT DLC WITH REQUEST FOR DATA REPLY (message)
return: success code, message
success code=(failure, successful transmission but no reply, successful transmission but nack received, successful transmission but data not available, successful transmission and reply message follows)

This command instructs the access mechanism to send the DLC message and to wait for a data reply.

XMIT DATA REPLY (message)
return: success code
success code=("no data available", data rely sent, trnsmission failure)

This command is used to send a reply to a received "DLC data with request for data reply" message.

Asynchronous Messages From Access To Link

The following messages are sent from the access mechanism to the link layer at the discretion of the access mechanism and not in direct reply to any link commands:

DATA RECEIVED (message)
DATA RECEIVED REQUIRING ACK (ack success/failure, message)
DATA RECEIVED REQUIRING DATA RELY (message)
DATA RECEIVED REQUIRING DATA RELY, NO DATA AVAILABLE (reply success/failure, message)

ACCESS HARDWARE AND SOFTWARE INTERFACE

The hardware makes available several lines enabling the access mechanism to perceive events at a single point on the bus. The lines available are carrier detect, flag detect, end of frame, CRC and signal quality. These lines are used by software to determine if a frame is good. A good frame is a frame in which the opening and closing flags are detected, CRC is good, and signal quality remains high between the opening and closing flags.

In addition, there can be two cables 20 and 20' (see FIGS. 2 and 15) which are used for redundancy. One cable is called the primary cable, the other is the secondary. There are different modes the access mechanism can choose for determining which cable is used for listening. The modes are selected mode and free running mode. In the selected mode, either the primary or secondary is selected for listening. In the free running mode, whichever bus becomes active first (i.e. energy is detected on the bus) is selected for reading the message. There is an additional line which indicates if there is energy on the non-listening bus while there is energy on the listening bus.

RULES FOR HANDSHAKING ON TOKEN PASS

Token passing handshaking is defined as the sending of a token enable message which must be acknowledged by the next station in the ring before the actual token message is sent.

On initialization, the handshake boolean variable, HANDSHAKING ON, is set true to indicate that handshaking is being used on all token passes. The variable HANDSHAKING ON is set false if until the station receives the token the station hears all stations without error. HANDSHAKING ON is set true if any noise is heard on the bus or it perceives any sort of error. Token passing without handshaking just involves sending the token message rather than sending an enable and waiting for an acknowledge.

The above rules only apply to passing the normal control token. Full handshaking is always used for passing the demand token.

RULES FOR GUARANTEEING RING BUILD

Each station desiring a permanent place in the ring enters the BUS IS DEAD state if it does not perceive energy on the bus for a period of time greater than 4/3T. The exception to this rule is for stations in "ONLY ONE" states, the only condition that permits exit is hearing any message sent by another station not in response to a query.

Once the BUS IS DEAD STATE is entered, it is assumed that there is no ring. In this state, the stations compete with each other to determine who has the token. The competition is resolved by hashing. The winner of the contest enters the first STATION IN RING state and then immediately transistions to first STATION PASSING TO SELF STATE. In this state, other stations can demand in and thus build the ring.

The hash steps work in the following way. The address is divided into one bit fields. If the current bit is one, a message is transmitted for a duration of twice the round trip time. It gets the next bit and enters the next round. If the current bit is zero, the mechanism waits for one round trip time and then looks at the bus. If there is energy on the bus, the station has lost the hash contest and enters the DETERMINE PLACE IN RING state. If there is no energy on the bus, the station waits another round trip time, gets the next bit and enters the next round. If the station has successfully participated in all the rounds, it has won the hash contest.

RING BUILD HASHING STEPS

The following pseudo code specifies the mechanism used for initializing the bus.

PROCEDURE RING BUILD
BEGIN
  Bit-Index:=0;
  In-Contest:=True;
  While (In-Contest) and (Bit-index < > Num-of-Bits)
  do Begin
    Case of Address [Bit-index]
    0: Begin
      Wait for one round trip time;
      If Bus-Active Then In-Contest: =False
      Wait for one round trip time End;
    1: Begin
      Transmit for two round trip times; End;
    End;
    Bit-Index: =Bit-Index+1
  End;
  If In-Contest
    Then Enter FIRST STATION PASSING TOKEN TO SELF
    Else Enter DETERMINE PLACE IN RING

END PROCEDURE RING BUILD

This procedure can be modified to guarantee that higher priority stations win the hash contest. The address is extended to contain bits which indicate the stations priority. The priority bits are hashed first.

This procedure can also be modified to help eliminate stations with duplicated addresses. The address is extended with bits that are set randomly. The random bits are hashed last.

The time to execute the body of the loop is two round trip times. The number of times the loop is executed is the number of address bits plus the number of bits for priority and the number of bits for randomization.

RULES FOR DEMANDING SEQUENCES p There are two types of demanders, temporary and permanent. A temporary just wants to receive the token once in order to perform DLC work and not become a member of the token ring. A permanent demander wants to become a permanent member of the token ring.

Both the temporary and permanent demanders go through the same initial sequence. They demand in when a demander's enable message is heard. There may be many demanders demanding in simultaneously. In this case, the demanders compete by hashing their addresses. The demandee sends the demand token to the winner if there are multiple demanders or it sends the demand token to the demander if it is the sole demander. The demander, if it is temporary, does its DLC work and returns the demand token to the demandee. A permanent demander verifies that its address is unique by broadcasting a message, opening a query window and listening for a reply. If it is unique, it patches itself in and then passes the demand token back to the demandee.

Duplicate stations are eliminated in the demanding process by use of random numbers. The demanders transmit an "I WANT IN" message which contains a random number. When the demandee passes the demandee token, it contains the random number sent by the demander who won the contest. A demander picks up the demand token if it is addressed to it and the random number within the demand token matches the random number placed by the "I WANT IN" message. Thus, if there are duplicate stations which won the contest, only the station whose random number matched picks up the token. The other stations enter a halt state and notify the link mechanism.

The hashing used for resolving multiple demanders is somewhat different than the hashing method used for building the bus. In building the bus, there is one round of hashing where every single bit is used. For resolving multiple demanders, there are several rounds of hashing and only a selected subfield of the address is hashed. The selected subfield changes for each round. The demandee controls the hashing processing by determining when the round starts and by selecting a winner. It selects a winner as soon as it hears a clean message. It may hear a clean message even though there are several stations transmitting at the same time. It is therefore possible for a demandee to select a winner even though all the bits of the address are not hashed.

DEMANDER SEQUENCE

The following pseudo code illustrates the mechanism which is performed when the access mechanism enters the state BEING RESOLVED.

```
Transmit "I WANT IN" message with random number
Wait for response in query window
If NO-Response Exit to Appropriate State
Bit-Index:=0
Round-Count:=0
While Message="Resolve Demander (round)-
    =Round-Count"
Begin
    If Not Hash (Address [Bit-Index]
        Then Exit to Lost Contest
    Bit-Index:=Bit-Index+1;
    If Not Hash (Address [Bit-Index])
        Then Exit to Lost Contest
    Bit-Index:=Bit-Index+1;
End
If Message="DEMAND TOKEN" and Random
    Numbers Match
    Then Case of Demander-Type
        Transmit With Query "DUPLICATE ADDRESS
            (addr)?";
        If Response within query window
            Then exit to error state;
        Patch In;
        Return Demand Token to Demandee;
        Exit to state
            appropriate to the success of patch in
        End;
    Temporary Demander: Begin:
        Send a Single DLC Message;
        Return Demand Token;
        Exit to Appropriate state;
    End
    End
Else if Message="DEMAND TOKEN" and Random
    Numbers Do Not Match
    Then Exit to error state for duplicate addresses
Else Exit to state for not winning the demand token;
The function hash returns True if it wins, and false it is
    loses
Function Hash (Address-Bit:Bit):Boolean;
Begin
    In-Contest:=true;
    Case of Address-Bit
    0: Begin
        Wait for one round trip time
        If Bus-Active Then In-contest:=False wait for one
            round trip time
        End;
    1: Begin
        transmit-message:="I WANT IN WITH RAN-
            DOM NUMBER"
        transmit transmit-message for two round trip
            times;
        End
    End;
    Hash:=In-Contest
```

DEMANDEE (WINDOW STATION) SEQUENCE

The following pseudo code illustrates how the demandee controls the demand process. A procedure RESOLVE is called if there are multiple demanders. This procedure is defined on the following page.

```
Transmit "DEMANDER ENABLE"
Case of Bus Activity within query window
    Noise:
        Call Resolve (Winner-Found, Winner-Address)
    Clean Message:
        Case of Message
        "I WANT IN": Begin
            Winner-found:=True
            Winner-address=Source Address of Message
            End
        "ILLEGAL MESSAGE": Begin
            Winner-found:=false;
            End;
        End
    No Bus Activity:
        Winner-found:=false
End Case of Bus Activity
If Winner-Found Then
    Begin
        Pass Demand Token
        Enter Watching Demander's Activity state ("I'M
            NEXT")
    END
```

The following procedure is invoked by the demandee to resolve multiple demanders when after the transmission of "DEMANDER ENABLE" a noisy demand window is seen.

```
Procedure Resolve (Winner-Found, Winner-Address)
Begin
    Round-count=0
    Winner-found=False;
    While (Round-count < >rounds) and (not Winner-
        Found) do
    Begin
        Transmit Resolve (Demanders, Round-Count),
```

If No-Activity during query window
    Then Return
Else if Good-Demand
    Then Winner-Found:=True
    Else Round-count:=Round-count+1
End;
If Winner-Found then Winner-Address:=Source address of Message
End;

PATCHING INTO AND OUT OF THE RING

Patching into the Ring

When a demandee finds a successful permanent demander, the demander inserts itself into the ring by taking the following steps:
Retry=0
Repeat
    Transmit Load Your From (Old-from, New-from) COMMAND
    Wait Round Trip Time For Response
    Retry=Retry+1
Until (Retry=Retry-Limit) or (Reply=Ack) or (Reply=Nack)
If Reply=Nack OR Retry=Retry-Limit Then Exit
Retry=0
Repeat
    Transmit Load Your To (Old-TO, New-TO) COMMAND Wait Round Trip Time for Response Retry=Retry+1
UNTIL (Retry=Retry-Limit) OR (Reply=Ack) OR (Reply=Nack)
If Reply=Nack OR Retry-Limit Then
Begin
    Change Ring To Original State
    Exit
End;

Patching out of the Ring

A station can either patch itself out of the ring or it can be patched out by its "FROM". A station patches itself out of the ring when, due to the mode change, it no longer wants to be a member. The mode change can be initiated from above by the link mechanism or below by network administration. For example, link would request access to patch itself out if power is going down. A station is patched out by its "FROM" if it becomes unable to receive and use the token.

The following pseudo code illustrates how a station would patch itself out while it owns the token.
Retry=0
Repeat
    Transmit Load Your To (My address, My TO'S Address) command To your "FROM"
    Wait round trip time for response
    Retry=Retry+1
Until (Retry=Retry-Limit) OR (Reply=Ack) OR (Retry=Nack)
If Reply=Nack OR Retry=Retry-Limit Then Done
Retry=0
Repeat
    Transmit Load Your From (My address, My FROM'S Address) command to your "TO"
    Wait round trip time for response
    Retry=Retry+1
Until (Retry=Retry-Limit) OR (Reply=Ack) OR (Retry=Nack)
Enter the appropriate state depending on the new mode Rules for a station being patched out automatically:

A station is patched out of the ring automatically when its "FROM" finds the next station in order to pass the token a limited number of times. This happens if the station repeatedly refuses to acknowledge a token enable signal or repeatedly becomes inactive upon receipt of the token.

Suppose that station three owns the token, station three's TO is station five and station five's TO is station seven. Station three attempts to pass the token to station five and station three does not hear any response from station five. Station three then sends a "WHO IS NEXT AFTER STATION FIVE" message. Station seven replies with "I AM NEXT". Station three sends a LOAD YOUR FROM command to seven, which patches out station five, and then passes the token to station seven.

A FROM patching out its "TO" takes the following action.
Transmit "WHO'S NEXT"
If "I'M NEXT" is heard within query window Then
    TO=Next station's address
    Retry=0
    Repeat
        Transmit Load Your From (My Old TO, My Address) Command to next station
        Wait round trip time for response
        Retry=Retry+1
    Until (Retry=Retry-Limit) OR (Reply=Ack) OR (Reply=Nack)
    Pass the Token
Else Enter IN RING state

RULES FOR HANDLING UNEXPECTED ACTIVITY ON THE WIRE

Unexpected activity is defined as any energy perceived by a station when that station expects the bus to be quiet or to contain a message appropriate to its state. This activity might be due to noise or illogical messages. Noise can be caused by outside interference or transmission collisions. Illogical messages can be caused by other stations operating incorrectly or by the station's perceptions of the state of the bus being grossly different from the perceptions of the other stations.

Noise

A message is good if between the opening and closing flags CRC is detected and signal quality stays high between the flags. Use of flags detect signal quality and CRC allows the access mechanism to receive a valid message over noise.

Any continuous burst of energy that does not satisfy the above conditions is considered noise. Stated in other words, noise is defined if carried detect is high and no opening flag is detected or a flag is detected but no closing flag is detected, or a closing and opening flag are detected by the CRC is invalid or, the CRC is good and signal quality does not remain high between the flags. In a quiet environment, flag detect becomes true in 8-12 microseconds after carrier detect becomes high. If in a noisy environment the access mechanism detects the opening flag no matter when carrier detect becomes high and in addition it detects a closing flag with a valid CRC and good signal quality, the message is valid.

Any noise received while waiting for a message is to be ignored unless the state requires the access mechanism to explicitly interpret the noise as a valid indication of bus activity.

While a station owns the token, before transmitting it observes the bus for energy. In the selected mode, the selected cable is observed, and in the free running mode, both cables are observed. If carrier detect is high, the stations take the following actions.

1. The first message, which can be a token pass, has not been transmitted.

If a flag detect does not become true within 8 to 12 microseconds or it becomes true and signal quality is low, then transmit immediately. If flag detect does become true and signal quality is true, set the maximum message timer. If a good message is seen, then enter the IN RING state unless it is an only one message in which case transmit the first message. If a good message is not seen within the maximum message time, then enter the 3/3 states.

2. First message has already been transmitted.

If a flag detect does not become true within 8 to 12 microseconds, then set the maximum message timer. If flag detect does not become true with good signal quality and the energy does not die within maximum message time, then transmit over the noise. If flag detect does become true with good signal quality before the maximum message timer expires, then enter the IN RING state if a good message was seen before the timer expires otherwise enter the 3/3 states. If a flag detect does become true within 8 to 12 microseconds with good signal quality, then set the maximum message timer. If a good message is seen before the timer expires, then enter the IN RING state, otherwise enter the 3/3 states.

Illogical Messages.

If a station is a token owner and sees any unexpected message that could only be sent by another token owner, then the station is to immediately enter the IN RING state. Otherwise, the message is ignored.

If a station has a place in the ring but is not the token owner, all unexpected messages are ignored.

If a station is in a DLC master state, then the token owner rules apply.

"I'M ONLY ONE" messages are always to be ignored.

REDUNDANCY RULES

Some systems may use two coaxial cables for redundancy. See the section on the Access Hardware and Software interface. The rules determine if the receiver runs in free mode or select mode. When transmitting both cables are used.

Initially, the receiver will be in free running mode. If a cable breaks or is disconnected, the receiver is switched into the select mode. The cable which is not broken is selected. While in the selected mode, if the cable is repaired or reconnected the receiver will be switched to the free running mode.

MISCELLANEOUS RULES

The token must be rejected if a station has not determined its place in the ring. If a station has determined its place in the ring and has received the token unexpectedly, it transmits check to the token passer and then accepts the token. If its FROM address is different than the token passer's address, its FROM register is loaded with the token passer's address.

When a station receives a load your TO or a load your FROM message it reloads its TO and FROM registers and determines if it needs to enter one of the burden states. (The burden states are those states the access mechanism is in if it owns the token or its TO or FROM own the token).

When there is an incomplete arc (i.e., only two stations), no station is responsible for watching its "FROM". A station is responsible for watching its "TO" but the "WHO'S NEXT" sequence is not used.

Temporary demanders must transmit their messages within a time equal to twice the time it takes for a signal to travel from one end of the modway cable to the other. Only one DLC message is permitted per demand token ownership. Transmission of DLC messages with requests for reply are permitted.

DLC RULES

Rules of DLC Reception

The access mechanism can receive DLC messages while in any state (except mute). The access mechanism queues the message for the link layer and notifies the link layer of the message's arrival, reply type, and transmission status of reply if any).

If the received message is a DLC message with request for acknowledgement, the access mechanism immediately returns an access acknowledgement to the sender.

If the received message is a DLC with request for data reply, the access mechanism interrupts the link layer and notifies it that a request for data reply has been made. If the link layer fails to get a reply to the access mechanism before the query window time limit (QUERY TIME), then the access mechanism returns a "DATA NOT AVAILABLE" reply. If the link layer responds in time, the access mechanism transmits the reply. In all cases, the access mechanism notifies the link layer of the actions taken and their status.

Rules for Transmission of DLC Messages

The access mechanism only transmits DLC messages when it has access rights. Access rights are only obtained under the following conditions:

Station has received a DLC with request for reply type message. Station must be in any mode other than mute.

Station has won the demand token. Station must be in the temporary ring member mode.

Station has a place in the ring and owns the token. Station must be in permanent member mode. Transmission of Queued Messages with no reply:

To perform this service, the access mechanism must be in either temporary or permanent token ownership mode.

When the access mechanism gains transmission rights via token or demand token ownership, the access mechanism dequeues the message to be transmitted, transmits the message contained in a DLC data access frame, and reports completion status when the transmission is complete. Transmission of Queued Messages with request for acknowledgement:

To perform this service, the access mechanism must be in either temporary or permanent token ownership mode.

When the access mechanism gains transmission rights via demand token or token ownership, it dequeues and transmits the message contained in a "DLC data with request for ack" access frame. The station then waits a limited time (QUERY TIME) for an acknowledgement. If no acknowledgement is received, then this sequence is repeated until one of the following occurs:

station receives ack
retry limit reached
token use time limit reached (TOKEN TIME)

Upon completion, the access mechanism reports the results of the attempt to transmit and receives an akcnowledgement to the link layer. Transmission of Queued messages with request for data reply:

To perform this service, the access mechanism must be in either temporary or permanent token ownership mode.

When the access mechanism receives transmission rights, it dequeues and transmits the message contained in a "DLC data with request for data reply" access frame. The access mechanism then waits for a limited time (QUERY TIME) for a reply. If no valid reply is received, then this sequence is repeated until one of the following occurs:

station receives ack
retry limit reaches
token use time limit reached (TOKEN TIME)

A valid reply will either be a "DLC data rely" message or a "data not available" message from the destination station.

BOOLEAN CONTROL VARIABLES

Arc

True if an arc of control is in effect (more than two stations in the ring).
False if no arc is in effect (two or less stations).

Handshaking On

True if handshaking is used for token passing.
False otherwise.
(See section "Rules for Handshaking on Token Passes")

The following two variables are used to provide state transition information for stations exiting the demandee group of states. They are mutually exclusive.

First Station

True when station thinks that it is the first station to enter the ring and there are no other stations in the ring.

Ring

True when thre are more than one station participating in the ring.

TIMER VALUES $\wedge t$
Maximum propagation delay (delta t).
$2\wedge t$
Maximum roundtrip propagation delay. For the present invention the $2\wedge t$ is about 70 usec.
tr
' Reaction time-the average estimated time for a station to formulate a reply to an access message once that message has been received. (Measured from the time the last byte of a message is received to the time the first byte of the reply is sent).
$2\wedge t + tr$
Maximum reply time
Query Time
The time allotted for a station to reply to a DLC data with reply request.

Maximum Message Time
The time it takes to transmit a message of the maximum permissable length. DLC Time Limit The maximum time allotted to a station for performing DLC work before that station must enter the token passing states.

There are three timers associated with the arc of control. These timers are used for recovery. The three timers are $\frac{1}{3}T$, $\frac{2}{3}T$, and 3/3T. The $\frac{2}{3}T$ is associated with the token's owner FROM, the 3/3T with the token owner, and the $\frac{1}{3}T$ with the token's owner TO.

When the token is passed and the previous owner sees activity by its TO the previous token owner continues to observe the bus until there is no more energy or a good message is seen. If a good message is seen, then the previous owner enters the IN RING state. If a good message is not seen, then the $\frac{2}{3}T$ is set. If the timer expires before any energy is detected on the bus, the previous owner attempts to find the next station and pass the token to it. If energy resumes the timer is stopped and the same sequence is repeated.

If a station owns a token and wants to pass it, the station first observes the bus. If there is energy on the bus, then the station attempts to pass the token over noise by using select, check and pass. If it is unable to do so, the token owner waits for the noise to die. When there is no energy on the bus, the 3/3T is set. If the timer expires before energy is seen on the bus, it passes the token. If energy is seen before the timer expires, the timer is halted and the same process is repeated.

When a station hears the token passed to its FROM, the station observes that its FROM stays alive. Whenever there is no energy on the bus for $\frac{1}{3}T$, the station grabs the token and passes it to its TO. The $\frac{1}{3}T$ is greater than the time transmitting the longest message. 4/3T Bus declared dead.

The T time period is randomized for each station based upon its address associated randomization number.
Only One Time
A large timer value that is used to regulate the interval during which a station in the ONLY ONE state sleeps to insure minimum disruption to a ring if the station erroneously thinks it is the only station on the ring. Typically equal to 16 times T.

TABLE 2

Introduction

The purpose of this table is to catalogue and describe the various states that define the overall access mechanism. The states described correspond to those shown in FIGS. 20A-25C.

The format of the state description can be described in an example of the ONLY ONE SLEEP state 124 (see FIG. 21B, see subtable 2-9 herein). Thus, each subtable begins with a state name such as the ONLY ONE SLEEP state. Following that is a description of that state. After the description is an explanation of the conditions by which a station enters that state (called "Entry Conditions").

For example, a station can enter the ONLY ONE SLEEP state if it was in the FIRST STATION PASSING TO SELF state and if the pass limit was reached. Upon entering a state, an action may or may not occur. Any such action is described in the "Action On Entry part of the subtable. In the given example, there is an action on entry; namely, to start the bus dead timer.

The conditions for exiting a state, called exit conditions, are also described in the subtable. In the given example, the station can exit to the ONLY ONE USING BUS state if the dead bus timer expires. The expiration of the dead bus timer is thus the "Transition Event."

Upon entering a new state (in the given example, the ONLY ONE USING BUS state), an action may or may not take place. In the example, the action taken is for the station to broadcast to all stations the message "I'm Only One."

Similarly, all other new states that can be transitioned to are explained in each subtable; with a description of the transition event and the action taken, if any, upon entering the new state. In the given example, the only other new state that can be exited to is the ASSESS NEED FOR USE OF BUS state.

The stations are presented in groups which correspond to some overall action performed by the access mechanism. The overall groups are shown in subtable 7-1 under the heading "LIST OF STATES TO BE DESCRIBED." For example, the ONLY ONE SLEEP state is in the group designated as "Only One."

Finally, throughout this table, the reference number of the state and the figure showing the overall interaction of the state are listed. TABLE 2-1
LIST OF STATES TO BE DESCRIBED:
Group 1-Power Up
OFF (Table 2-2)
ASSESS NEED FOR USE OF BUS (Table 2-3)
Group 2-Ring Building
BUS IS DEAD (Table 2-4)
HASH TIMER FOR BUILD (Table 2-5)
FIRST STATION IN RING (Table 2-6)
FIRST STATION PASSING TO SELF (Table 2-7)
FIRST STATION PASS OR USE (Table 2-8)
Group 3-Only One
ONLY ONE SLEEP (Table 2-9)
ONLY ONE USING BUS (Table 2-10)
Group 4-Demandee (Window Station)
WAITING FOR DEMANDER RESPONSE (Table 2-11)
RESOLVING DEMANDERS (Table 2-12)
WAITING FOR DEMANDER TO USE TOKEN (Table 2-13)
Group 5-Watching From
WAITING FOR "FROM" ACTIVITY (Table 2-14)
WAITING FOR "FROM" ACTIVITY TO STOP (Table 2-15)
WAITING FOR "FROM" ACTIVITY TO RESUME (Table 2-16)
Group 6-Token Owner
TOKEN OWNER (Table 2-17)
PASS OR USE (Table 2-18)
Group 7-Token Passing
TOKEN PASSING (Table 2-19)
WAITING TO PASS TOKEN OVER NOISE (Table 2-20)
WAIT FOR TOKEN ACK OVER NOISY PASS (Table 2-21)
WAITING FOR ENERGY TO DIE AFTER NOISY PASS (Table 2-22)
WATCHING FOR EVIDENCE OF RING AFTER NOISY PASS (Table 2-23)
WAITING FOR "TO" ACTIVITY (Table 2-24)
WAITING FOR ENERGY TO DIE AFTER PASS (Table 2-25)
WAIT FOR MORE ENERGY AFTER PASS (Table 2-26)
FINDING NEXT STATION (Table 2-27)
WAIT FOR RESPONSE TO "WHO'S NEXT" (Table 2-28)
PATCHING SELF OUT (Table 2-29)
Group 8-Permanent Demanding
DETERMINE PLACE IN RING (Table 2-30)
WAITING FOR DEMAND ENABLING (Table 2-31)
BEING RESOLVED (PERM) (Table 2-32)
Group 9-DLC
DLC MASTER (Table 2-33)
TEMP DLC MASTER (Table 2-34)
ONLY ONE DLC MASTER (Table 2-35)
PASSING TO SELF DLC MASTER (Table 2-36)
Group 10-Temporary Demanding
WAITING FOR DEMAND ENABLE (Table 2-37)
BEING RESOLVED (TEMP) (Table 2-38)
Group 11-Misc. States
SLAVE ONLY (Table 2-39)
DUPLICATE ADDRESS (Table 2-40)
MUTE (Table 2-41)
IN RING (Table 2-42)
JABBER (Table 2-43)

Group 1-Power Up

OFF
ASSESS NEED FOR USE OF BUS

TABLE 2-2

State Name: OFF

Reference No. 100 (See FIG. 20A)

Description: This is the power off condition of the station.
Entry Conditions:
Old State: none
Actions on Entry: none
Exit Conditions:
Event: Power up
Actions Taken: Perform reset sequence
New State: ASSESS NEED FOR USE OF BUS

TABLE 2-3

State Name: ASSESS NEED FOR USE OF BUS

Reference No. 102 (see FIG. 20A)

Description: This is the first state entered after powerup.
This state is also entered whenever token ownership mode changes are successfully made. In this state, the station decides according to the mode specified by the link layer whether to be mute, a slave, or a participant in the ring.
Entry Conditions:
Old State: Off
Actions on Entry: none
Exit conditions:
Transition Event; want to be in ring and can be in ring.
Actions Taken: none
New State: DETERMINE PLACE IN RING
Transition Event: (temp. member mode and not desiring place in ring) OR (slave only mode)
Actions Taken: none
New State: SLAVE ONLY Transition Event: mute mode
Actions Taken: none
New State: Mute Group 2-Ring Building BUS IS DEAD
HASH TIMER FOR BUILD
FIRST STATION IN RING
FIRST STATION PASSING TO SELF
FIRST STATION PASS OR USE

TABLE 2-4

State Name: BUS IS DEAD

Reference 104 (see FIG. 21A)

Description: The station enters this state when it does not hear any activity on the bus for a period of time greater than 4/3T. This state is only for stations that want to participate in the ring. This is the first step to rebuilding the ring.
Entry Conditions:
Old State(s): Any state other than the ONLY ONE state and the OFF state
Actions on Entry: none
Exit Conditions:
Transition Event: transition always
Actions Taken: none
New State: HASH TIMER FOR BUILD Table 2-5

State Name: HASH TIMER FOR BUILD

Reference 106 (see FIG. 21A)

Description: In this state the station participates in a contest to see which station will become the first station to enter the ring. The contest is held by transmitting for periods of time determined by the address hashing mechanism. If the station is the winner or if it is only station competing, then it enters the FIRST STATION ON RING state; otherwise it goes to DETERMINE PLACE IN RING.
Entry Conditions:
Old State(s): BUS IS DEAD
Actions on Entry: perform address hashing sequence for ring rebuild
Exit Conditions:
Transition Event: win bid for first station
Actions Taken: none
New State: FIRST STATION IN RING
Transition Event: Lost bid for first station
Actions Taken: none
New State: DETERMINE PLACE IN RING

TABLE 2-6

State Name: FIRST STATION IN RING

Reference No. 112 (see FIG. 21B)

Description: This state serves as an entry point to the set of states associated with being the first station in the ring.
Entry Conditions:
Old State(s). HASHING TIMER FOR BUILD
Actions on Entry: none
Exit Conditions:
Transition Event: transition always
Actions Taken: initialize token pass retry counter
New State: FIRST STATION PASSING TO SELF

TABLE 2-7

State Name: FIRST STATION PASSING TO SELF

Reference No. 114 (see FIG. 21B)

Description: In this state, the station perceives itself to be the only member of the ring and passes the token to itself. This token pass is considered a flyback token pass and the demandee sequence follows. If the station passes the token to itself N times (where N is a predetermined integer such as 20) without another station entering the ring, then the station enters the ONLY ONE state.
Entry Conditions:
Old State(s):
FIRST STATION IN RING
FIRST STATION PASS OR USE
DLC MASTER
Actions on Entry: none
Exit Conditions:
Transition Event: pass limit not reached
Actions Taken: pass token to self increment pass count
New State: OPEN DEMAND WINDOW, WAIT FOR DEMANDER RESPONSE This state is the same as the normal demandee state (the demandee station is also called the window station) except that there is an exit to FIRST STATION PASS OR USE if no new station patched in.
Transition Event: pass limit reached
Actions Taken: none
New State: ONLY ONE SLEEP

TABLE 2-8

State Name: FIRST STATION PASS OR USE

Reference Number 118 (see FIG. 21B)

Description: In this state, the station decides whether or not it needs to do DLC master work.
Entry Conditions:
Old State(s): OPEN DEMAND WINDOW. WAIT FOR DEMANDER RESPONSE Actions on Entry: none
Exit Conditions:
Transition Event: no DLC work to do
Actions Taken: none
New State: FIRST STATION PASSING TO SELF
Transition Event: DLC work to do
Actions Taken: none
New State: DLC MASTER
(Same as the normal DLC Master but with a transition to First Station Passing to Self when DLC work done or time up)

Group 3-Only One

ONLY ONE SLEEP
ONLY ONE USING BUS

TABLE 2-9

State Name: ONLY ONE SLEEP

Reference No. 124 (see FIG. 21B)

Description: In this state, the station thinks that it is the only station on the bus but is taking precautions against making the bus inoperative if it is wrong. This is done by removing the station from the PASSING TO SELF state 114 and making the station wait a longperiod of time (only one sleep timer) between attempts to use the bus.

In this state the station is never to be able to open the demand window (enable demanders) until a ring has been built by another station or stations. The waiting time is much greater than the bus dead timeout so that other stations desiring a place in the ring will be able to start ring rebuild procedures. The station in the ONLY ONE SLEEP state exits the state upon hearing evidence of other stations participating in ring rebuild or any token passing activities. If the station does not hear any other stations and the ONLY ONE SLEEP timer expires, it broadcasts a "I'm Only One" message to identify its state to a monitor. It then enters the ONLY ONE USING THE BUS state. The uniqueness of the I'm Only One" message allows the message to be ignored by other stations that may have a ring in operation.
Entry Conditions:
Old State(s): FIRST STATION PASSING TO SELF
Actions on Entry: start bus dead timer
Exit Conditions:
Transition Event: timer expires
Actions taken: broadcast "I'm Only One" message
New State: ONLY ONE USING BUS
Transition Event: hear any good message
Actions Taken: none
New State: ASSESS NEED FOR USE OF BUS

TABLE 2-10

State Name: ONLY ONE USING BUS

Reference Number 126 (see FIG. 21B)

Description: In this state, the station has already broadcast its "I'm Only One" message and it is deciding whether or not to do DLC work.
Entry Conditions:
One State(s) Only One Sleep
Actions on Entry: none
Exit Conditions:
Transition Event: DLC work to do
Actions Taken: none
New State: ONLY ONE DLC MASTER
(Same as the normal DLC Master but with a transition to ONLY ONE SLEEP when DLC work done or time up).
Transition Event: no DLC work to do
Actions Taken: Start the only one timer
New State: ONLY ONE SLEEP Group 4-Demandee (Window Station)
OPEN DEMAND WINDOW, WAIT FOR DEMAND RESPONSE
RESOLVING DEMANDERS
WAITING FOR DEMANDER TO USE TOKEN

TABLE 2-11

State Name: OPEN DEMAND WINDOW AND WAIT FOR DEMANDER RESPONSE

Reference 116 (see FIG. 21B)

Description: This state determines if there are any demanders. A demander enable signal has been sent, and the query window is opened.
Entry Conditions:
Old State(s)
TOKEN OWNER
FIRST STATION PASSING TO SELF
Actions on Entry: The demand window timer is set.
Exit Conditions:
Transition Event: demand window timer expires and Ring=True
Actions Taken: none
New State: PASS OR USE
Transition Event: demand window timer expires and first station=True
Actions Taken: none
New State: FIRST STATION PASS OR USE
Transition Event: Noise heard while demand window is open.
Actions taken: none
New State: RESOLVING DEMANDERS
Transition Event: Receive good remove demand
Actions Taken: Send demand token to temporary demander
New State: WAITING FOR DEMANDER TO USE TOKEN

TABLE 2-12

State Name: RESOLVING DEMANDERS

Figure 22:
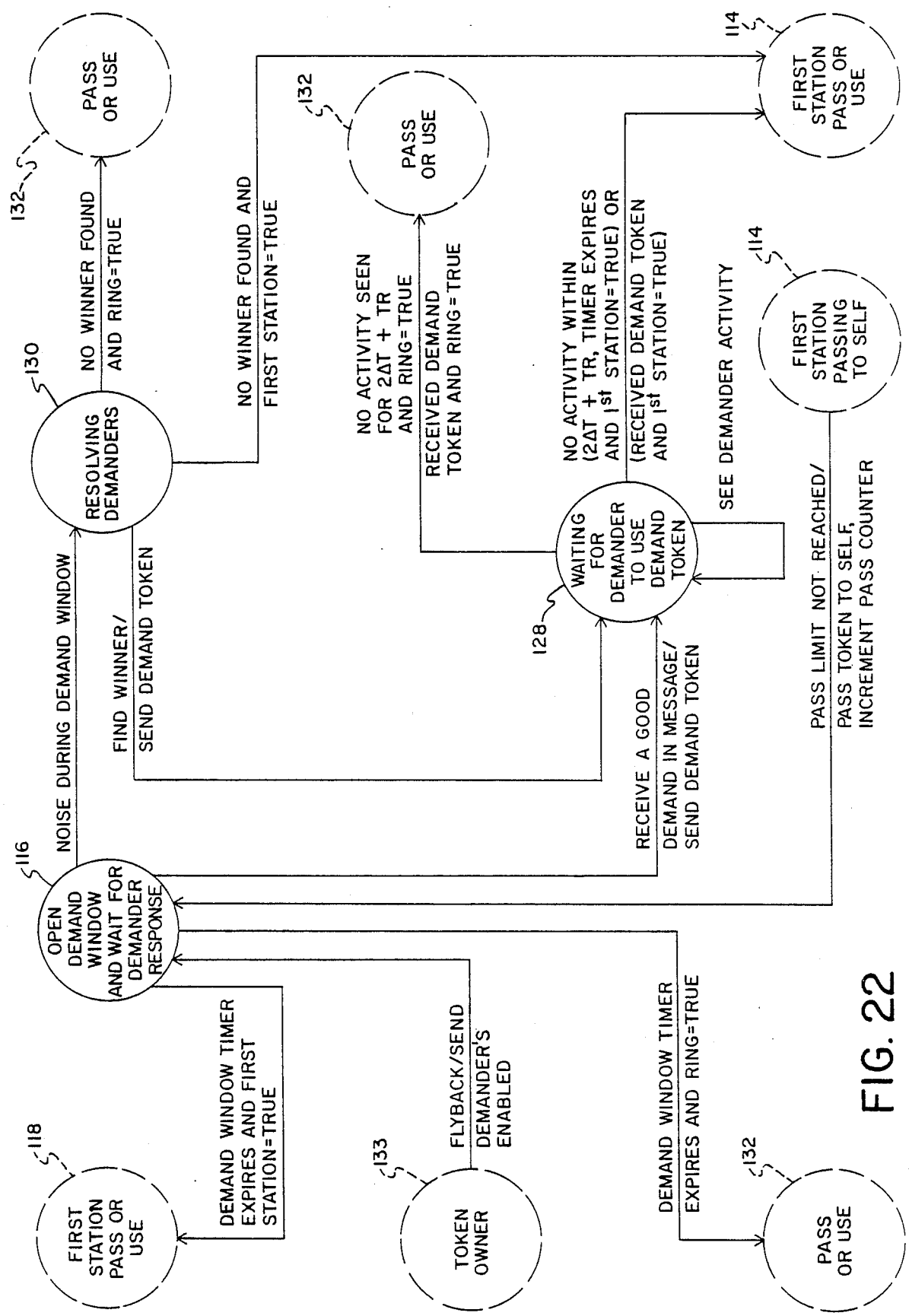
FIG. 22 illustrates a group of states for opening the demand window and waiting for demanders.

Reference No. 130 (see FIG. 22)

Description: This state uses a hashing mechanism for resolving a multiple demander. There are two possible outcomes after executing the hashing mechanism. A permanent demander may or may not have been found.
Entry conditions: none
Old State(s): OPEN DEMAND WINDOW, WAIT FOR DEMANDER RESPONSE
Actions on Entry: Execute the hashing mechanism
Exit Conditions:
Transition Event: Find a winner
Actions Taken: Send demand token
New State: WAITING FOR DEMANDER TO USE TOKEN
Transition Event: No winner found and Ring=True
Actions Taken: None
New State: Pass or Use
Transition Event: No winner found and First Station=True
Actions Taken: none
New State: FIRST STATION PASS OR USE

TABLE 2-13

State Name: WAITING FOR DEMANDER TO USE DEMAND TOKEN

Reference Number 128 (see FIG. 22)

Description: A demand token has been sent to the demander. If the demander is a temporary demander, it performs its DLC work and then passes the token back to the window station. If it is a permanent demander, it patches itself in and then passes the token back to the window station. Note that the boolean ARC ring may transition from false to true.
Entry Conditions:
Old State(s): OPEN DEMAND WINDOW, WAIT FOR DEMANDER RESPONSE RESOLVING DEMANDERS
Actions on Entry: Set the $2^{\wedge}t+tr$ timer
Exit Conditions:
Transition Event: See demander activity
Actions Taken: none
New State: WAITING FOR DEMANDER TO USE DEMAND TOKEN Transition Event: Receive demand token and Ring=True
Actions Taken: none
New State: PASS OR USE
Transition Event: Receive demand token and first Station=True
Actions Taken: none
New State: FIRST STATION PASS OR USE
The next two transition events are combined into a single arc on the state diagram.
Transition Event: $2^\wedge T+tr$ timer expires and Ring=True
Actions Taken: none
New State: PASS OR USE
Transition Event: $2^\wedge T+tr$ timer expires and First Station=True
Actions Taken: none
New State: PASS OR USE Group 5-Watching From
WAITING FOR "FROM" ACTIVITY
WAITING FOR "FROM" ACTIVITY TO STOP
WAITING FOR "FROM" ACTIVITY TO RESUME

TABLE 2-14

State Name: WAITING FOR "FROM" ACTIVITY

Reference Number 148 (see FIG. 24A)

Description: This state is entered after the station sees the token passed to its "from". The station is watching the bus to see if the "from" station becomes active. If activity is seen within a short period ($2^\wedge t+tr$), then the station assumes that the "from" is active and enters into the arc of control. If no activity is seen, it returns to IN RING and never enters the arc of control.
Entry Conditions:
Old State(s): IN RING WAITING FOR "FROM" ACTIVITY TO STOP
Actions on Entry: start $2^\wedge t+tr$
Exit Conditions:
Event: energy seen on bus
Actions Taken: none
New State: WAITING FOR "FROM" ACTIVITY TO STOP
Event: no energy on bus before timer expires
Actions Taken: none
New State: IN RING

TABLE 2-15

State Name: WAITING FOR "FROM" ACTIVITY TO STOP

Reference Number 150 (see FIG. 24B)

Description: In this state, the station assumes that it's "from" has received the token. The station is now at the head of the arc of control and its responsibility is to make sure that the token does not die with the "from" station before it is passed.
Entry Conditions:
Old State(s):
  WAITING FOR "FROM" ACTIVITY
  WAITING FOR "FROM" ACTIVITY TO RESUME
Actions on Entry: none
Exit Conditions:
Event: no energy on bus
Action Taken: none
New State: WAITING FOR "FROM" ACTIVITY TO RESUME
Event: receive "who's next" with your "from" specified
Actions Taken: send "I'm next"
New State: WAITING FOR "FROM" ACTIVITY TO RESUME
Event: receive token
Actions Taken: none
New State: TOKEN OWNER
Event: see token pass to station other than self or from
Actions Taken: none
New State: IN RING
Event: see token pass to "from"
Actions Taken: none
New State: WAITING FOR "FROM" ACTIVITY

TABLE 2-16

State Name: WAITING FOR "FROM" ACTIVITY TO RESUME

Reference Number 152 (see FIG. 24B)

Description: In this state the station has already seen some bus activity which is assumed to be caused by its from and now the bus is inactive. The station is monitoring the bus to see if activity resumes. If no activity resumes, the station picks up the token and passes it on.
Entry Conditions:
Old State(s): WAITING FOR "FROM" ACTIVITY TO STOP
Actions on Entry: start $\frac{1}{3}T$ timer
Exit Conditins:
Event: timer expires before energy seen
Actions Taken: initialize token pass retry counter
New State: TOKEN PASSING
Event: see energy
Action Taken: none
New State: WAITING FOR "FROM" ACTIVITY TO STOP Group 6-Token Owner
TOKEN OWNER
TOKEN OWNER USE OR PASS

TABLE 2-17

State Name: TOKEN OWNER

Reference Number 133 (see FIG. 24B)

Description: This state is entered upon receipt of the token. If the token was received on a flyback (pass from highest address in ring to lowest) then the demand process is initiated, otherwise the station goes directly to the PASS OR USE state.
Entry Conditions:
Old State(s): WAITING FOR "FROM" ACTIVITY TO STOP IN RING
Actions on Entry: none
Exit Conditions:
Transition Event: token was received on flyback
Actions Taken: none
New State: OPEN DEMAND WINDOW, WAIT FOR DEMANDER RESPONSE
Transition Event: token not received on the flyback
Actions Taken: none
New State: PASS OR USE

TABLE 2-18

State Name: PASS OR USE

Reference Number 132 (see FIG. 24B)

Description: In this state, the station assesses its need to do DLC work. If there is DLC work to do, it enters the DLC MASTER state; otherwise it enters the TOKEN PASSING state.
Entry Conditions:
Old State(s):
  PATCHING IN NEW STATION
  RESOLVING DEMANDERS
  TOKEN OWNER
Actions on Entry: none
Exit Conditions:
Transition Event: no DLC work to do
Actions Taken: none
New State: TOKEN PASSING
Transition event: DLC work to do
Actions Taken: none
New State: DLC MASTER

Group 7-Token Passing

TOKEN PASSING
WAITING TO PASS TOKEN OVER NOISE
WAIT FOR TOKEN ACK OVER NOISY PASS
WAITING FOR ENERGY TO DIE AFTER NOISY PASS
WATCHING FOR EVIDENCE OF RING AFTER NOISY PASS
WATCHING FOR "TO" ACTIVITY
WAITING FOR ENERGY TO DIE AFTER PASS
WAIT FOR MORE ENERGY AFTER PASS
FINDING NEXT STATION
WAIT FOR RESPONSE TO "WHO'S NEXT"
PATCHING SELF OUT

TABLE 2-19

State Name: TOKEN PASSING

Reference Number 146 (see FIG. 25A)

Description: The token is passed in this state. There are two ways of passing a token. One is just to simply pass it. The more rigorous way is to use handshaking. The handshaking method is used whenever the boolean control variable "HANDSHAKING ON" is true. The section "Rules for Handshaking on Token Passing" describes when this variable is set and reset.
Entry Conditions:
Old State(s):
  PASS OR USE
  MASTER DLC
  WAITING FOR FROM ACTIVITY TO RESUME
  PATCHING SELF OUT
  WATCHING BUS FOR EVIDENCE OF RING AFTER
  NOISY PASS
Actions on Entry: none
Exit Conditions:
Transition Event: Before passing the token, energy is seen on the bus.
Actions Taken: Start max message timer
New State: WAITING TO PASS TOKEN OVER NOISE
Transition Event: Before passing the token, no energy is seen on the bus
Actions Taken: Initial retry count, start $2^{\wedge}t$ timer, and pass the token
New State: "WAITING FOR TO ACTIVITY"
Transition Event: desire patch out
Actions Taken: none
New State: "PATCHING SELF OUT"

TABLE 2-20

State Name: WAITING TO PASS TOKEN OVER NOISE

Reference Number 155 (see FIG. 25A)

Description: There is noise on the bus. The access machine is waiting for the noise to die down before passing the token. However, if the noise persists for a long enough period, an attempt is made to pass the token. If this state is reached, the full handshaking method is used for passing the token.
Entry Conditins:
Old State(s): TOKEN PASSING
Actions on Entry: none
Exit Conditions:
Transition Event: see any good message
Actions Taken: none
New State: IN RING
Transition Event: Timer expires
Actions Taken: Initial retry count, send token enable, start $2^{\wedge}+tr$ timer
New State: WAIT FOR ACK OVER NOISY PASS
Transition Event: Energy drops before timer expires. (This indicates that noise has died down.)
Actions Taken: Initial retry count, start $2^{\wedge}t+tr$ timer, send token enable
New State: WAITING FOR TO ACTIVITY

TABLE 2-21

State Name: WAIT FOR TOKEN ACK OVER NOISY PASS

Figure 25B:
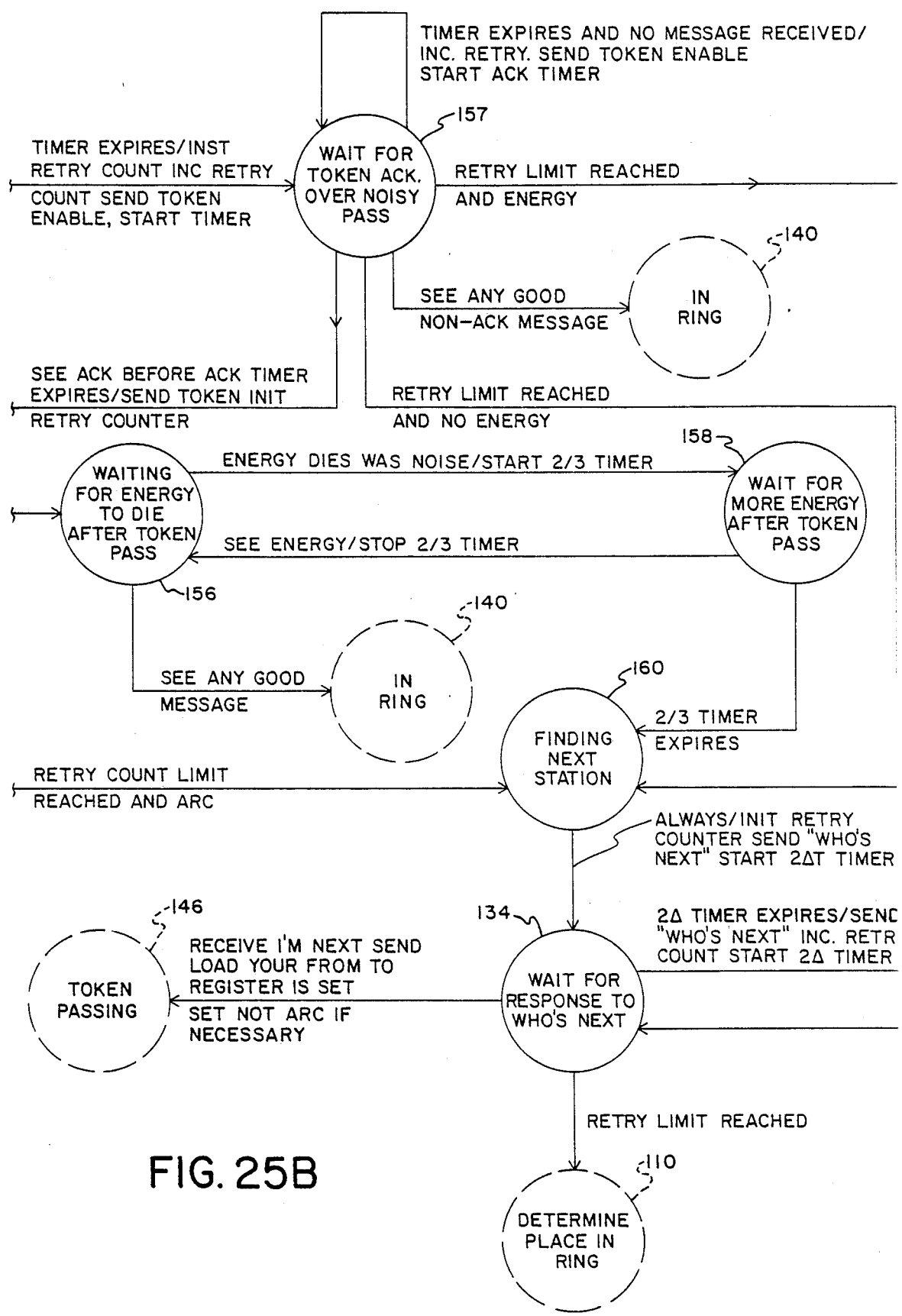

Reference Number 157 (see FIG. 25B)

Description: A token enable has been sent over noise. This state is waiting for the handshake before passing the token. If the handshake is not heard after several retries, the access machine waits for noise to die before passing the token. (This is subject to revision. See hanging issues.)
Entry Conditions:
Old State(s): WAITING TO PASS TOKEN OVER NOISE
Actions on Entry: none
Exit Conditions:
Transition Event: Timer expired and no acknowledge heard.
Actions Taken: Increment retry, start ack timer, and send token enble signal
New State: WAIT FOR TOKEN ACKNOWLEDGE OVER NOISE
Transition Event: retry limit reached and energy on the bus
Actions Taken: none
New State: WAITING FOR ENERGY TO DIE AFTER NOISY PASS
Transition Event: See any good non-ack message
Actions Taken: none
New State: IN RING
Transition Event: See Ack before ack timer exires
Actions Taken: Send the token, Init retry counter, start the $2^{\wedge}t$ timer New State: WAITING FOR TO ACTIVITY
Transition Event: Retry limit reached and no energy
Actions Taken: none
New State: FIND NEXT STATION

TABLE 2-22

State Name: WAITING FOR ENERGY TO DIE AFTER NOISY PASS

Figure 25C:
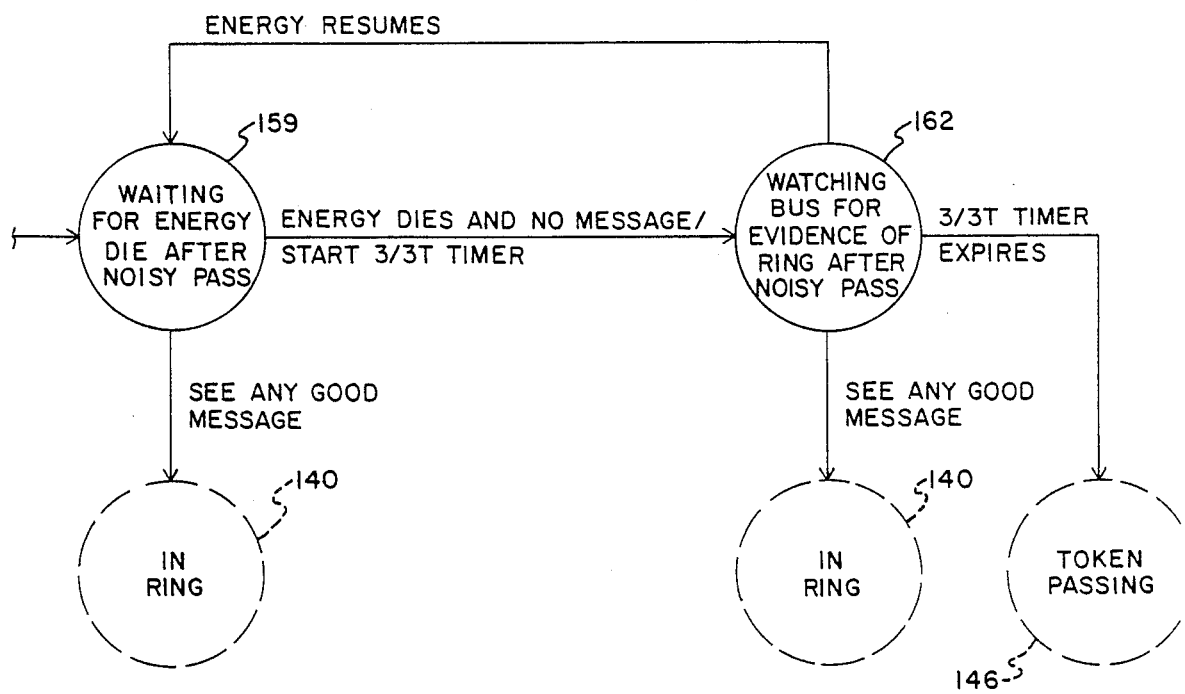

Reference Number 159 (see FIG. 25C)

Description: There has not been any acknowledge to token enables. The bus is still noisy. This state waits until the energy dies down before passing the token:
Entry Conditions:
Old State(s): WAIT FOR TOKEN ACK AFTER NOISY PASS
Actions on Entry: none
Exit Conditions:
Transition Event: See any good message
Actions Taken: none
New State: IN RING
Transition Event: energy dies and no message seen
Actions Taken: Start 3/3 timer
New State: WATCHING FOR EVIDENCE OF RING AFTER NOISY PASS

TABLE 2-23

State Name: WATCHING BUS FOR EVIDENCE OF RING AFTER NOISY PASS

Reference Number 162 (see FIG. 25C)

Description: At present there is no more energy on the bus. The bus is observed for a maximum period of 3/3T. If it remained silent for this period of time, the token is then passed by the access machine. Note that the token is passed before the 4/3T expired which would cause reinitialization of the ring.
Entry Conditions:
Old State(s): WAITING FOR ENERGY TO DIE AFTER NOISY PASS
Actions on Entry:
Exit Conditions:
Transition Event: Energy resumes
Actions Taken: none
New State: WAITING FOR ENERGY TO DIE AFTER NOISY PASS
Transition Event: 3/3T timer expires
Actions Taken: none
New State: TOKEN PASSING
Transition Event: See any good message
Actions Taken: none
New State: IN RING

TABLE 2-24

State Name: WAITING FOR "TO" ACTIVITY

Reference Number 154 (see FIG. 25A)

Description: This state is attempting to see if the "to" has the token
Entry Conditions:
Old State(s):
  TOKEN PASSING
  WAITING TO PASS TOKEN OVER NOISE
  WAIT FOR TOKEN ACK OVER NOISY PASS
Actions on Entry: none
Exit Conditions:
Transition Event: $2^{\wedge}t$ timer expires or unsuccessful pass
Actions Taken: Increment retry count, pass token, start $2^{\wedge}t$ timer
New State: WAITING FOR TO ACTIVITY
Transition Event: See energy and ARC
Actions Taken: none
New State: WAITING FOR ENERGY TO DIE AFTER PASS
Transistion Event: retry count reached and ARC
Actions Taken: none
New State: FINDING NEXT STATION
Transition Event: retry count reached and NOT ARC
Actions Taken: none
New State: DETERMINE PLACE IN RING
Transition Event: See energy and NOT ARC
Actions Taken:
New State: IN RING

TABLE 2-25

State Name: WAITING FOR ENERGY TO DIE AFTER TOKEN PASS

Reference Number 156 (see FIG. 25B)

Description: This is energy on the bus. This state assumes that the energy is caused by a successful token pass. If this is indicated the access machine exits this state.
Entry Conditions:
Old State(s):
  WAITING FOR TO ACTIVITY
  WAIT FOR MORE ENERGY AFTER PASS
Actions on Entry: none
Exit Conditions:
Transition Event: See any good message
Actions Taken: none
New State: IN RING, however if station patched itself out enter MUTE or SLAVE ONLY state.
Transition Event: Energy dies and was noise
Actions Taken: Start the ⅜timer
New State: WAIT FOR MORE ENERGY AFTER PASS

TABLE 2-26

State Name: WAIT FOR MORE ENERGY AFTER TOKEN PASS

Reference Number 158 (see FIG. 25B)

Description: In this state there is no energy on the bus. It is still not known if the token has been passed successfully. If the bus remains inactive for a specified period of time the access machine assumes the token has not been successfully passed and attempts to pass the token to his "to's" "to".
Entry Conditions:
Old State(s): WAITING FOR ENERGY TO DIE AFTER PASS
Actions on Entry:
Exit Conditions:
Transition Event: see energy on the bus
Actions Taken: Stop the ⅜T timer
New State: WAITING FOR ENERGY TO DIE AFTER PASS
Transition Event: ⅜T timer expires
Actions Taken: none
New State: FINDING NEXT STATION

TABLE 2-27

State Name: FINDING NEXT STATION

Reference Number 160 (see FIG. 25B)

Description: The token has not been successfully passed. An attempt is made to pass the token to the station's "to's" to.
Entry Conditions:
Old State(s):
WAITING FOR TO ACTIVITY
WAIT FOR MORE ENERGY AFTER PASS
Actions on Entry: none
Exit Conditions:
Transition Event: Always transition
Actions Taken: Init retry counter, send "Who's Next", start the $2^\wedge t$ timer
New state: WAIT FOR RESPONSE TO "WHO'S NEXT"

TABLE 2-28

State Name: WAIT FOR RESPONSE TO "WHO'S NEXT"

Reference Number 134 (see FIG. 25B)

Description: A "Who's Next" has been sent out. In this state the access machine is waiting for a reply. If there is a reply the token is passed to the source of this message.
Entry Conditions:
Old State(s): FINDING NEXT STATION
Actions on Entry: none
Exit Conditions:
Transition Event: Receive I'm Next
Actions Taken: Send "Load Your From" command, load the "to" register, and set NOT ARC if needed
New State: TOKEN PASSING
Transition Event: $2^\wedge t$ timer expires
Actions Taken: Send "Who's Next", increment retry count, start $2^\wedge t$ timer
New State: WAIT FOR RESPONSE TO "WHO'S NEXT"
Transition Event: Retry exhausted
Actions Taken: none
New State: DETERMINE PLACE IN RING

TABLE 2-29

State Name: PATCHING SELF OUT

Reference Number 164 (see FIG. 25A)

Description: In this state a station patches itself by sending load your to and load your from commands
Entry Conditions
Old State(s): TOKEN PASSING
Actions on Entry: The station executes the mechanism as described above in order to patch itself out of the ring
Exit Conditions:
Transition Event: Unsuccessful patchout
Actions Taken: none
New State: TOKEN PASSING
Transition Event: Successful patchout and slave only mode
Actions Taken: None
New State: TOKEN PASSING and then SLAVE ONLY
Transition Event: Successful patchout and mute mode
Actions Taken: none
New State: TOKEN PASSING and then MUTE Group 8-Permanent Demanding

DETERMINE PLACE IN RING
WAITING FOR DEMAND ENABLING BEING RESOLVED (PERM)

TABLE 2-30

State Name: DETERMINE PLACE IN RING

Reference Number 110 (see FIG. 21A)

Description: This is one of the most important states in the access mechanism. This state serves as the place where a station that wants to get into the ring (permanent member mode) stops to listen to the activity on the bus long enough to determine where in the ring it should go. It does this by waiting for a token pass to be made from a station with an address lower than its own address to one with an address higher than its own address. When it hears this pass, it then knows which station is its "TO" and which is its "FROM". The station is then ready to enter the "WAITING FOR DEMAND ENABLE" state. It is this state that also allows a station to "resynchronize" itself with the ring when, in certain states, it perceives activity on the bus that contradicts its own perceptions of how the ring should be operating. It should be remembered that if entering this state to "resynchronize" with the ring causes the ring to disintegrate, then the bus rebuild mechanisms come into effect 4/3T after cessation of activity on the bus.
Entry Conditions:
Old State(s):
ASSESS NEED FOR USE OF THE BUS
HASH TIMER FOR BUILD
WAITING FOR RESPONSE TO "WHO'S NEXT"
WAITING FOR DEMAND ENABLING BEING RESOLVED (PERMANENT)
WAITING FOR "TO" ACTIVITY
IN RING
DLC MASTER
Actions on Entry: None
Exit Conditions:
Transition Event: see token pass over address
Actions Taken: save source and destination address in token pass
New State: WAITING FOR DEMAND ENABLE
Transistion Event: see message with source address identical to your address
Actions Taken: none
New State: HALT
Transition Event: no activity on the bus for 4/3T
Actions Taken: none
New State: BUS IS DEAD
Note: Entry into the BUS IS DEAD state under these circumstances can occur from many other states but is not included in descriptions of their exit conditions. The rules for entry into the BUS IS DEAD state are described in "Rules for Guaranteeing Ring Rebuild". The exit to BUS IS DEAD state is listed here because of its importance to the meaning of the DETERMINE PLACE IN RING state.

TABLE 2-31

State Name: WAITING FOR DEMAND ENABLING

Reference Number 136 (see FIG. 30B)

Description: This state provides a holding place for a station that has found where it goes into the ring but is still waiting to be able to demand into the ring.
Entry Conditions:
Old State(s): DETERMINE PLACE IN RING
Actions on Entry: none
Exit Conditions:
Transition Event: see "demanders enabled"
Actions Taken: none
New State: BEING RESOLVED (PERM)
Transition Event: see any token pass skip over address
Actions Taken: none
New State: DETERMINE PLACE IN RING

TABLE 2-32

State Name: BEING RESOLVED (PERM)

Reference Number 138 (see FIG. 20B)

Description: In this state, the station participates in the demand process and competes with other demandees if there are any. If it wins the demand token, it patches itself in the ring, returns the demand token and enters IN RING state. If it cannot patch itself in, it bumps an error counter, and reenters DETERMINE PLACE IN RING state. If the station's "to" equals its "from", then it can assume that there are only two stations in the ring and therefore ARC will be set false to indicate that arc of control rules cannot be used. If the "to" and "from" are not the same address, then ARC can be set true and arc of control rules can be used. (The ARC boolean control variable is described in the section "Boolean Control Variables").
Entry Conditions:
Old State(s): WAITING FOR DEMAND ENABLE (PERM)
Actions on Entry: participate in demand process
Exit conditions:
Transition Event: lose demand bid or win but have unsuccessful patch-in
Actions Taken: none
New State: DETERMINE PLACE IN RING
Transition Event: win bid for demand and have successful patch-in
Actions Taken:
  If "TO"="FROM"
  then ARC=false
  else ARC=true
New State: IN RING
Note: If the patch-in puts the new station into a place in the arc of control that normally requires the station to become responsible for token recovery procedures, the station does not assume the responsibilities until the next token revolution (i.e., patched in station becomes demandee's "TO").
Transition Event: Receive demand token and determines that it is a duplicate address
Action Taken: Enter HALT state Group 9-DLC
DLC MASTER
TEMP DLC MASTER
ONLY ONE DLC MASTER
PASSING TO SELF DLC MASTER

TABLE 2-33

State Name: DLC MASTER

Reference Number 120 (see FIG. 21B)

Description: In this state, the station performs DLC work according to the DLC rules. (See section "Rules for Transmitting DLC messages). DLC work is only permitted for a limited time period (DLC TIME LIMIT).
Entry Conditions:
Old State: PASS OR USE
Actions on Entry: start DLC time limit timer
Exit Conditions:
Event: DLC time limit timer expires or DLC work complete and Ring=True
Actions Taken: none
New State: TOKEN PASSING
Event: DLC time limit timer expires or DLC work complete and First Station=True
Action taken: none
New State: FIRST STATION PASSING TO SELF
Event: Jabber Timeout
Action Taken: Turn off transmitter
New State: JABBER

TABLE 2-34

State: TEMP DLC MASTER

Reference Number 120''' (see FIG. 20A)

This state is the same as DLC MASTER except that the station returns the demand token and exits to SLAVE ONLY.

TABLE 2-35

State: ONLY ONE DLC MASTER

Reference Number 120'' (see FIG. 21B)

This state is the same as DLC MASTER except that the station exits to ONLY ONE SLEEP.

TABLE 2-36

State: PASSING TO SELF DLC MASTER

Reference Number 120' (see FIG. 21B)

This state is the same as DLC MASTER except that the station exits to FIRST STATION PASSING TO SELF.

Group 10-Temporary Demanding
WAITING FOR DEMAND ENABLE
BEING RESOLVED (TEMP)

TABLE 2-37

State Name: WAITING FOR DEMAND ENABLE

Reference Number 136 (see FIG. 20B)

Description: In this state, a station has described that it wants to receive the demand token to gain access rights and is waiting to be able to start the demanding process. (See rules for demanding). The station must be in Temporary Ring Member Mode to be able to enter this state.
Entry Conditions:
Old State(s): SLAVE ONLY
Actions on Entry: none
Exit Conditions:

Transition Event: receive Demander Enable message
Actions Taken: none
New State: BEING RESOLVED (TEMP)

TABLE 2-38

State Name: BEING RESOLVED (TEMP)

Reference Number 137 (see FIG. 20A)

Description: In this state, the station participates in the demand process and competes with other demanders if there are any. If it wins the demand token, it can do its DLC work; otherwise it must return to the SLAVE ONLY state and try demanding again if it still wishes to gain access rights.
Entry Conditions:
Old State(s): WAITING FOR DEMAND ENABLE
Actions on Entry: participate in demand process
Exit Conditions:
Transition Event: lose bid for demand token
Actions Taken: none
New State: SLAVE ONLY
Transition Event: win bid for demand token
Actions Taken: none
New State: TEMP DLC MASTER
(Same as the normal DLC MASTER but with a transition to SLAVE ONLY state when DLC work is done or time up).

Group 11-Miscellaneous States

SLAVE ONLY
DUPLICATE ADDRESS
MUTE
IN RING
JABBER

TABLE 2-39

State Name: SLAVE ONLY

Reference Number 142 (see FIG. 20A)

Description: In this state, the station is allowed to receive message but is only allowed to transmit DLC messages when granted access rights by another station in the DLC MASTER state.
Entry Conditions:
Old State(s):
  ASSESS NEED FOR USE OF BUS
  TEMP DLC MASTER
  BEING RESOLVED (TEMP)
Actions on Entry: none
Exit Conditions:
Transition Event: want to be in ring and in permanent member mode
Actions Taken: none
New State: DETERMINE PLACE IN RING
Transition Event: see message with source address same as own address
Actions Taken: none
New State: DUPLICATE ADDRESS
Transition Event: want to be temporary owner and in temporary member mode
Actions Taken: none
New State: WAITING FOR DEMAND ENABLE

Table 2-40

State Name: DUPLICATE ADDRESS

Reference Number 144 (see FIG. 20A)

Description: This state is entered when a duplicate address is detected.
Action on Entry: Inform the higher layers of the duplicate address
Exit Condition:
Transition Event: Higher layers give the access machine a different address
New State: Assess need for use of bus

TABLE 2-41

State Name: MUTE

Reference Number 166 (see FIG. 20A)

Description: This state is essentially the same as DUPLICATE ADDRESS except it is entered and exited according to mode changes requested by the link layer.
Entry Conditions:
Old State(s): ASSESS NEED FOR USE OF BUS
Actions on Entry: none
Exit Conditions:
Transition Event: mode change
Actions Taken: none
New State: ASSESS NEED FOR USE OF BUS

TABLE 2-42

State Name: IN RING

Reference Number 140 (see FIG. 24A)

Description: This is the state in which a participant in the ring waits to become a token owner (no arc of control) or waits to enter the arc of control. Upon passing the token (no arc of control) or becoming unburdened (arc of control) by executing a successful token pass, the ring participant reenters this state. This state is sometimes entered by a token owning station that hears an illogical message which causes it to think that another station owns the token.
Entry Conditions:
Old State(s):
  WAITING FOR "FROM" ACTIVITY
  IN RING
  WAITING FOR TOKEN PASS OVER NOISE
  WAIT FOR TOKEN ACK AFTER NOISY PASS
  WAIT FOR ENERGY TO DIE AFTER NOISY PASS
  WATCHING FOR EVIDENCE OF RING AFTER NOISY PASS
  WAITING FOR "TO" ACTIVITY
  WAITING FOR ENERGY TO DIE AFTER PASS
  BEING RESOLVED
Actions on Entry: none
Exit Conditions:
Transition Event: receive "who's next" with station's address specified
Actions Taken: send "I'm next"
New State: IN RING
Transition Event: receive token
Actions Taken: none
New State: TOKEN OWNER
Transition Event: see token pass to "from" and ARC=-true Actions Taken: none
New State: WAITING FOR "FROM" ACTIVITY

TABLE 2-43

State Name: JABBER

Figure 23A:
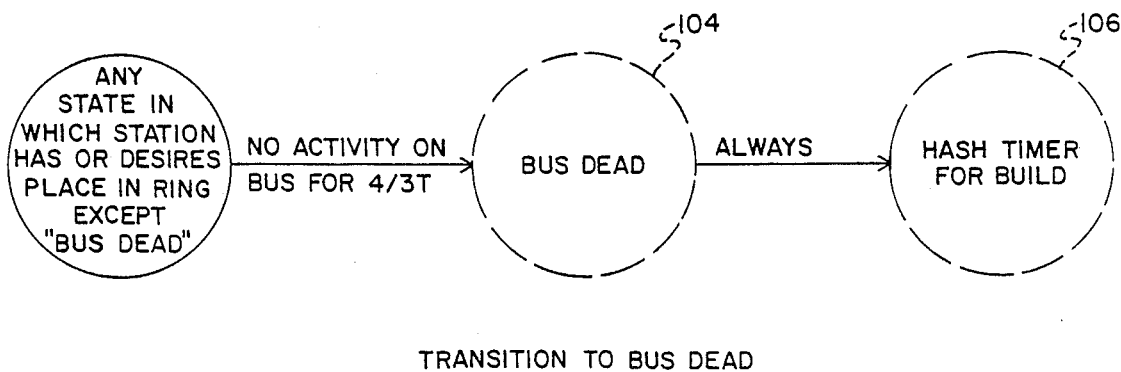
FIG. 23A is a state map illustrating the transition to the BUS DEAD state.
Figure 23B:
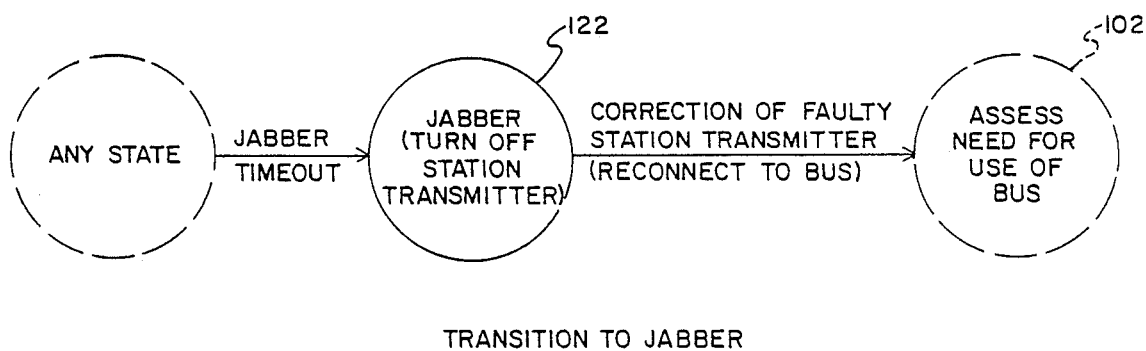
FIG. 23B is a state map illustrating the transition to the JABBER state.

Reference Number 122 (see FIG. 23B)

Description: This is a forced transmission break of the station from the bus(es).
Entry Conditions: Transmission by a station for a period of time greater than the jabber time.
Old State(s): Any state which has the above condition occur
Exit Conditions:
Transition Event: Correction of the faulty station transmitter
Action Taken: reconnect to bus
New State: ASSESS NEED FOR USE OF BUS

APPENDIX A

DEFINITIONS OF TERMS

Station Access Mechanism: The station access mechanism describes the access layer which is a sublayer of link. The interfaces of the access layer are the data link control layer and the physical layer (connection to bus). The access mechanism is responsible for the transmission and reception of bus control messages and encapsulated DLC messages.

Access Message: An access message is any message that originates at the access mechanism level. An access message can either be a bus control message used to synchronize cooperating stations or can be part of an encapsulated DLC message.

Arc of Control: The arc of control exists only when there are three or more stations in the ring. The arc of control refers to an association of three stations: the token owner, the token owner's "FROM", and the token owner's "TO". The arc of control is used to distribute the responsibility for a speedy recovery from conditions that prevent single token passes. Such conditions include single node failures and excessive noise on limited sections of the bus.

Burdened States: The burden states are a subset of states associated with the token owner, its FROM and its TO.

Demandee (Window Station): The demandee explicitly allows demanding by transmitting a broadcast message. In the case of multi-demanders the demandee determines who is the winner.

Demander: A demander is a station which is currently demanding.

Demanding: If a station is not in the ring and wants to insert itself into the ring it requests or demands to be inserted at the appropriate time. A station may also demand for temporary transmission rights by requesting the demand token.

Deterministic: The access mechanism operates in a deterministic manner because it only allows one station to talk at a given time and each station is guaranteed a certain amount of time to use the bus in every revolution of the token. The worst case access time can be calculated in a deterministic manner rather than in a statistical manner as is the case with collision based access systems (e.g. Ethernet TM).

DLC Message: These are messages which originate at the data link control layer. These messages are encapsulated for transmission by the access mechanism.

Encapsulated: A message is encapsulated when it is part of a larger message. The part of the larger message which surrounds the encapsulated message is known as the envelope. For example, the envelope of an encapsulated DLC message is the access message.

Energy: This is any signal on the bus strong enough to be interpreted as carrier or strong enough to interfere with the reception of another transmission. Hardware makes a line available to software to determine if there is energy on the line. This line is known as carrier detect.

Explicit demanding: Demanding is explicit when a broadcast message is sent which explicitly states that demanding is now allowed.

FCS: Frame Check Sequence. This is a cyclical redundancy check (CRC), 16 or 32 bits in length.

Flyback: Flyback is the name given to the case where the token is passed from the highest addressed station in the ring to the lowest addressed station. Token passing is in ascending order of primary station address.

Frame: A frame is any complete (i.e., flag to flag) message placed on the bus by the access mechanism.

Hashing: Hashing is a method of selecting one station out of many competing stations. It is used for ring building and demander resolution. (See RULES FOR RING BUILDING and RULES FOR DEMANDING in Table 1).

Message: Any continuous signal that results in the reception of a properly packaged frame with a good FCS. A frame is properly packaged if the access subfield is a legal subfield.

Noise: Any energy on the bus that results in the reception of a bad frame. A bad frame is a frame missing either the opening or closing flags, one that has a bad CRC, one where the signal quality is bad during the frame, one with an improperly packaged frame, or one with a frame with a bad FCS.

Poll: This is a query with request for return of DLC data.

Query: This is the sending of a DLC message which carries with it a request for reply from the receiving station.

Query window: While a station owns the token it may want a response from another station. The station owning token then sends a message to the queried station and opens a query window for a period of time. The queried station is only permitted to begin responding with a single message within this period. The station owning the token still owns this token whether or not the queried station responds while the query window is open.

Signal Quality: The hardware provides a signal quality line which software can test. The signal quality line is true if and only if the data on the cable is encoded correctly.

Relativity: Each access mechanism has its own unique perception of the events occurring on the physical medium. Different stations can see different events and different event orders. Each station's perception of the bus can be different. The perception of events on the bus is "relative" to each station.

The Ring: A set of N primary stations are said to form a ring when the following conditions hold:

(1) N>1
(2) Each station has a predecessor. This is known as the station's FROM.
(3) Each station has a successor. This is known as the station's TO.
(4) No two stations have the same TO or the same FROM.
(5) The stations are ordered by numbers which may not necessarily be consecutive. These numbers are the station's addresses. Each station's TO is the next higher station address in the ring except when it is the highest station address in the ring in which case its TO is the lowest number in the ring. Each station's FROM is the next lower station address in the ring except when it is the lowest station address in the ring in which case its FROM is the highest station address in the ring.

Round Trip Time: The amount of time it takes for a signal to travel from one end of the bus to the other end and back again. (same as 2 t see Table 1, section on timers).

It will thus be seen in the objects set forth above, among those made apparent from the preceding description are efficiently attained and, since certain changes may be made in the above description without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. An improved method of communicating over a communication medium by a plurality of stations interconnected to the medium, each station having an address identified by a series of ON-OFF type bits, the method of the type wherein each station which has access to the medium has means for transmitting information to other stations and, if desired, to command other stations to transmit information, each station with such access to the medium knowing from whom it receives the token (its FROM station) as well as to whom it next passes the token (its TO station), and wherein each such station having access to the medium being part of a token list comprising all such stations having such access to the medium, each station in the token list passing access to the medium (called a token) to its TO station; and wherein each station's FROM and TO stations have addresses respectively lower and higher than said station's address unless the station is the then lowest addressed station in the token list, in which case its FROM station is the highest addressed station in the token list, or unless the station is the then highest addressed station in the token list, in which case its TO station is the lowest addressed station in the token list; wherein the improvement comprises an improved demanding mechanism for allowing other stations to obtain access to the medium, comprising the steps of:

(1) Providing one and only one station in a token list able to generate a signal (Demander Enable signal) during a period of time (a demand window) after receipt of the token so that stations not part of the token list may demand access to the token list;

(2) each station requiring access to the medium waiting for the token to pass over its address so that the demanding station can determine from the address of the station that passed the token over its address its FROM and TO stations for use when it has access to the medium; and (3) each singly responding station to the Demander Enable signal receiving a signal (demand token) sent by the demand window generating station; said signal causing the demanding station to patch itself into the token list by informing its FROM and TO stations that it is in the token list, and wherein said activity by the demanding station causes the demand window generating station to continue its use of the medium and to pass the token to its TO station.

2. An improved method of communicating over a communication medium as defined in claim 1, wherein only one demander (the winner) responding to a Demander Enable signal is allowed to enter the token list during a single demand window, in which multiple demanding stations determine the winner by performing a bit-by-bit comparison (hashing contest) of their station addresses; wherein the bit-by-bit comparison (hashing contest) utilizes the following steps for determining the winner of the hashing contest:

(A) each station reading one of its own address bits;
(B) if this bit is in a first state, causing that station to transmit a message on the medium, and if it is in a second state causing that station to listen to the medium for electrical activity (energy) on the medium as a result of at least one other station transmitting on the medium;
(C) if the listening station hears energy on the medium, that station exits from the hashing contest;
(D) if the listening station does not hear energy on the medium, that station reading its next bit to determine whether to listen or transmit a message on the medium; and
(E) repeating steps A to D until only one station is transmitting a message on the medium or is listening to the medium, with that station being the winner of the hashing contest by receiving the demand token from the demand window generating station.

3. An improved method of communicating over a communication medium as defined in claim 2, wherein each station that responds to the Demander Enable signal further comprises a plurality of ON-OFF type bits representing a random number, wherein this random number is transmitted by each demanding station to the demand window generating station along with that demanding station's address, wherein the demand window generating station transmits the demanding station's address and the demanding station's random number as part of the Demand Token, and further wherein a demanding station only obtains access to the medium if its address and random number are identical to that forming part of the Demand Token; so that two demanding stations cannot simultaneously obtain access to the medium even if both stations have the same address.

4. An improved method of communicating over a communication medium as defined in claim 2, wherein the demanding stations begin their comparison with their most significant address bit and proceed to their least significant address bit, and further wherein a "1" for the address bit causes the station to transmit a message on the medium and a "0" for the address bit causes that station to listen to the medium.

5. An improved method of communicating over a communication medium as defined in claim 4, wherein each station further comprises a plurality of ON-OFF type bits representing a random number and in which the hashing contest continues if a winner is not obtained at the end of the station address comparison so as to next compare the bits of the random number associated with each station in a manner comprising steps A to E of claim 2; whereby a winner to the hashing contest can be obtained even if two demanding stations have the same address.

6. An improved method of communicating over a communication medium as defined in claim 5, wherein each station that responds to the Demander Enable signal further comprises a plurality of ON-OFF type bits representing a random number, wherein this random number is transmitted by each demanding station to the demand window generating station along with that demanding station's address, wherein the demand window generating station transmits the demanding station's address and the demanding station's random number as part of the Demand Token, and further wherein a demanding station only obtains access to the medium if its address and random number are identical to that forming part of the Demand Token; so that two demanding stations cannot simultaneously obtain access to the medium even if both stations have the same address.

7. An improved method of communicating over a communication medium as defined in claim 1, wherein the station which generates the Demander Enable signal is the station which has the lowest address of all stations currently having access to the token and further wherein prior to a station responding to a Demander Enable signal, it waits for the token to pass from a station having a lower address than itself to a station having a higher address than itself, or vice versa if the demanding station has an address higher than the highest addressed station in the token list in order to determine its FROM and TO stations.

8. An improved method of communicating over a communication medium as defined in claim 7, wherein the winner of the hashing contest can transmit information on the medium to other stations including, if desired, commands to such other stations to transmit information on the medium, wherein such transmissions occur even if no other station is currently in the token list; that is, even if the winner of the hashing contest does not have a TO or FROM station.

9. An improved method of communicating over a communication medium as defined in claim 1, further wherein each station performs the step of patching itself out of the token list if it perceives a loss of input power; wherein the patching out is performed by the station that has perceived the loss of input power to itself.

10. An improved method of communicating over a communication medium as defined in claim 9, wherein a station upon perceiving a loss of input power to itself causes its patchout from the token list by informing its FROM station of the address of its TO station and similarly informing its TO station of the address of its FROM station; whereby the station which patches itself out of the token list effectively causes its FROM station to obtain information for a new TO station, and similarly whereby its TO station obtains information for a new FROM station.

11. An improved method of communicating over a communication medium as defined in claim 1, wherein each station responding to the Demander Enable signal may only desired access to the medium for a temporary period of time, wherein such a temporary demanding station upon receiving a demand token has access to the medium so as to transmit information to other stations and, if desired, to command other stations to transmit information, and wherein after said access to the medium the temporary demanding station returns the demand token to the station which issued the Demander Enable signal and wherein such a temporary demanding station does not patch itself into the token list.

12. An improved method of communicating over a communication medium as defined in claim 2 wherein each station responding to the Demander Enable signal may only desire access to the medium for a temporary period of time, wherein such a temporary demanding station upon receiving a demand token has access to the medium so as to transmit information to other stations and, if desired, to command other stations to transmit information, and wherein after said access to the medium the temporary demanding station returns the demand token to the station which issued the Demander Enable signal and wherein such a temporary demanding station does not patch itself into the token list.

13. An improved method of communicating over a communication medium as defined in claim 1, wherein if a station sees the token passed to a station having the same address as itself, the station does not proceed to determine its need for the use of the medium until after it has been assigned a new address.

14. An improved method of communicating over a communication medium as defined in claim 2, wherein if a station sees the token passed to a station having the same address as itself, the station does not proceed to determine its need for the use of the medium until after it has been assigned a new address.

15. An improved method of communicating over a communication medium as defined in claim 1, wherein if the station that generates the Demander Enable signal determines that all stations connected to the medium have access to the medium and thus are in the token list, it terminates generation of said Demander Enable signal.

16. An improved method of communicating as defined in claim 1, wherein the station which generates the Demander Enable signal is the station which has the lowest address of all stations then in the token list and thus receives the token from the station having the highest address of all stations in the token list.

17. An improved method of communicating over a communication medium as defined in claim 1, wherein any station that continues to transmit on the medium for at least a predetermined length of time causes its own means for transmitting on the medium to be physically disconnected from the medium.

18. An improved method of communicating over a communication medium by a plurality of stations interconnected to the medium, each station having an address identified by a series of ON-OFF type bits, the method of the type wherein each station which has access to the medium has means for transmitting information to other stations and, if desired, to command other stations to transmit information, each station with such access to the medium knowing from whom it receives the token (its FROM station) as well as to whom it next passes the token (its TO station), and wherein each such station having access to the medium being part of a token list comprising all such stations having such access to the medium, each station in the token list passing access to the medium (called a token) to its TO station; wherein the improvement comprises an improved procedure for initializing those stations which shall have access to the medium (forming the token list); wherein the following step and substeps are performed:

each station interconnected to the medium which is in a powered ON condition and which does not hear activity by one or more other stations on the medium (energy on the medium) for a predetermined length of time, entering a hashing contest for determining the first station to have access to the medium and thus the first station to be in the token list, in which the hashing contest comprises the following substeps:
(a) each such station reading the contents of one of its address bits and if the bit is in a first state, sending a message on the medium and going to substep (d), and if the bit is in a second state, listening to the medium,
(b) if the station's bit read in step in (a) is in a second state and if the station hears activity (energy) on the medium, that station exiting from the hashing contest,
(c) if the station's bit is in the second state and if it does not hear activity (energy) on the medium, the station proceeding to substep (d),
(d) each station still in the hashing contest reading its next address bit and repeating substeps (a) through (c), and
(e) continuing substeps (a) through (d) for each of the address bits associated with each station until only one station is sending a message or is listening to the medium but hearing no other activity (energy); such a defined station being designated the winner of the hashing contest and becoming the first member of the token list.

19. An improved method of communicating over a communication medium as defined in claim 18, wherein the winner of the hashing contest can transmit information on the medium to other stations including, if desired, commands to such other stations to transmit information on the medium, wherein such transmissions occur even if no other station is currently in the token list; that is, even if the winner of the hashing contest does not have a TO or FROM station.

20. An improved method of communicating over a communication medium as defined in claim 19, further wherein each station has associated with its address bits a random number as defined by ON-OFF type bits, and further wherein if a winner to the hashing contest is not determined at the end of the comparison of the station address bits, the hashing contest continues to perform substeps (a) through (e) of claim 33 using the random number bits associated with each station still in the hashing contest, until a hashing contest winner is determined.

21. An improved method of communicating over a communication medium as defined in claim 18, further wherein each station has associated with its address bits a random number as defined by ON-OFF type bits, and further wherein if a winner to the hashing contest is not determined at the end of the comparison of the station address bits, the hashing contest continues to perform substeps (a) through (e) of claim 18 using the random number bits associated with each station still in the hashing contest, until a hashing contest winner is determined.

22. An improved method of communicating over a communication medium as defined in claim 18, further comprising the step of patching out of the token list any station which perceives a loss of input power to itself; wherein the patching out is performed by the station that has perceived the loss of input power to itself.

23. An improved method of communicating over a communication medium as defined in claim 22, wherein a station upon perceiving a loss of input of power to itself causes its patchout from the token list by informing its FROM station of the address of its TO station and similarly informing its TO station of the address of its FROM station; whereby the station which patches itself out of the token list effectively causes its FROM station to obtain information for a new TO station, and similarly whereby its TO station obtains information for a new FROM station.

24. An improved method of communicating over a communication medium as defined in claim 18, wherein each station (observing station) further determines, when it senses that its FROM or TO station has the token and energy is on the medium, the length of time that its FROM or TO station has stopped using the medium without passing the token, and wherein each such observing station proceeds to pass the token by entering a state (TOKEN PASSING state) when one of the predetermined time periods has expired for such non-use of the medium by its FROM or TO station, and further wherein these predetermined time periods are different for different stations so that multiple observing stations do not proceed to the TOKEN PASSING state even if they each perceive themselves as being the station that should proceed to the TOKEN PASSING state upon expiration of their respective predetermined time periods; whereby initialization of a token list is avoided when two or more communication mediums with separate token lists are combined.

25. A communication system for transmitting access and non-access messages comprising:
(A) a first and second bus;
(B) a plurality of stations connected to the first and second buses, each station having,
(1) at least two receivers and at least two transmitters for transferring messages to and from the buses,
(2) a data communication module for transmitting and receiving non-access messages once access to the buses has been established or when commanded to do so by another station having access to the buses,
(3) an access module connected to the receivers and transmitters and to the data communication module for establishing access to the buses depending upon perceived events, the access module having means for storing information about the station (its FROM station) from whom it receives access (token) to the buses as well as to whom (its TO station) it passes access to the buses, and further having a timer so as to acquire the token from its FROM or TO stations if either of these two stations has the token and is not transmitting messages or passing the token within a designated period of time; and
(4) means connected to the two transmitters for disconnecting said transmitters from the buses if either transmitters fails to stop transmitting on the buses within a predetermined length of time; whereby redundancy of the communication medium prevents failure of any one bus from interfering with the overall communication system and wherein the transmission interrupt means prevents any malfunction within a station from interfering with the access of the buses by the other stations connected to the buses.

26. A communication system as defined in claim 25, wherein each station further has an address defined by the ON and OFF states of a plurality of bits, and wherein each station has means (Demander Enable means) for allowing other stations into the token list if it is the first station in the token list, the access module for each station further comprises means for performing an initialization hashing contest wherein each station active on the buses when no token exists performs, based upon a selected bit of the plurality of bits, either the transmission of a message on the buses if the selected bit is in a first state or listens to the buses if the selected bit is in a second state, and wherein if the station is listening to the buses it drops out of the hashing contest if it hears activity (energy) from at least one other station on the buses and remains in the contest if it does not hear energy on the buses, wherein the contest continues for each bit of said plurality of bits until only one station transmits a message on the buses or is listening to the buses, this station then becoming the first station in the token list, and further wherein this station via its Demander Enable means allows other stations to enter the token list.

27. A communication system as defined in claim 26, wherein each station has means for determining a property of itself as compared to other stations so that only one station can be the station that allows other stations into the token list, and wherein the Demander Enable means includes means for generating an explicit demand window and wherein stations wishing to be in the token list can demand entry into the token list during the demand window; wherein if multiple demander stations exist, they perform a hashing contest of their address bits in a manner defined in claim 26 for initialization.

28. A communication system as defined in claim 27, wherein the system includes means for storing a random number in the form of ON-OFF type bits for each station and further wherein each station has means to perform an augmentation of the hashing contest for both initialization and multiple demanders situations by bit-by-bit comparing these random number bits in a manner defined in claim 26 if a winner is not found with the address bits.

29. A communication system as defined in claim 28, wherein each station (observing station) further comprises means for randomizing its timer used to initiate its own passing of the token from its FROM or TO station if the observing station determines that either of these stations has the token and has stopped transmitting messages without thereafter passing the token within the period of time designated by the timer; so that multiple stations cannot proceed to pass the token even if the same timers are timing out for both stations.

30. A communication system as defined in claim 29, wherein each station has means for sensing a loss of input power to the station and if such means indicate a loss of input power, the station has means to patch itself out of the token list if it is in the token list prior to loss of input power.

31. A communication system as defined in claim 26, wherein priority bits are associated with each station's address and wherein the means for performing the hashing contest includes means for testing the priority bits of each station prior to testing the address bits in order to determine if a station with higher priority than other stations is to win the hashing contest.

32. An improved communication system for transmitting access and non-access messages over a communication medium by a plurality of stations interconnected to the medium, each station having an address identified by a series of ON-OFF type bits, the sytem of the type wherein each station which has access to the medium has means for transmitting non-access messages to other stations and, if desired, to command other stations to transmit non-access messages, each station with such access to the medium having means for knowing from whom it receives the token (its FROM station) as well as to whom it next passes the token (its TO station), and wherein each such station having access to the medium being part of a token list comprising all such stations having such access to the medium, each station in the token list having means for passing access to the medium (called a token) to its TO station; and wherein each station's FROM and TO stations have addresses respectively lower and higher than said station's address unless the station is the then lowest addressed station in the token list, in which case its FROM station is the highest addressed station in the token list, or unless the station is the then highest addressed station in the token list, in which case its TO station is the lowest addressed station in the token list; wherein the improvement comprises an improved demanding mechanism for allowing other stations to obtain access to the medium, comprising:
  (A) means for having one and only one station in a token list able to generate a signal (Demander Enable signal) during a period of time (a demand window) after receipt of the token so that stations not part of the token list may demand access to the token list;
  (B) each station wanting access to the medium having means for waiting for the token to pass over its address so as to determine the addresses of its FROM and TO stations for use when it has access to the medium; and
  (C) means for allowing each singly responding station to the Demander Enable signal to have a signal (demand token) sent to it by the demand window generating station; said signal initiating means in the demanding station to patch the demanding station into the token list by informing its FROM and TO stations that it is in the token list, and wherein said activity by the demanding station causes means in the demand window generating station to continue its use of the medium and to pass the token to its TO station.

33. An improved communication system as defined in claim 32, wherein each station demanding access to the medium in response to a Demander Enable signal has means for allowing only one demander (the winner) to enter the token list during a single demand window, said means for causing the multiple demanding stations to determine the winner by performing a bit-by-bit comparison (hashing contest) of their station addresses; wherein the bit-by-bit comparison (hashing contest) comprises:
  (A) each station reading one of its own address bits;

(B) if this bit is in a first state, causing that station to transmit a message on the medium, and if it is in a second state causing that station to listen to the medium for electrical activity (energy) on the medium as a result of at least one other station transmitting on the medium;

(C) if the listening station hears energy on the medium, that station exits from the hashing contest;

(D) if the listening station does not hear energy on the medium, that station reading its next bit to determine whether to listen or transmit a message on the medium; and (E) repeating elements A to D until only one station is transmitting a message on the medium or is listening to the medium, with that station being the winner of the hashing contest by receiving the demand token from the demand window generating station.

34. A communication system as defined in claim 33, wherein each station that responds to the Demander Enable signal further comprises a plurality of ON-OFF type bits representing a random number, and further comprises means wherein this random number is transmitted by each demanding station to the demand window generating station along with that demanding station's address, wherein the demand window generating station has means for transmitting the demanding station's address and the demanding station's random number as part of the Demand Token, and further wherein a demanding station has means for only obtaining access to the medium if its address and random number are identical to that forming part of the Demand Token; so that two demanding stations cannot simultaneously obtain access to the medium even if both stations have the same address.

35. A communication system as defined in claim 34, wherein the winner of the hashing contest means for transmitting information on the medium to other stations includes means for allowing such transmissions even if no other station is currently in the token list; that is, even if the winner of the hashing contest does not have a TO or FROM station.

36. A communication system as defined in claim 32, wherein each station has means for determining that the station which generates the Demander Enable signal is the station which has the lowest address of all stations currently have access to the token and further wherein prior to a station responding to a Demander Enable signal, it has means for waiting for the token to pass from a station having a lower address than itself to a station having a higher address than itself, or vice versa if the demanding station has an address higher than the highest addressed station in the token list in order to determine its FROM and TO stations.

37. A communication system as defined in claim 32, further wherein each station has means for patching itself out of the token list if it perceives a loss of input power; wherein the patching out is performed by the station that has perceived the loss of input power to itself.

38. A communication system as defined in claim 37, wherein each station has means so that upon perceiving a loss of input power to itself, it causes its patchout from the token list by informing its FROM station of the address of its TO station and similarly informing its TO station of the address of its FROM station; whereby the station which patches itself out of the token list effectively causes its FROM station to obtain information for a new TO station, and similarly whereby its TO station obtains information for a new FROM station.

39. A communication system as defined in claim 32, wherein each station has means so that each station responding to the Demander Enable signal may only desire access to the medium for a temporary period of time, wherein such a temporary demanding station upon receiving a demand token has access to the medium so as to transmit information to other stations and, if desired, to command other stations to transmit information, and wherein after said access to the medium the temporary demanding station returns the demand token to the station which issued the Demander Enable signal and wherein such a temporary demanding station has means so as not to patch itself into the token list.

40. A communication system as defined in claim 32, wherein each station has means so that if it sees the token passed to a station having the same address as itself, the station does not attempt to demand access to the medium.

41. A communication system as defined in claim 33, wherein each station has means so that if it sees the token passed to a station having the same address as itself, the station does not attempt to demand access to the medium until after it has a new address.

42. A communication system as defined in claim 32, wherein each station has means so that if it is the station that generates the Demander Enable signal, it can determine if all stations connected to the medium have access to the medium and thus are in the token list, and if it so determines that all stations have access, it terminates generation of said Demander Enable signal.

43. A communication system as defined in claim 32, wherein the system has means so that the station which generates the Demander Enable signal is the station which has the lowest address of all stations then in the token list and thus receives the token from the station having the highest address of all stations in the token list.

44. A communication system as defined in claim 32, wherein each station has means so that if it continues to transmit on the medium for at least a predetermined length of time, said means causes that station's own means for transmitting on the medium to be physically disconnected from the medium.

45. A communication system for transmitting information over a communication medium by a plurality of stations interconnected to the medium, each station having an address identified by a series of ON-OFF type bits, the system of the type wherein each station which has access to the medium has means for transmitting information to other stations and, if desired, to command other stations to transmit information, each station with such access to the medium having means for knowing from whom it receives the token (its FROM station) as well as to whom it next passes the token (its TO station), and wherein each such station having access to the medium being part of a token list comprising all such stations having such access to the medium, each station in the token list having means for passing access to the medium (called a token) to its TO station; wherein the improvement comprises an improved system for initializing those stations which shall have access to the medium (said stations forming the token list); comprising:

(A) each station interconnected to the medium having means so that if it is in a powered ON condition and if it does not hear activity by one or more other stations on the medium (energy on the medium) for a predetermined length of time, it has means for entering and performing a hashing contest for determining the first station to have access to the medium and thus the first station to be in the token list, in which the hashing contest comprises:

(a) each such station having means for reading the contents of one of its address bits and if the bit is in a first state, sending a message on the medium and going to element (d), and if the bit is in a second state, listening to the medium, (b) if the station's bit read in element (a) is in a second state and if the station hears activity (energy) on the medium, that station has means for exiting from the hashing contest, (c) if the station's bit is in the second state and if it does not hear activity (energy) on the medium, the station proceeding to element (d), (d) each station still in the hashing contest having means for reading its next address bit and repeating elements (a) through (c), and (e) continuing elements (a) through (d) for each of the address bits associated with each station until only one station is sending a message or is listening to the medium bit but hearing no other activity (energy); such a defined station being designated the winner of the hashing contest and becoming the first member of the token list.

46. A communication system as defined in claim 45, wherein each station has means so that if it is the winner of the hashing contest, it can transmit information on the medium to other stations including, if desired, commands to such other stations to transmit information on the medium, wherein said means provide for such transmissions to occur even if no other station is currently in the token list; that is, even if the winner of the hashing contest does not have a TO or FROM station.

47. A communication system as defined in claim 46, further wherein each station has associated with its address bits a random number as defined by ON-OFF type bits, and further wherein each station has means so that if a winner to the hashing contest is not determined at the end of the comparison of the station address bits, the hashing contest continues to perform elements (a) through (e) of claim 45 using the random number bits associated with each station still in the hashing contest, until a hashing contest winner is determined.

48. A communication system as defined in claim 45, further wherein each station has associated with its address bits a random number as defined by ON-OFF type bits, and further wherein each station has means so that if a winner to the hashing contest is not determined at the end of the comparison of the station address bits, the hashing contest continues to perform elements (a) through (e) of claim 45 using the random number bits associated with each station still in the hashing contest, until a hashing contest winner is determined.

49. A communication system as defined in claim 45, further wherein each station has means for patching itself out of the token list if it perceives a loss of input power; wherein the patching out is performed by the station that has perceived the loss of input power to itself.

50. A communication system as defined in claim 49, wherein each station has means so that upon perceiving a loss of input power to itself, it causes its patchout from the token list by informing its FROM station of the address of its TO station and similarly informing its TO station of the address of its FROM station; whereby the station which patches itself out of the token list effectively causes its FROM station to obtain information for a new TO station, and similarly whereby its TO station obtains information for a new FROM station.

51. A communication system as defined in claim 45, wherein each station has means for sensing predetermined time periods, and wherein each station (observing station) has means for determining, when its FROM or TO station has the token and energy is on the medium, the length of time that its FROM or TO stations has stopped using the medium without passing the token, and wherein each such observing station has means to pass the token by entering a state (TOKEN PASSING state) when one of said predetermined time periods has expired for such non-use of the medium by its FROM or TO station, and further wherein these predetermined time periods are different for different stations so that multiple observing stations do not proceed to the TOKEN PASSING state even if they each perceive themselves as being the station that should proceed to the TOKEN PASSING state upon expiration of their respective predetermined time periods; whereby initialization of a token list is avoided when two or more communication mediums with separate token lists are combined.

52. A communication system as defined in claim 45 in which the medium comprises a first and second bus, wherein each station in the system is connected to both buses and has:

(1) at least two receivers and at least two transmitters for transferring messages to and from the buses, and (2) means for using either receiver and either transmitter;

whereby redundancy of the communication medium prevents any one bus from interfering with the overall operation of the communication system.

* * * * *